(12) United States Patent
Schaefer et al.

(10) Patent No.: US 7,276,154 B1
(45) Date of Patent: Oct. 2, 2007

(54) SETTLING GRID SEPARATOR

(75) Inventors: Alan W. Schaefer, Bloomsdale, MO (US); Valery D. Zimin, Houston, TX (US); Vladimir N. Shtern, Houston, TX (US); Michael A. Schaefer, St. Mary's, MO (US)

(73) Assignee: VAV Technologies, Inc., Ste. Genevieve, MO (US)

( * ) Notice: Subject to any disclaimer, the term of this patent is extended or adjusted under 35 U.S.C. 154(b) by 0 days.

(21) Appl. No.: 11/063,434

(22) Filed: Feb. 23, 2005

Related U.S. Application Data

(60) Provisional application No. 60/547,873, filed on Feb. 25, 2004.

(51) Int. Cl.
    *C02F 11/14* (2006.01)
(52) U.S. Cl. ............... 210/96.1; 210/104; 210/112; 210/121; 210/202; 210/205; 210/298; 210/299; 210/305; 210/313; 210/522; 210/523; 210/533
(58) Field of Classification Search ............. 210/202, 210/205
    See application file for complete search history.

(56) References Cited

U.S. PATENT DOCUMENTS

| | | | | |
|---|---|---|---|---|
| 1,752,789 A | * | 4/1930 | Downes | 210/197 |
| 2,889,927 A | * | 6/1959 | Van Note | 210/801 |
| 3,975,226 A | | 8/1976 | Boettcher | |
| 4,028,249 A | | 6/1977 | McGivern | |
| 4,128,477 A | | 12/1978 | Nebolsine | |
| 4,160,734 A | | 7/1979 | Taylor et al. | |
| 4,178,243 A | | 12/1979 | Messer | |
| 4,179,376 A | * | 12/1979 | Hakansson | 210/208 |
| 4,184,954 A | * | 1/1980 | Peterson | 210/791 |
| 4,192,752 A | * | 3/1980 | de Mello Ribeiro Pinto | 210/298 |
| 4,260,488 A | * | 4/1981 | Condolios | 210/259 |
| 4,273,658 A | * | 6/1981 | Karman | 210/709 |
| 4,470,907 A | * | 9/1984 | Sencza | 210/192 |
| 4,741,836 A | | 5/1988 | Jackman | |
| 4,792,406 A | * | 12/1988 | Allenson et al. | 210/734 |
| 4,871,454 A | * | 10/1989 | Lott | 210/205 |
| 5,227,076 A | * | 7/1993 | Bogen et al. | 210/791 |
| 5,284,626 A | * | 2/1994 | Brazelton et al. | 422/135 |
| 5,656,174 A | | 8/1997 | Hodges et al. | |
| 5,741,426 A | * | 4/1998 | McCabe et al. | 210/707 |
| 5,814,230 A | | 9/1998 | Willis et al. | |
| 6,652,757 B2 | | 11/2003 | Hodges et al. | |
| 6,821,440 B2 | | 11/2004 | Gallagher et al. | |

* cited by examiner

*Primary Examiner*—Peter A. Hruskoci
(74) *Attorney, Agent, or Firm*—Kevin L. Klug

(57) ABSTRACT

A settling grid separator apparatus and method of use which provides deep dehydration of high flow rate sludge in an environmentally friendly and energy efficient manner. The apparatus and method comprise and utilize an efficient mixing of the sludge with a flocculating agent or polymer solution, and sludge flow quieting techniques to reduce disturbances and promote flocculation of clustered solids. Free surface liquid rejection, a series of traps, and pressurized filtering utilize gravimetric, hydrometric, and densimetric techniques to separate liquid from suspended solids. Gravitational forces are utilized throughout the apparatus and method to promote separation of higher density solids from the lower density liquid carrier. Upon separation, solids with a minimal liquid content are controllably discharged for proper disposal or recycling.

28 Claims, 47 Drawing Sheets

Output sludge volumetric flow rate ( g.p.m)

Concentrations

|   |     | input |     |     |     |
|---|-----|-----|------|------|------|
|   |     | 5%  | 10%  | 15%  | 20%  |
| o | 50% | 71  | 147  | 228  | 315  |
| u | 55% | 62  | 128  | 198  | 274  |
| t | 60% | 54  | 112  | 173  | 239  |
| p | 65% | 47  | 98   | 152  | 210  |
| u | 70% | 42  | 86   | 134  | 185  |
| t | 75% | 37  | 76   | 118  | 163  |
|   | 80% | 33  | 67   | 104  | 144  |

Fig. 3

Sedimentation Rate vs. Solid Concentration
For 40ppm Polymer

SETTLING GRID SEPARATOR

This application claims priority of U.S. Provisional Patent Application No. 60/547,873 filed Feb. 25th, 2004.

BACKGROUND OF THE INVENTION

The art of the present invention relates to sludge separation systems and methods in general and more particularly to an apparatus and method for continuously separating and deeply dehydrating suspended sludge solids in a liquid medium, especially lime $(Ca(OH)_2)$ particles and suspended manure sludge, as may be found in lagoons. The art of the present invention optimally benefits the environment, both during use, with a minimum of energy utilization, and via the separation of the solids which may be utilized or disposed of properly. The apparatus is usable in any liquid/suspended solid separation application, including but not limited to municipal wastewater treatment facilities, provided the specific gravity of the suspended solid is greater than that of the suspending liquid.

From time to time, lagoons, which are usually earthen pits used to collect waste, become filled with sludge. This sludge will usually range from 3% to 12% solids and the remainder is water. The aforesaid lagoons must be pumped from time to time to remove the solids and make room for future deposits. Conventional solid removal typically utilizes a pump to transfer the aforesaid thin slurry into tank trucks at 7,000 to 9,000 gals. per load and haul said slurry a considerable distance (average 15 miles in Iowa) for spreading on fields as fertilizer. Typically, the entity or operator performing said spreading is paid for the weight of solids removed from the lagoon and not the liquid or water in which said solids are suspended. The cost of hauling the aforesaid mix is approximately 78% of the combined costs of removal and spreading. From the aforesaid, it is apparent that a reduction of truck loads hauled by 70 to 80% would greatly increase profit margins for said entity. This profit margin increase is only realistic if the cost of removing the excess liquid or water is reasonable. Prior art attempts to dehydrate the aforesaid have failed to fully develop an apparatus or method that will perform the desired deep dehydration at a rapid and economical rate.

The present art apparatus and method provides the desirable cost effective dehydration in a compact, portable, effective, and energy efficient apparatus and method of use. The present art settling grid separator apparatus, when utilized with the method herein described, will perform sludge treatment or de-watering at an input rate of more than 1,000 gallons per minute (gpm) and deliver a substantially clear fluid or water discharge of approximately 800 gpm with a solids discharge of 70 to 80% solids to liquid or water ratio. The substantially clear liquid or water discharge can be returned to the lagoon of origination, thereby avoiding the need for transport. The aforesaid solid discharge is hauled to a storage or disposal site, used as fuel, or spread on fields as a fertilizer. With the present art, not only is the number of loads to be hauled greatly decreased but due to the deep dehydration, the utilization options are expanded for the solid portion of the former lagoon contents. Unique to the present art is the ability of the settling grid separator to perform the aforesaid separation in an energy conserving way, relying primarily upon gravitational separation, and this machine is a compact transportable apparatus.

Prior art attempts at sludge separation have been characterized by limited separation capability, short times between required maintenance, high energy utilization, environmentally degrading impact, and limited transportability. Prior art sludge separation devices such as that described by Hodges et al. in U.S. Pat. No. 6,652,757, entitled *Method for High-speed Dewatering of Slurries*, utilize tracking filter screen separation. The tracking filter screens are easily blocked with fine solid particles, thereby significantly decreasing the filtration rate, slowing slurry de-watering, and further requiring continual filter screen washing or replacement and disposal. The aforesaid art further requires significant energy input for belt pressing of the minimally de-watered slurry. Further prior art sludge separation devices as described by McGivern in U.S. Pat. No. 4,028,249, entitled *Sewage Settling Tank*, provide a series of submerged horizontal decks where solid particles deposit and a floating siphon system for removal of the deposited sludge slurry on the decks. This technique utilizes large amounts of energy for pumping the deposited slurry solid against gravitational forces, does not provide a deep dehydration, and is also not suitable for easy transport, quick setup, or large volume applications. Further prior art separation devices as described by Hodges et al. in U.S. Pat. No. 5,656,174, entitled *Dredging System and Method*, utilize inefficient energy consuming elements such as cyclones or centrifuges for secondary centrifugal separation.

The present art apparatus and method of use provides solid separation at up to an 80% solids to liquid ratio via utilization of a flocculating apparatus, gravitational settling apparatus, trap system, filter system, a controlled and even solid cake removal system, and a discharge conveyor system. The present art settling grid separator is a solids-liquid, gravity-separating machine, that is scaleable in size and capacity. The settling grid separator can be scaled up to operate at 20,000+gpm, which makes the settling grid separator an attractive system for river, harbor and lake dredging. Utilization of the unique design features provides very high settling rates with a minimum of energy expended. With the combination of water traps and pressure assisted vertical filters a deep dehydration of solids is achieved. The apparatus typically receives a 1,000 gallon per minute (gpm) sludge stream with 2 to 20% solids from a supply line fed with a dredge or other lagoon evacuation system. The system thereafter discharges 70% or greater solids and clear effluent. The apparatus is especially useful with sludge having a specific gravity of 1.25 or greater.

Typically the apparatus is mounted upon a trailer and transported to the sludge-pumping site, i.e. lagoon, and set up within an hour. That is, the trailer is positioned whereby the intake dredge pipe coupling, typically an 8" cam-lock pipe coupling, faces the discharge pipe of the dredge. The trailer is leveled and an effluent hose is laid from the liquid discharge outlet of the apparatus back to the lagoon or wherever substantially clear discharge liquid or water is desired. When operated, removed solids with limited moisture content are discharged through a discharge chamber onto a conveyor and thereafter loaded into a truck for transport, thereby eliminating transport of the liquid redirected into the lagoon. Additional dehydration can be achieved by employing novel drying devices and adding them to the system between the discharge chamber and transport truck.

Accordingly, it is an object of the present invention to provide a settling grid separator apparatus and method of use which is capable of substantially separating suspended sludge solids in a liquid medium in an energy efficient manner.

Another object of the present invention is to provide a settling grid separator apparatus and method of use which provides the aforesaid solid separation in a transportable and scalable form.

Another object of the present invention is to provide a settling grid separator apparatus and method of use which economically provides deep dehydration of suspended solids at a rapid rate.

A further object of the present invention is to provide a settling grid separator apparatus and method of use which requires a minimum of maintenance or filter component replacement.

A further object of the present invention is to provide a settling grid separator apparatus and method of use which optimally introduces a flocculating agent into the input sludge stream based upon measured sludge flow and density measurements.

A still further object of the present invention is to provide a settling grid separator apparatus and method of use which provides solid separation utilizing primarily gravimetric, densimetric, and hydrometric techniques to separate suspended solids within a liquid carrier.

A yet further object of the present invention is to provide a settling grid separator apparatus and method of use which provides environmental benefits, both during use and as a product of use, heretofore not found in prior art sludge separation or treatment devices.

SUMMARY OF THE INVENTION

To accomplish the foregoing and other objects of this invention there is provided a settling grid separator comprising a trash box fed by an input sludge stream, a flocculating agent mixer capable of optimally mixing a flocculating agent concentrate such as a polymer prior to introduction into the sludge stream, a metering pump coupled with a volume flow and density sensor which is capable of optimally introducing the mixed flocculating agent into the sludge stream, a reaction chamber, the lower part thereof, which turbulently mixes the sludge and the metered premixed flocculating agent and the upper part of the reaction chamber which has suppressed turbulence for the efficient flocculation of particles into clusters, a settling chamber which provides laminar settling of solids and partial liquid removal, a filter chamber which further removes liquid content, a discharge chamber which allows removal, in an even manner, the flocculated solids with minimum moisture content, and a conveyor chamber which is capable of transporting the low moisture content solids to a discharge area. The apparatus and method of use is especially suited for removal of suspended lime, manure, or other solids as found within a lagoon or municipal wastewater treatment facility.

Accordingly, several objects and advantages of the invention are to provide an effective and deep dehydration of liquid-solid mixtures that obviates the disadvantages of prior separators. Specifically, the present art apparatus and method of use has a superior flow rate and volume ratio and provides deep dewatering of sludge with high flow rates thus enabling it to be used in lagoons and other applications. The present art apparatus and method of use is a reliable device which requires minor, if any, maintenance and its production is simple and inexpensive compared with other separators of the same flow rate. New and unique elements of the present art which are substantially different from the prior art are a two-stage solving of a polymer in the recycled or reclaimed water, a reactor or reaction chamber with two zones of polymer/sludge interaction. The bottom zone is the incoming area of very intense turbulence where the polymer/sludge mixture completes the mixing process. This turbulent mixture goes through the lower laminator plates, which help make turbulence less violent to avoid tearing of clusters by shear stresses, but allow for further mixing. As the mix rises in the reaction chamber, the chamber end walls (FIG. 15) widen. This increases the volume and further slows the turbulence. As the polymer/sludge mixture comes into the widest part of the reaction chamber (FIG. 15), the flow passes through another set of laminator plates. These plates are arranged in two levels, one on the top of the other, in a 90 degree orientation to one another. If viewed from the top, they resemble a "honeycomb". After passing through the new and unique honeycomb of laminator plates nearly all turbulence has subsided, flocculation is nearly complete and settling is starting to take place. In the reaction chamber, the upward movement of the flocculated mixture is greater than the settling speed of the flocculated solids. Therefore, there is a net movement to the surface of the reaction chamber by the flocculated solids. The flocculated mixture now moves from the reaction chamber over a weir into the settling chamber, where the surface area is 3.25 times greater than the surface area of the reaction chamber. In the settling chamber, rapid settling of the flocculated solids takes place, this can approach 20 mm per second. Water separates at the upper water sludge interface at the top of the settling tank. Further new and unique elements are a grid of traps for water removal from the settling tank, one or more innovative filters which allow water to pass through while blocking solids, and deep de-watering via combined sedimentation and filtering.

As aforesaid, a grid of traps permits multi-level water rejection. That is, water separates from sludge at a number of vertically and horizontally arranged interfaces. The figures show a schematic representation of preferably substantially inverse "V" shaped trap sets arranged inside the settling tank. Liquid separates from the solids in the traps within the settling tank. The solid content of sludge increases downward, towards the bottom of the settling tank due to the aforesaid water separation. The traps increase the area of the water-sludge interface (where the rejection of water from sludge occurs) without increasing the volume of the settling tank. This makes the present art apparatus compact and efficient.

The number of trap layers in the vertical direction must be properly chosen. That is, the sedimentation rate of solid particles decreases as the solid content increases toward the bottom of the settling tank. For a concentration of solids to liquid greater than 40%, the sedimentation rate is typically so small that it is unreasonable to use the traps for sedimentation, and the sedimentation or solids removal process is replaced by filtration. Thus, innovative filters are placed below said traps to further the liquid removal process and further enhance the deep dehydration of the solids portion of the descending material (sludge).

The present art apparatus in at least one embodiment utilizes the aforesaid new and unique filters positioned below said traps, said filters comprising a plurality of uniquely shaped holes. Said filters geometrical features include but are not limited to hole/particle diameter ratios, recesses, and proper distance/diameter ratios in the hole arrangement to obtain optimum filtration. The aforesaid, proper geometrical features are crucial for efficient filtration of liquid from the sludge at the solids concentrations stated and to further avoid solid particles from passing through said holes or blocking said filter holes. The unique hole geometry allows particles to form a kind of dome (as bricks form architectural domes) near each hole in the filter for more assured filtration. Spontaneous formation of said dome requires the aforesaid proper hole/particle diameter ratios and dome resistance to flow disturbances requires said proper recesses and/or proper distance/diameter ratios to assure a sufficiently thick and robust dome buildup. Upon buildup, the dome structure substantially prohibits and blocks solid particles from transporting through the filter holes yet allows liquid or water to freely pass through both the domes and holes. This technique provides clean and efficient filtration, that is, clean separated water free of fine solid particles, without a continual necessity to frequently wash back the filter. In a preferred embodiment, the filtration rate is significantly increased when water suction is applied on the water discharge side of said filters in addition to the pressure action of the sludge head pressure.

The present art combines sedimentation and filtration with the aforesaid one or more filters arranged below the aforesaid traps shown. The walls of the filters of the filter chamber have the aforesaid hole geometry. Experimentation has show that such combination of sedimentation and filtering (under head pressure or vacuum of approximately 0.5 bar) results in the transformation of a sludge with 20% or less non dissolved solids into a cake with approximately 80% solid content.

In order to promote solids flocculation, a flocculating agent such as a polymer is combined and mixed with the high liquid content sludge. The present art utilizes a two stage solving technique of a flocculating agent with the recycling water in a preferred embodiment. That is, for preparation of the water-polymer solution, the water rejected from the sludge (i.e., recycled water) can be used. Preparation of a water flocculating agent solution typically requires approximately 20 minutes for proper mixing. Conventional techniques therefore require that the solution must be prepared in advance and accumulated in a bulky storage tank that can limit the transportability of the apparatus. The present art apparatus reduces the storage tank size by at least ten times by using a two-stage flocculating agent solving process. In the first stage, one part of the flocculating agent concentrate, typically a polymer, and ninety nine parts of water are mixed for 20 minutes, resulting in a 1/100 polymer/water solution. In the second stage, one part of the prepared solution and 9 parts of water, are mixed for 3 seconds, resulting in a 1/1000 flocculating agent/water solution. Finally, 4 parts of the 1/1000 solution and 96 parts of the sludge are mixed, resulting in 40 parts per million (ppm) flocculating agent/sludge mixture. This final mixture with the flocculated solid content is directed to the reaction chamber, where flocculation occurs, to the settling chamber, where sedimentation occurs, and next to the filters, where deep dehydration occurs. This two stage solving and mixing process drastically reduces the storage-tank volume required.

The present art provides an efficient mixing of the incoming sludge with a polymer-water solution, suppression of turbulent pulsations and deceleration of the mixed flow in the reactor in order to provide proper conditions for solid particle flocculation by the flocculating agent into large clusters, a quiet flow near the top of the reactor and settling tanks that provides efficient separation of "easy" liquid or water from the sludge, a grid of traps within the settling chamber which provides efficient water rejection from the bulk mix within the settling tank, and additional filter rejection of liquid or water from the sludge. The final unique filtration technique of the process transforms the flocculated agent-sludge mixture into a paste and then into a cake which can be discharged.

In operation, the sludge from a lagoon first meets the trash box or strainer where large-scale trash (sticks, stones, etc.) is rejected. Next, the sludge enters a sludge-flocculating agent mixer in parallel with the flocculating agent-water solution, and these two substances are well mixed within. The resulting flocculating agent-sludge mixture goes to a reactor or reaction chamber where a thorough mixing of the flocculating agent-solid-particle clusters occurs, allowing flocculation and then passing to the settling tank. In the settling tank, the separation of water or liquid begins to occur near the free surface or top of the settling tank and in the traps. The rejected water is primarily directed back to the lagoon while a (recycling) part of this water goes to the flocculating agent pre-mixer. Flocculating agent or polymer is pumped from the flocculating agent storage tank, i.e. for lithe flocculating agent or polymer concentrate, into said pre-mixer with said recycled water to form the first stage mixing.

The flocculated paste resulting from the sludge gravitationally migrates from the settling tank through the filter chamber and around the filtering devices where deep dehydration occurs and it transforms into a cake. The cake removal occurs within the discharge chamber, preferably via a multi-vane valve, a tapered auger or a variable pitch auger, and thereafter is transported to or deposited upon the conveyer for truck transport.

Where provided herein, dimensions, geometrical attributes, and other specific sizes are for preferred embodiment informational and enablement purposes. Alternative embodiments may utilize a plurality of variations of the aforesaid without departing from the scope and spirit of the present invention. The art of the present invention may be manufactured from a plurality of materials, including but not limited to metals, plastics, glass, ceramics, woods, or composites.

BRIEF DESCRIPTION OF THE DRAWINGS

Numerous other objects, features, and advantages of the invention should now become apparent upon a reading of the following detailed description taken in conjunction with the accompanying drawings, in which:

FIG. 3 is a table of the settling grid separator apparatus showing the output volumetric flow versus input solid concentration and output solid concentration.

DETAILED DESCRIPTION

Figure 10:
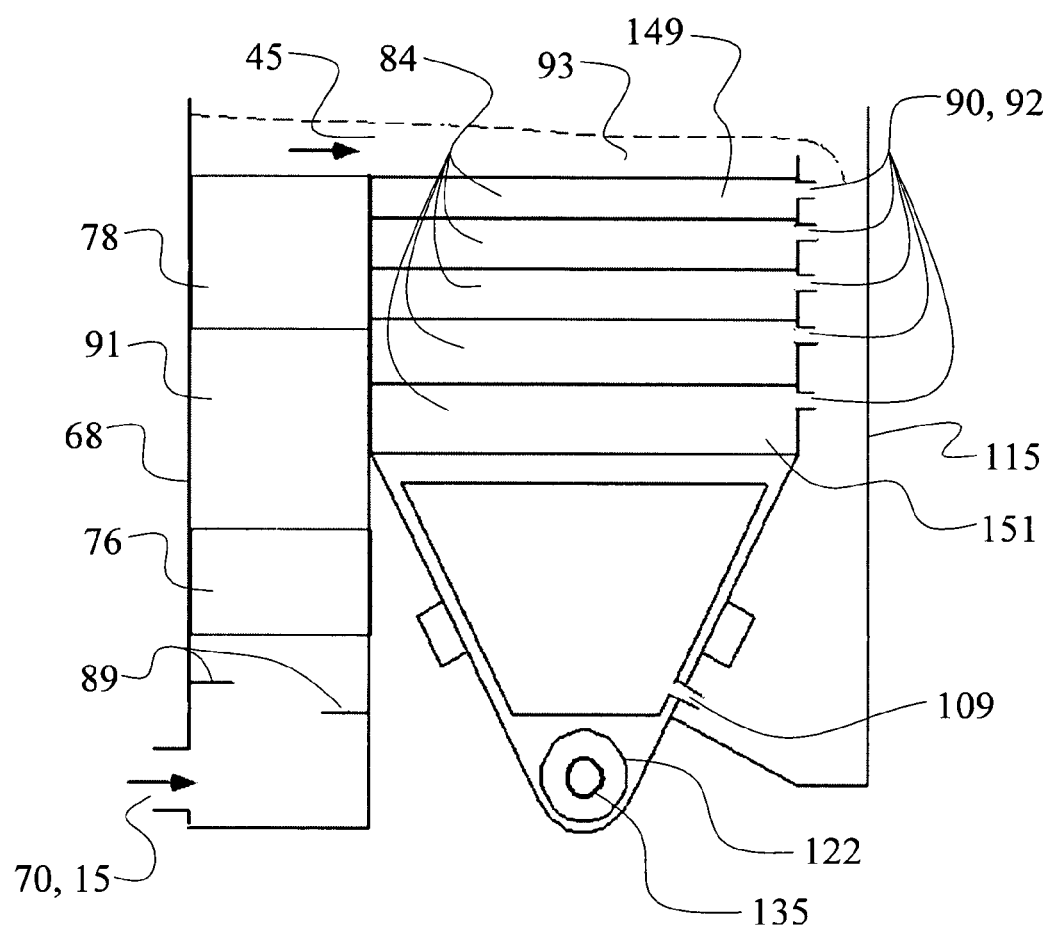
FIG. 10 is an internal cross sectional view of an embodiment of the reaction chamber, settling chamber, filter chamber, and discharge chamber.
Figure 11:
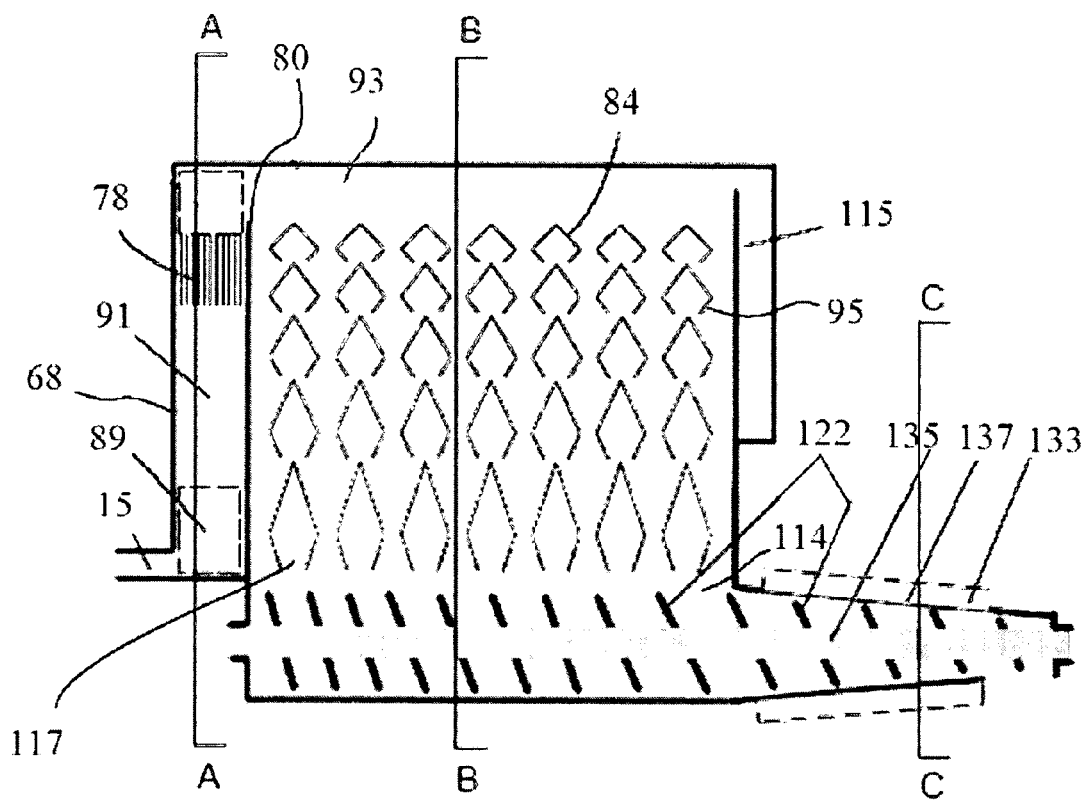
FIG. 11 is an internal cross sectional view of an embodiment of the reaction chamber, settling chamber, filter chamber, and discharge chamber.
Figure 12:
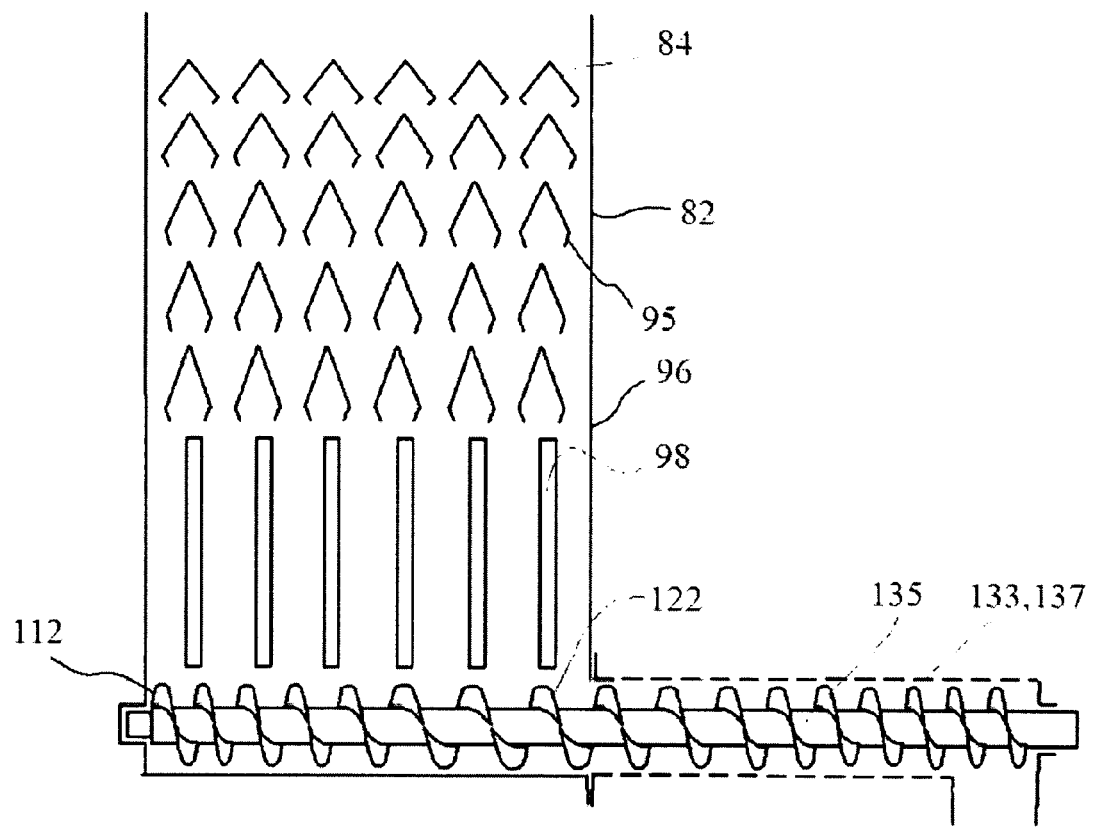
FIG. 12 is an internal cross sectional view of an embodiment of the reaction chamber, settling chamber, filter chamber, and discharge chamber.
Figure 13:
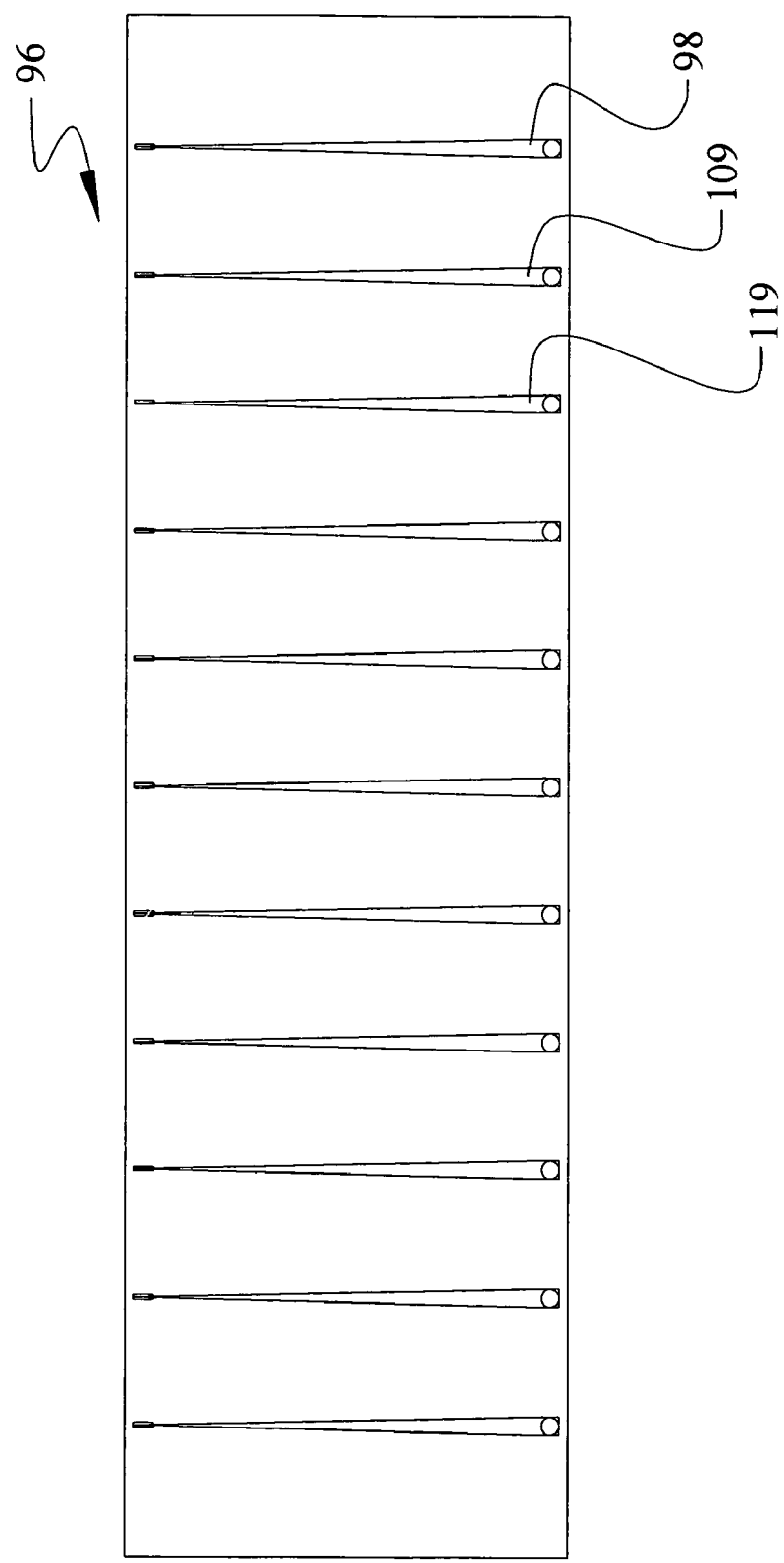
FIG. 13 is an internal right side plan view of the filter chamber.
Figure 14:
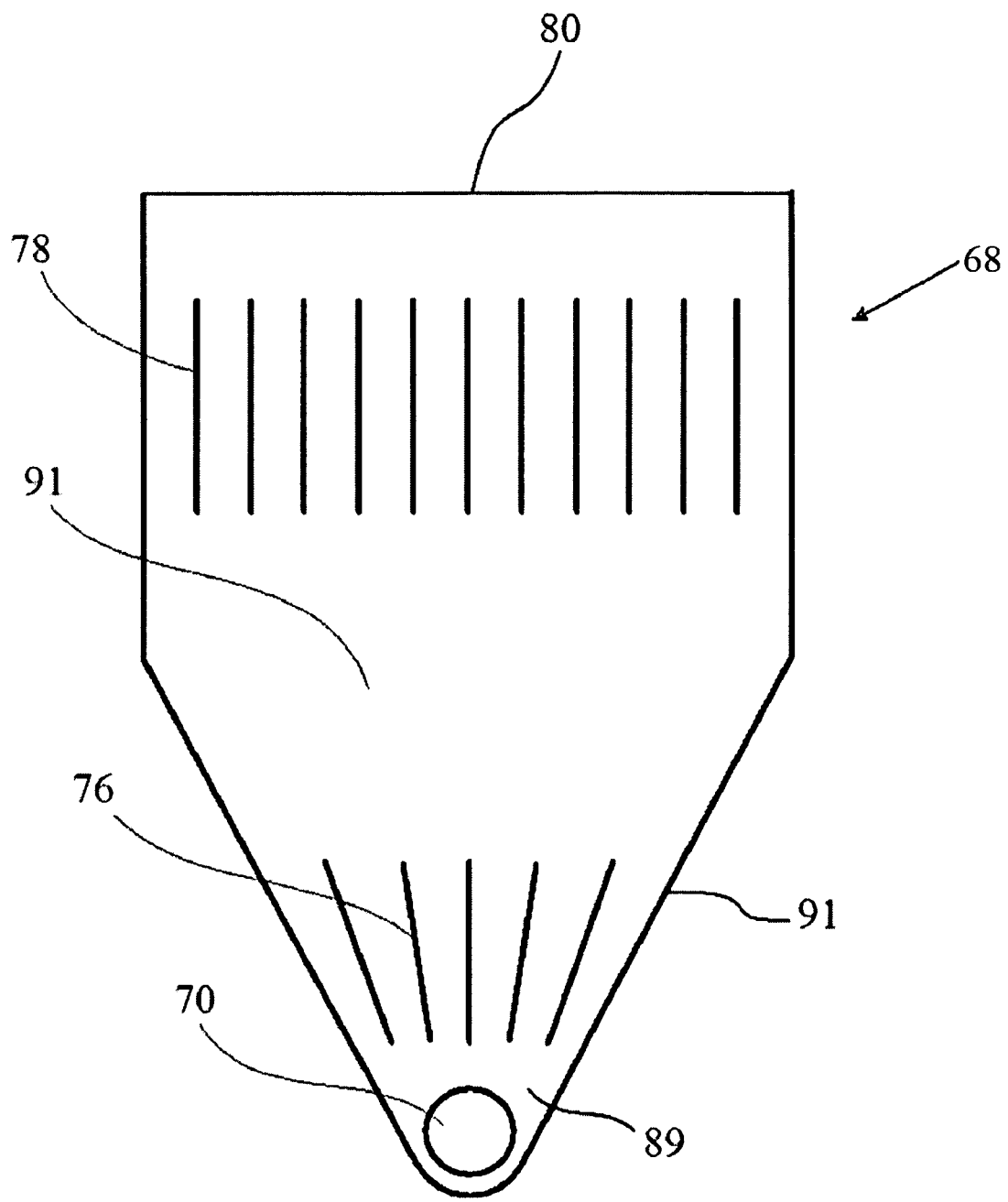
FIG. 14 is an internal plan view of the reaction chamber.
Figure 15:
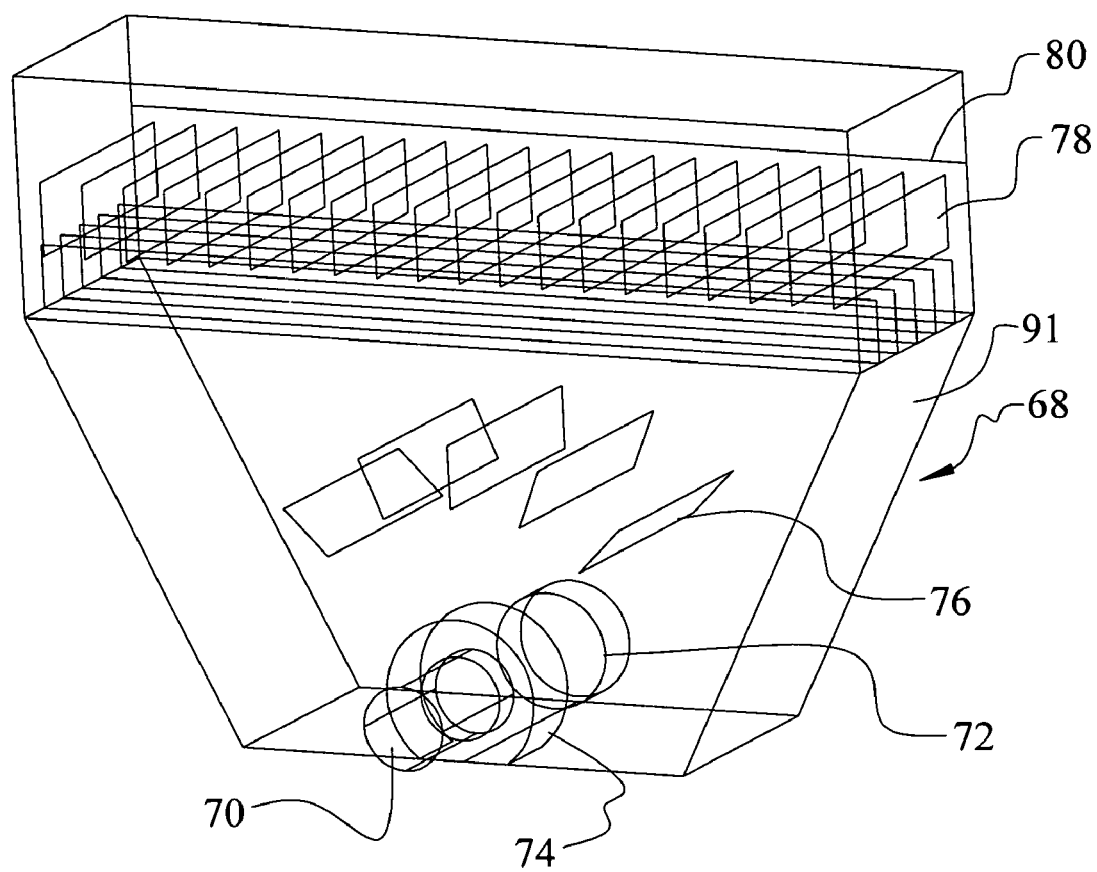
FIG. 15 is a three dimensional x-ray view of the reaction chamber.
Figure 16:
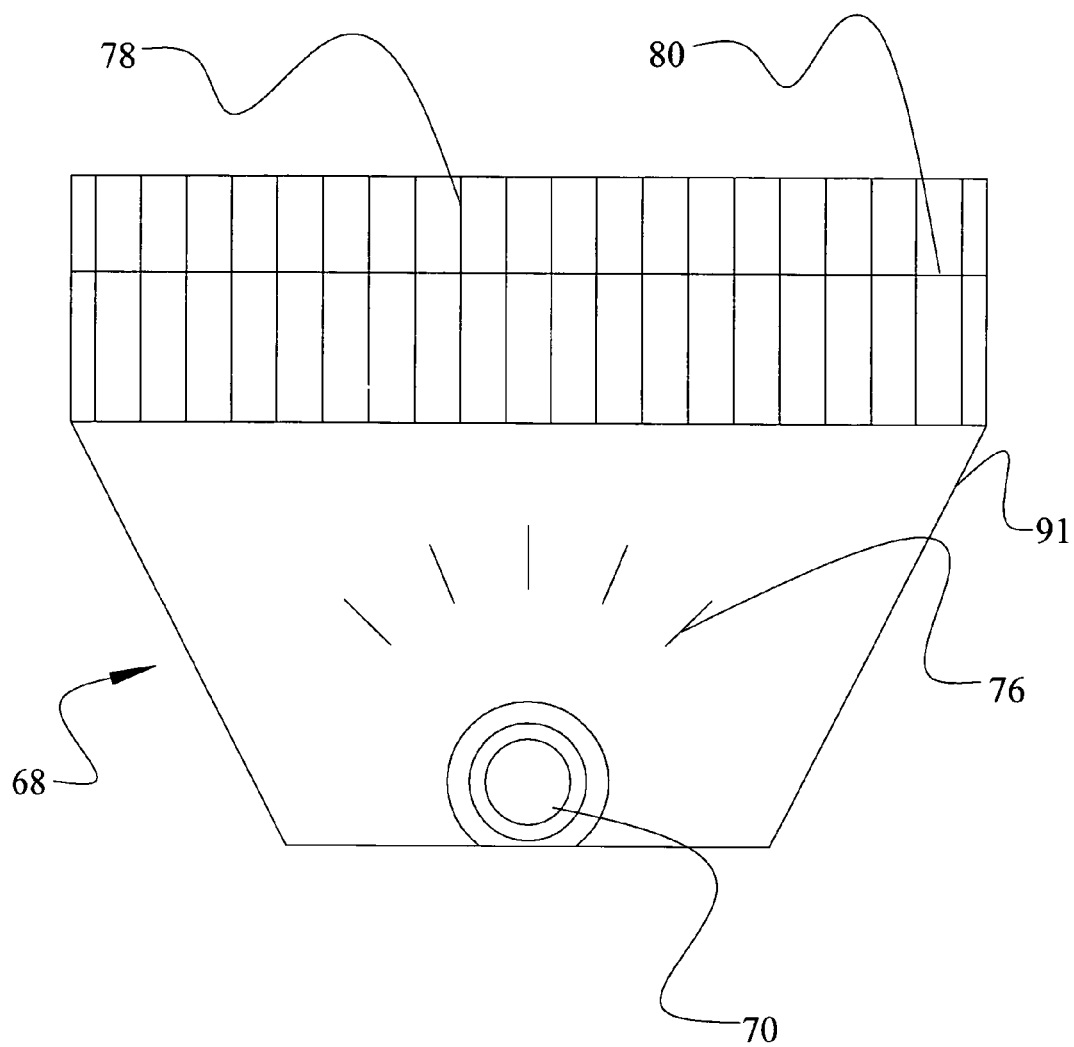
FIG. 16 is another internal plan view of the reaction chamber.
Figure 17:
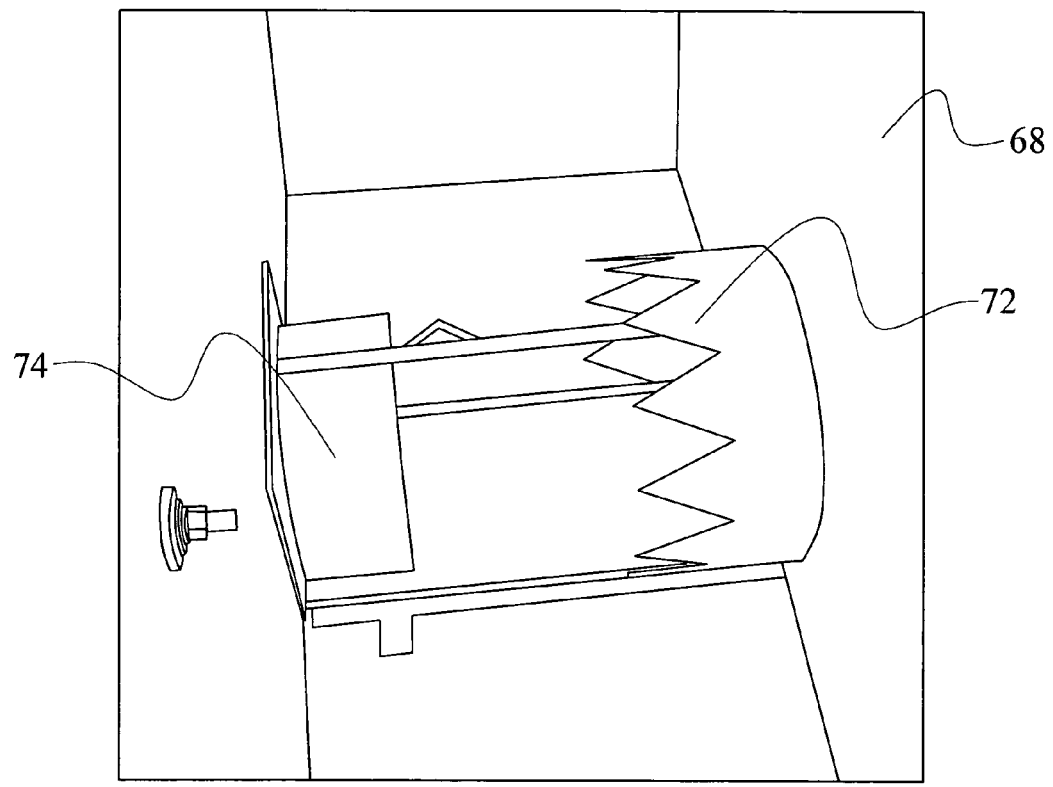
FIG. 17 is a perspective view looking into the reaction chamber.
Figure 21:
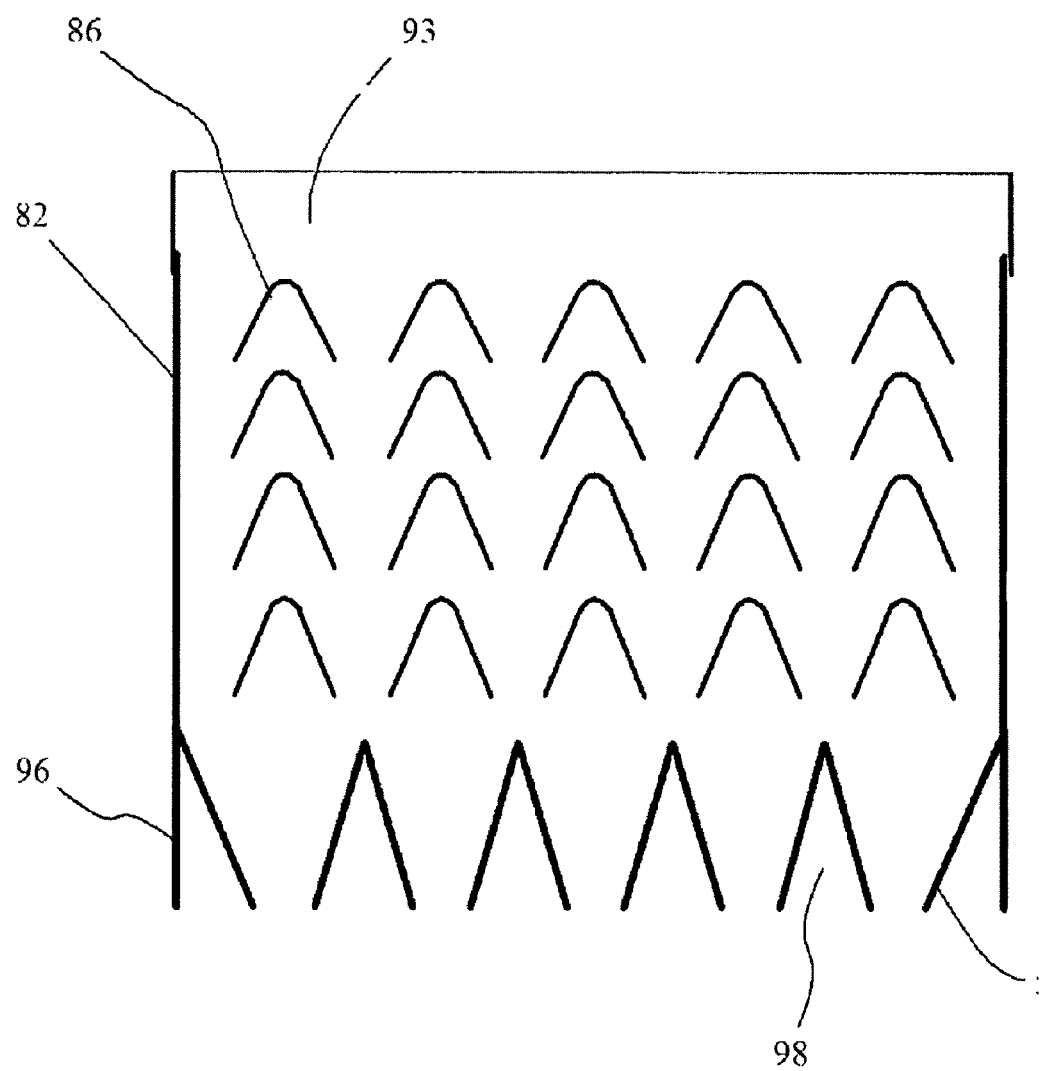
FIG. 21 shows an alternative embodiment cross section of the traps.
Figure 22:
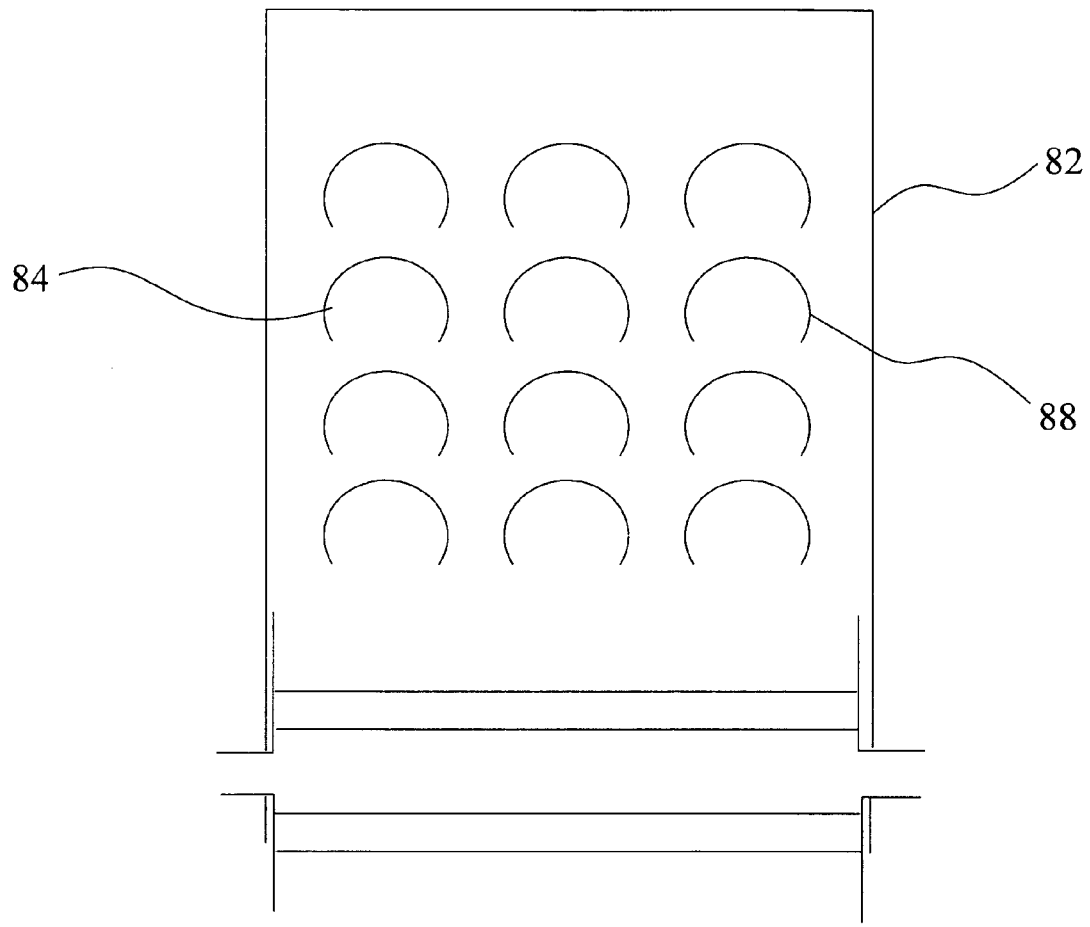
FIG. 22 shows a further alternative embodiment cross section of the traps.
Figure 23:
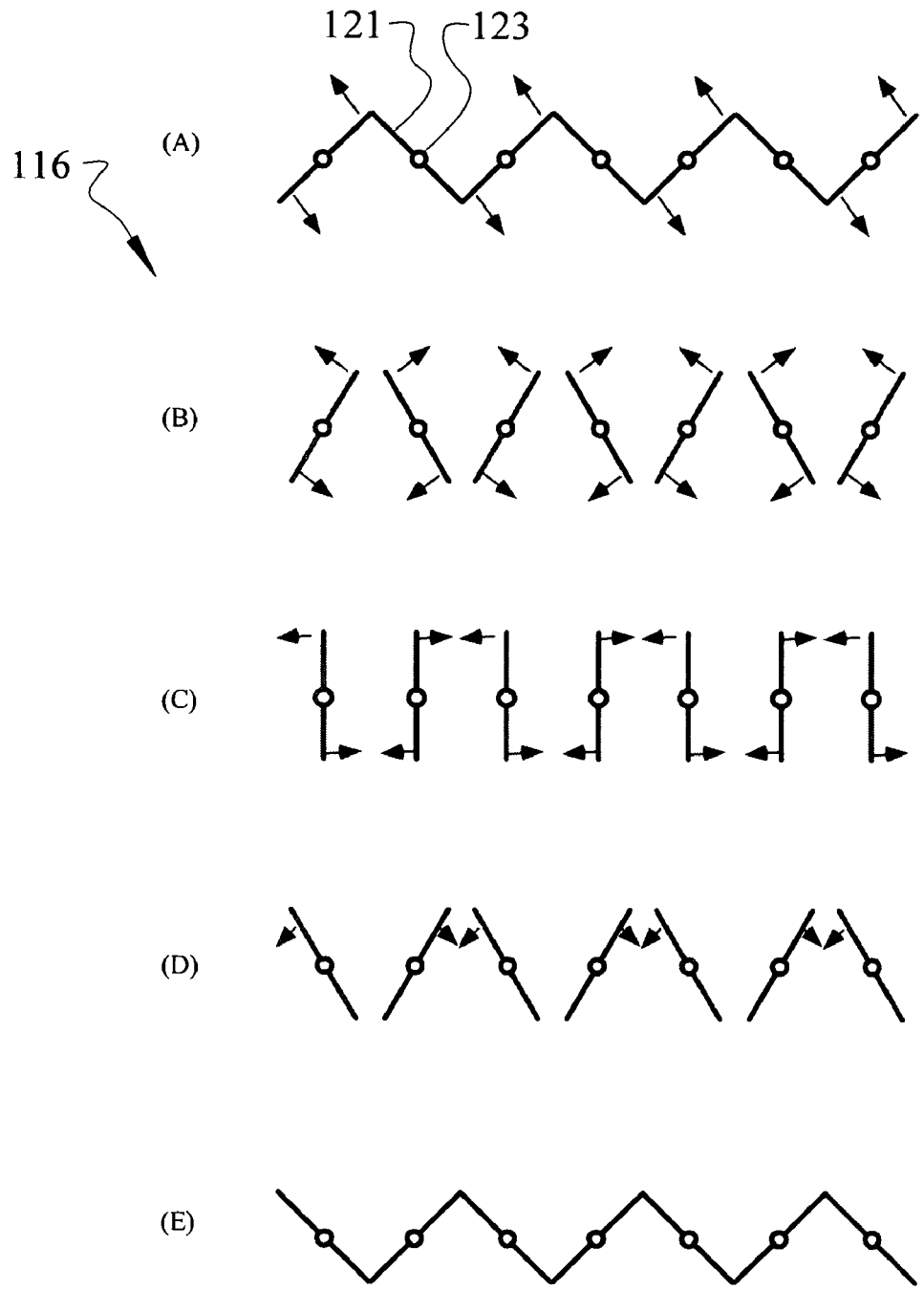
FIG. 23 shows in portions "A" through "E" a side plan view of the vane layer operation.
Figure 27:
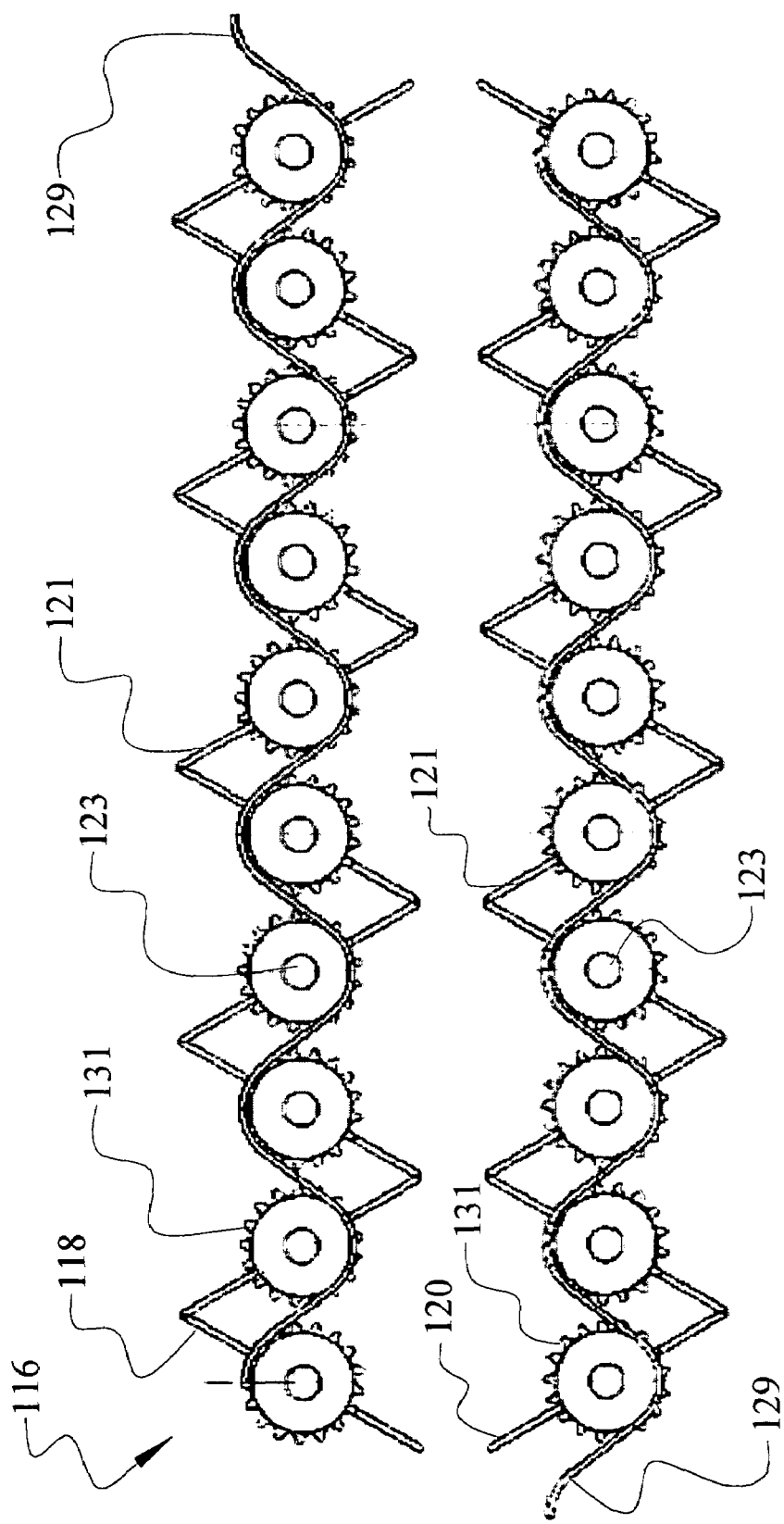
FIG. 27 shows a schematic plan view of the discharge valves with chains and sprockets.
Figure 28:
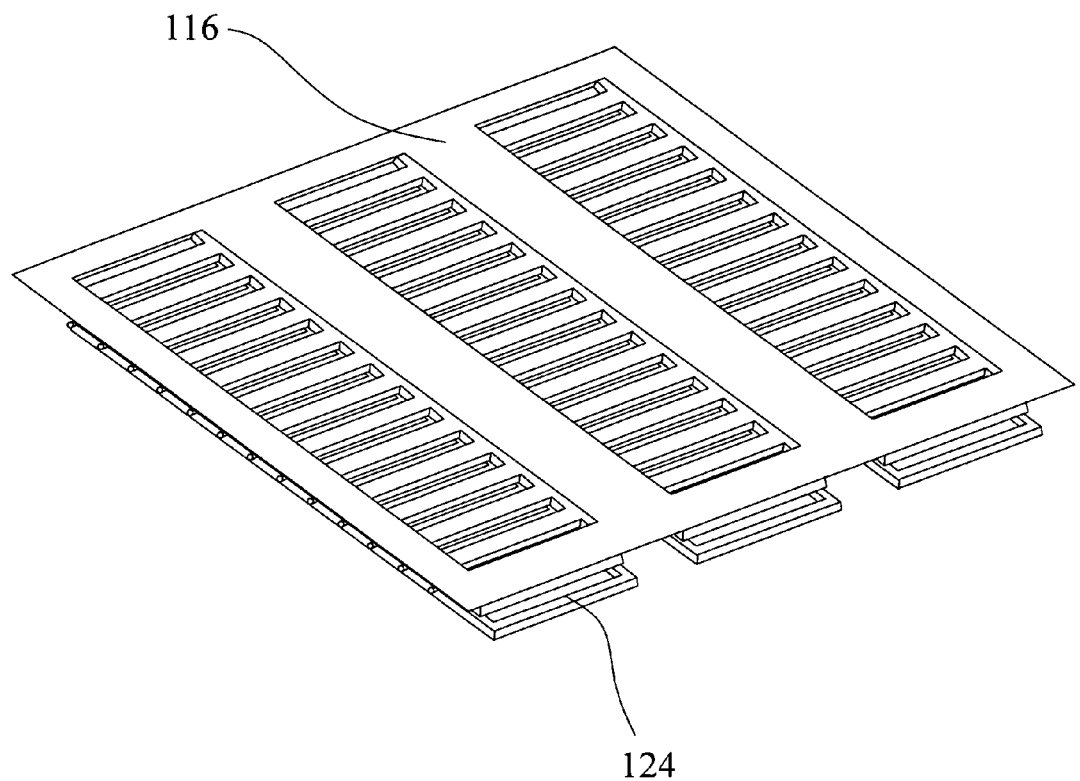
FIG. 28 shows a perspective view of the slat discharge valves.
Figure 35:
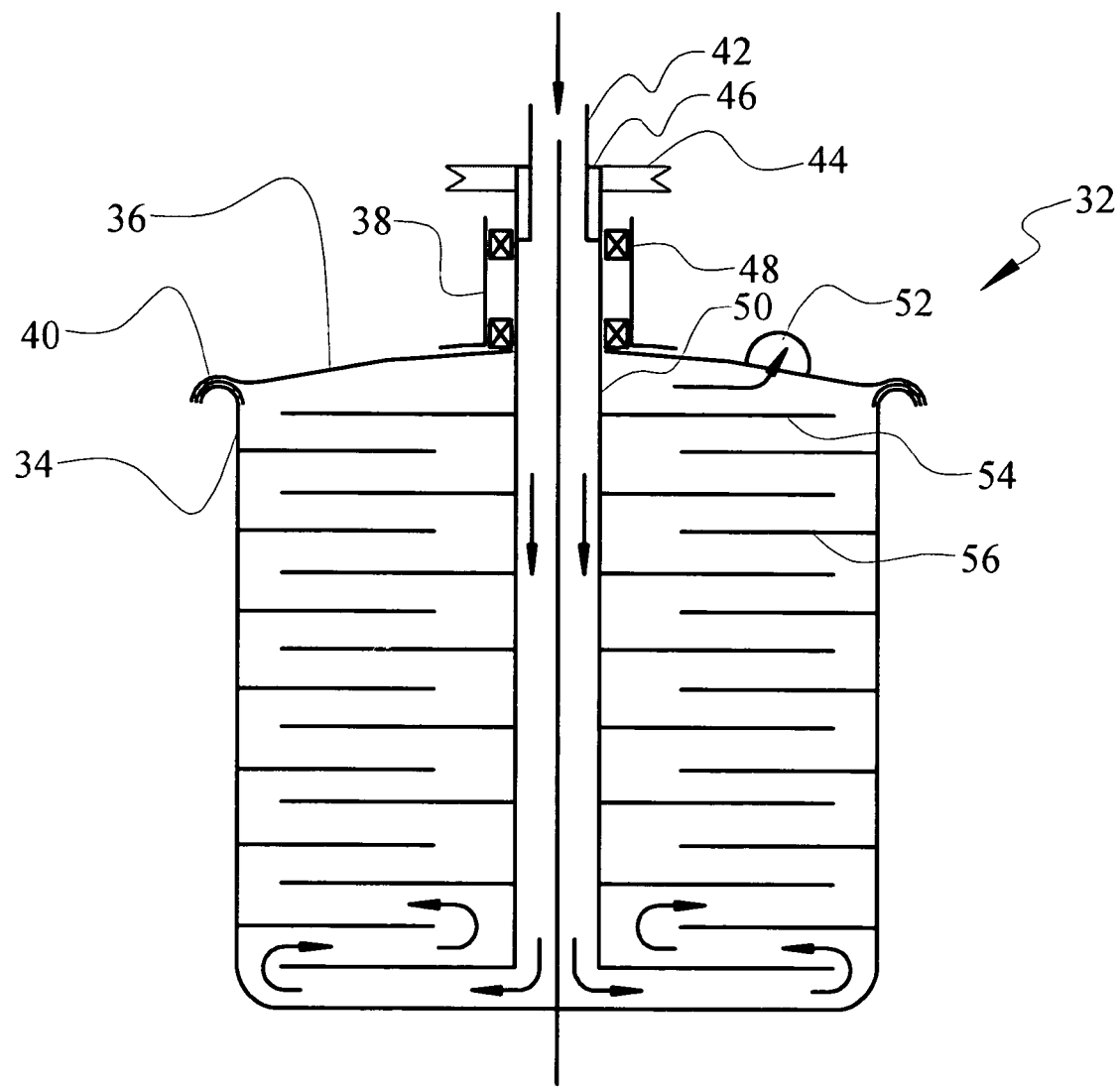
FIG. 35 shows a schematic cross sectional view of an embodiment of the pre-mixer.
Figure 36:
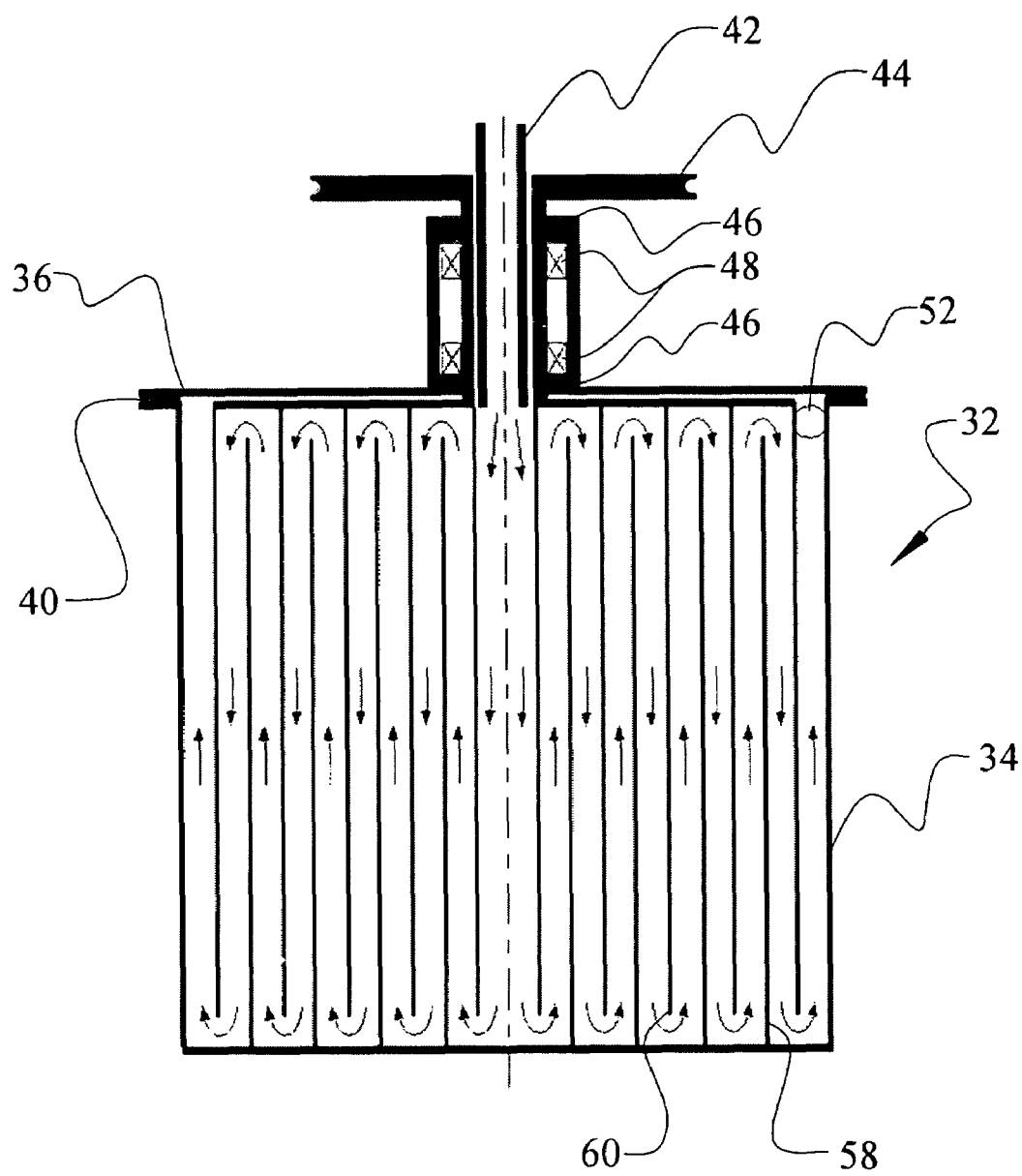
FIG. 36 shows a schematic cross sectional view of another embodiment of the pre-mixer.
Figure 37:
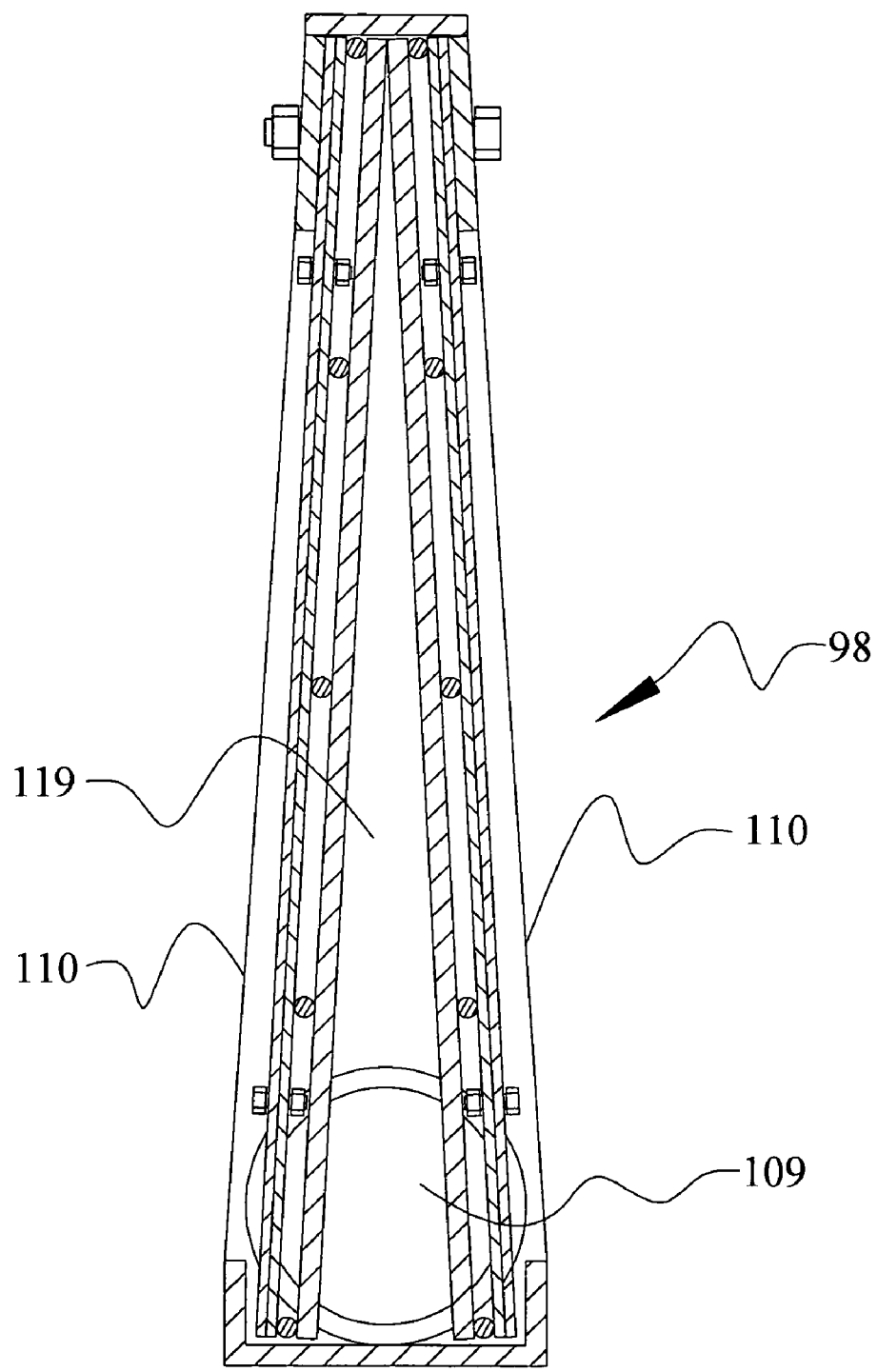
FIG. 37 shows a cross sectional view of the double sided vertical filter.
Figure 38:
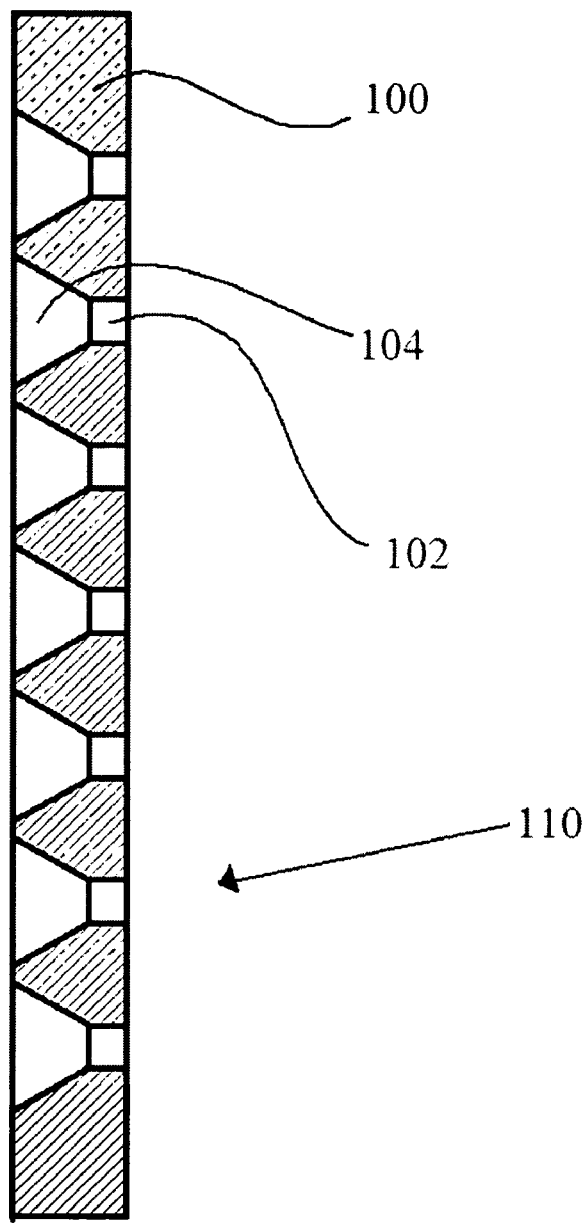
FIG. 38 shows a cross sectional view of the perforated metal sheet filter material.
Figure 39:
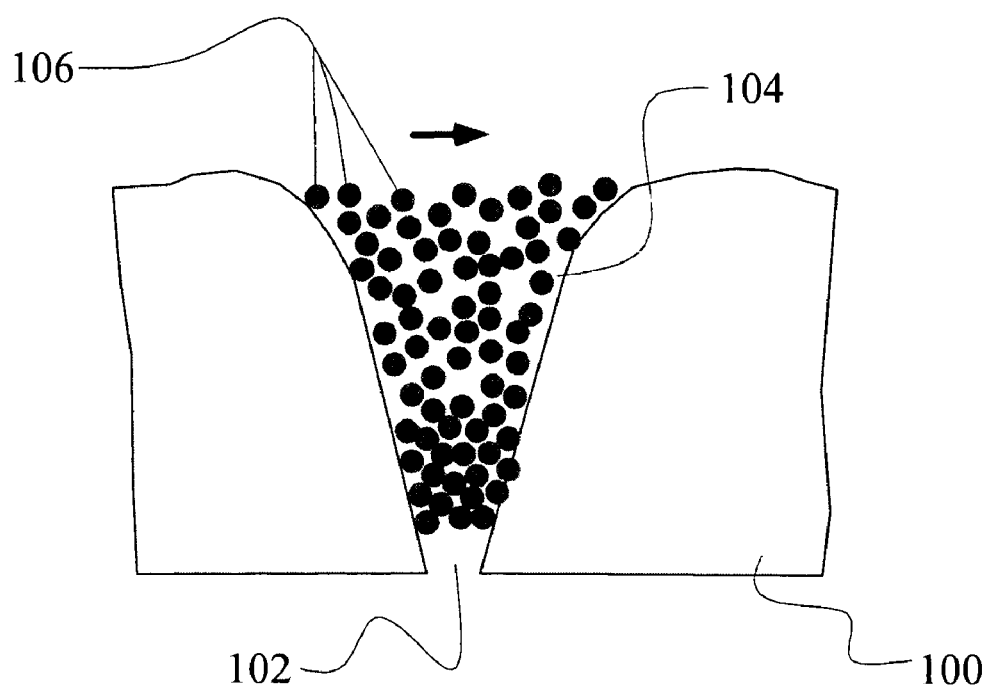
FIG. 39 shows a cross sectional view of the perforated metal sheet filter material with dome buildup.
Figure 45:
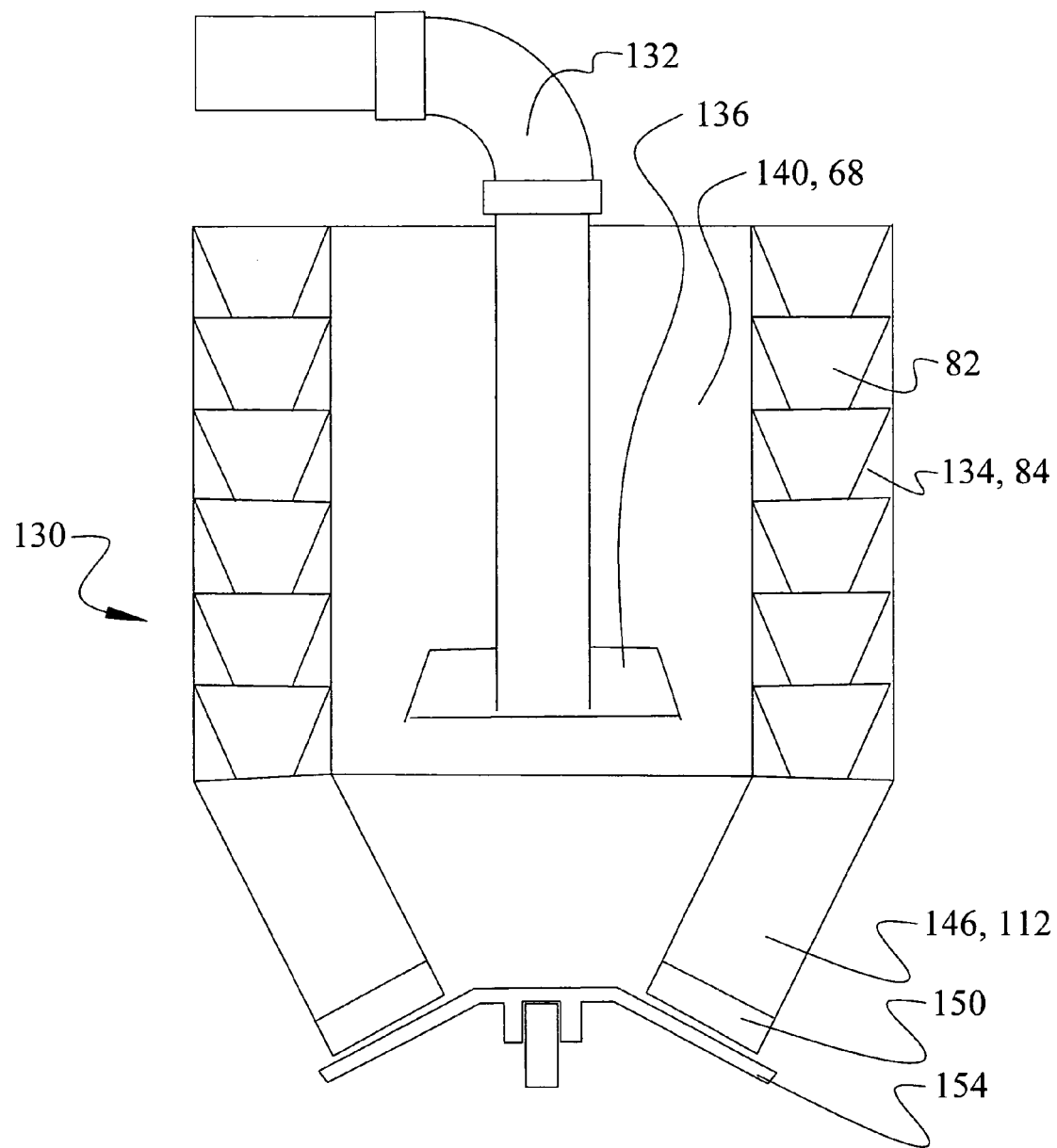
FIG. 45 shows a perspective view of an alternative embodiment multi-layer settling tank.
Figure 46:
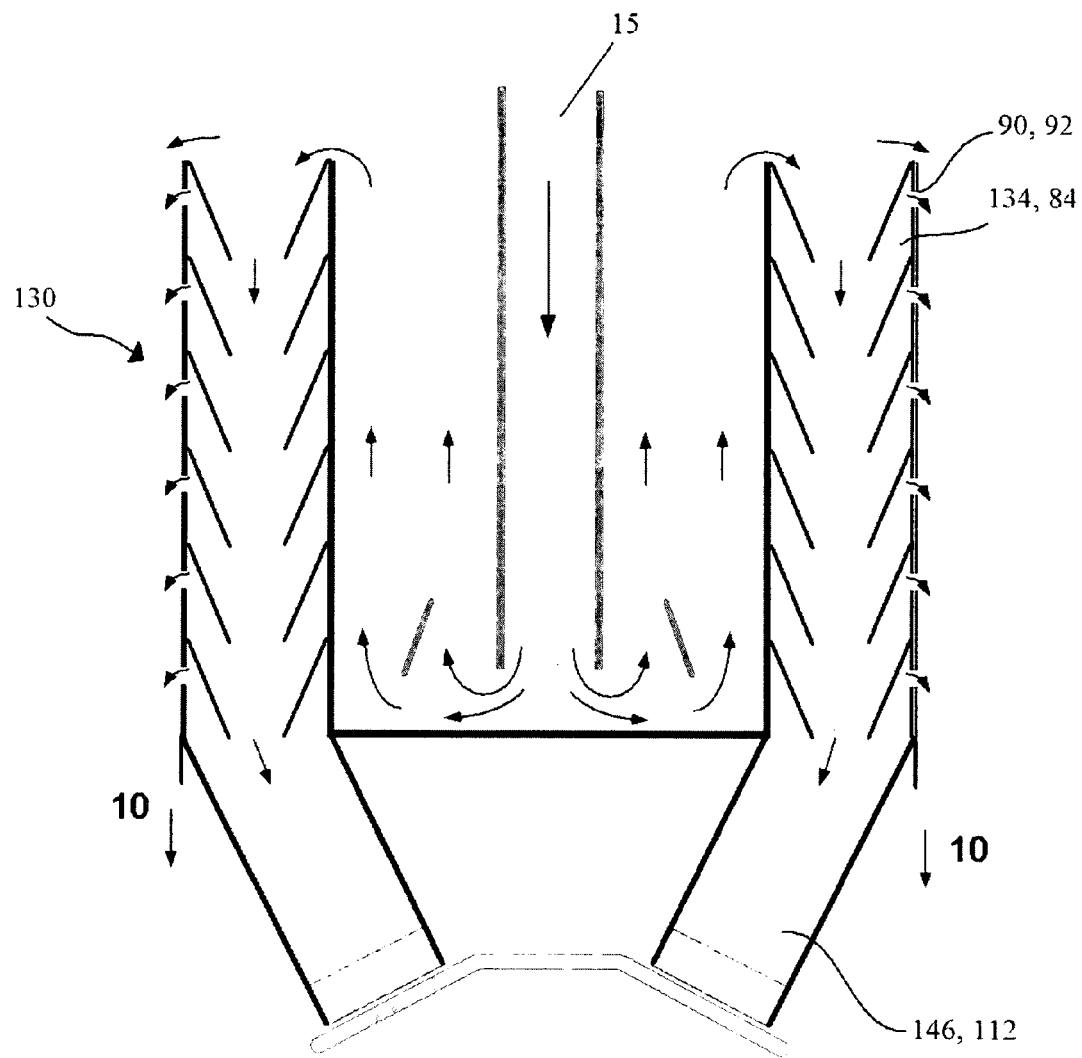
FIG. 46 shows a perspective view of an alternative embodiment multi-layer settling tank of FIG. 45 showing flow patterns.
Figure 47:
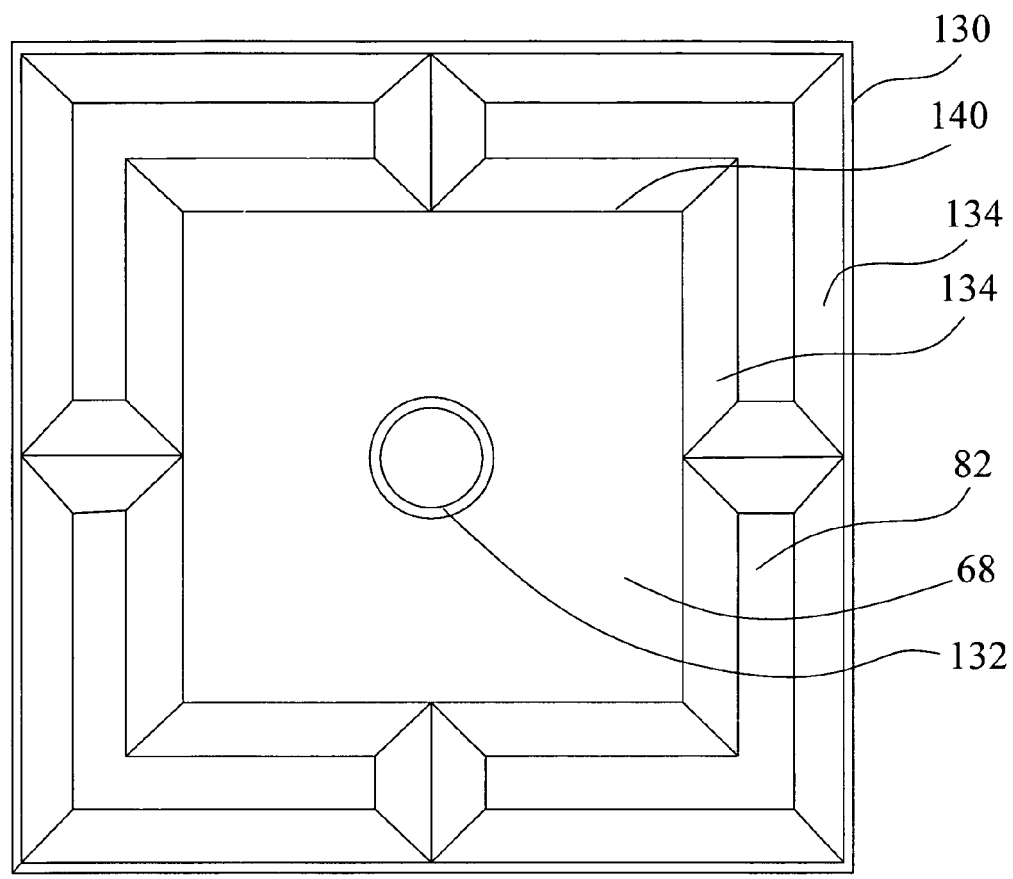
FIG. 47 shows a top plan view of the alternative embodiment multi-layer settling tank of FIG. 45.
Figure 48:
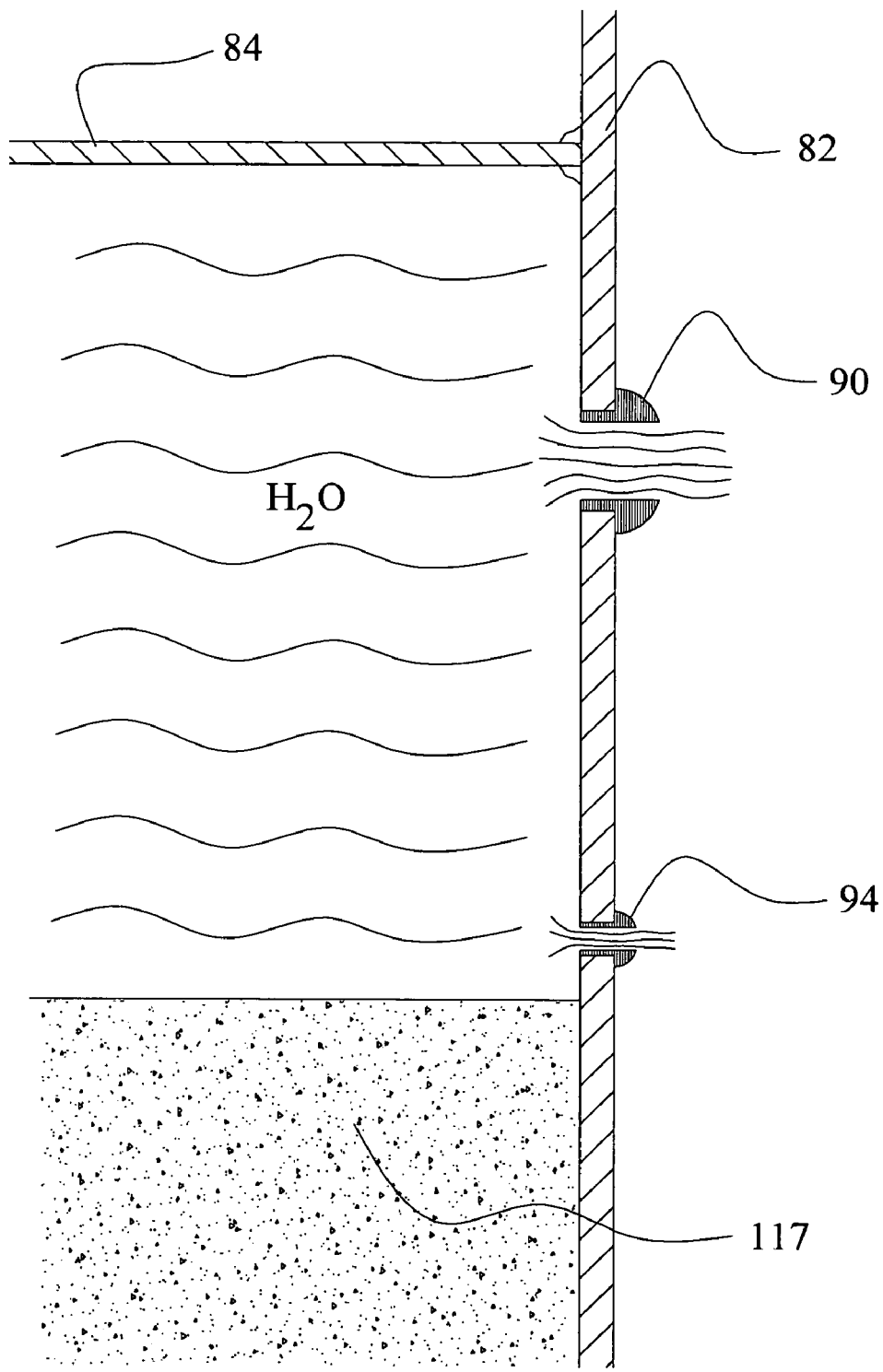
FIG. 48 shows a side plan cross sectional view of the trap pipe and control nozzle of an alternative embodiment.
Figure 49:
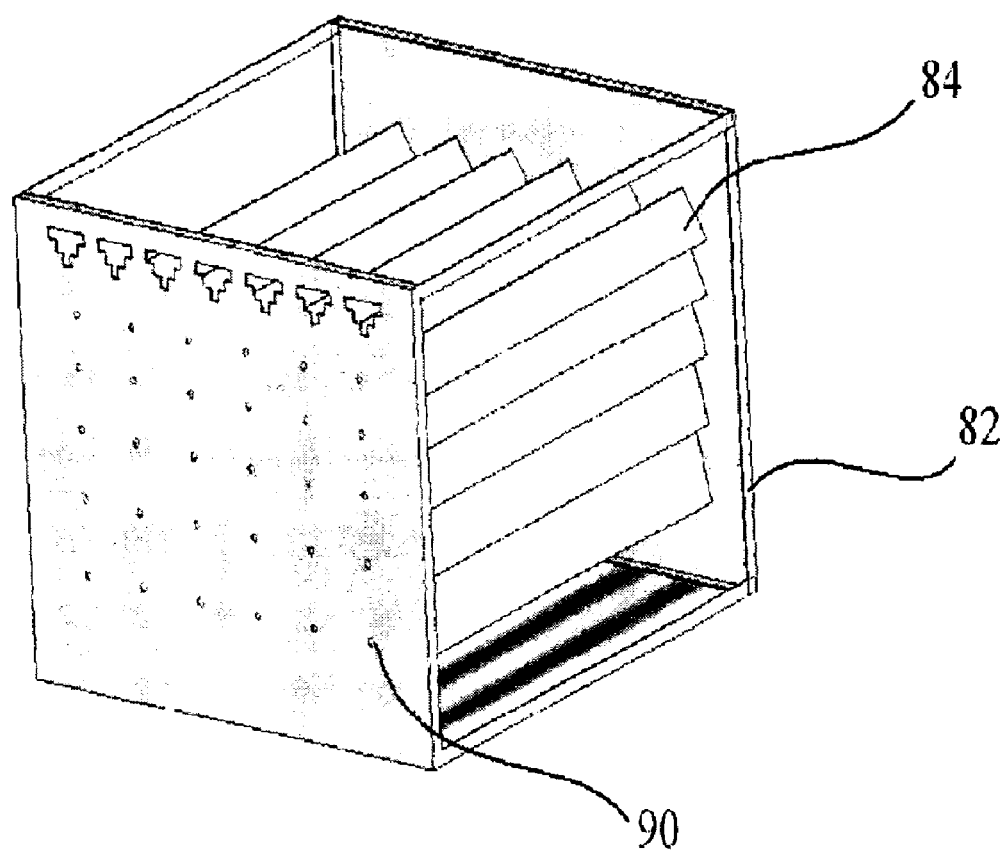
FIG. 49 shows a perspective view of a plurality of traps within the settling chamber of the preferred embodiment, further illustrating the trap pipe discharge.

Referring now to the drawings, there is shown in the FIGS. 1-10, 13-20, 23-27, 29-30, 35, 37, 40-44, and 49 a preferred embodiment of the settling grid separator apparatus 10, (FIGS. 9-12 having an alternative embodiment auger discharge chamber) and in FIGS. 11 & 12 alternative embodiment traps having convergent plates, and in FIG. 21 further alternative embodiment traps, and in FIG. 22 still further alternative embodiment traps, and in FIG. 28 alternative embodiment slat discharge valves, and in FIGS. 31-34 an alternative embodiment pre-mixer, and in FIG. 36 a further alternative embodiment pre-mixer, and in FIGS. 38 & 39 an alternative embodiment filter material and in FIGS. 45-47 an alternative embodiment multi-layer settling tank, and in FIG. 48 an alternative embodiment trap pipe with a control nozzle. There is provided an apparatus 10 and method of use for separating large volumes of suspended solids within a sludge stream 15 from the liquid or water carrier in an efficient and environmentally friendly way. The apparatus is especially suited for removal of lime ($Ca(OH)_2$) or manure sludge from lagoons for recycled use or proper disposal.

The present art, in a preferred embodiment as seen in FIGS. 1, 2, 4-6, 9, 10 & 30, comprises a dredge pipe 12 having an input sludge stream 15, a trash box 14, a flocculating agent 29 concentrate in a flocculating agent storage tank 31, a flocculating agent pre-mixer 32, a flocculating agent mix holding tank 62, a metering pump 64, a sludge-flocculating agent mixer 67, a reaction chamber 68, a settling chamber 82 having an upper or topmost portion 149 and a lower portion 151, a filter chamber 96, a liquid discharge outlet 111, a solids discharge chamber 112, a conveyor chamber 126, and a conveyor 127. Input sludge 15 enters the settling grid separator apparatus 10 and separated liquid, usually clarified water, exits the liquid discharge outlet 111 with solids having up to an 80% solids to liquid ratio exiting the solids discharge chamber 112.

The input sludge stream 15 is typically provided from the waste lagoon via a dredge such as the "Nessie" dredge from Keene Engineering of Chatsworth, Calif. Dredges are a staple item which are available from a plurality of manufacturers. The present art apparatus 10 will function with most any of the commercially available dredges provided that said dredges are able to pump lagoon sludge having a suspended solids content at a rate desired by the user of the present art.

Figure 4:
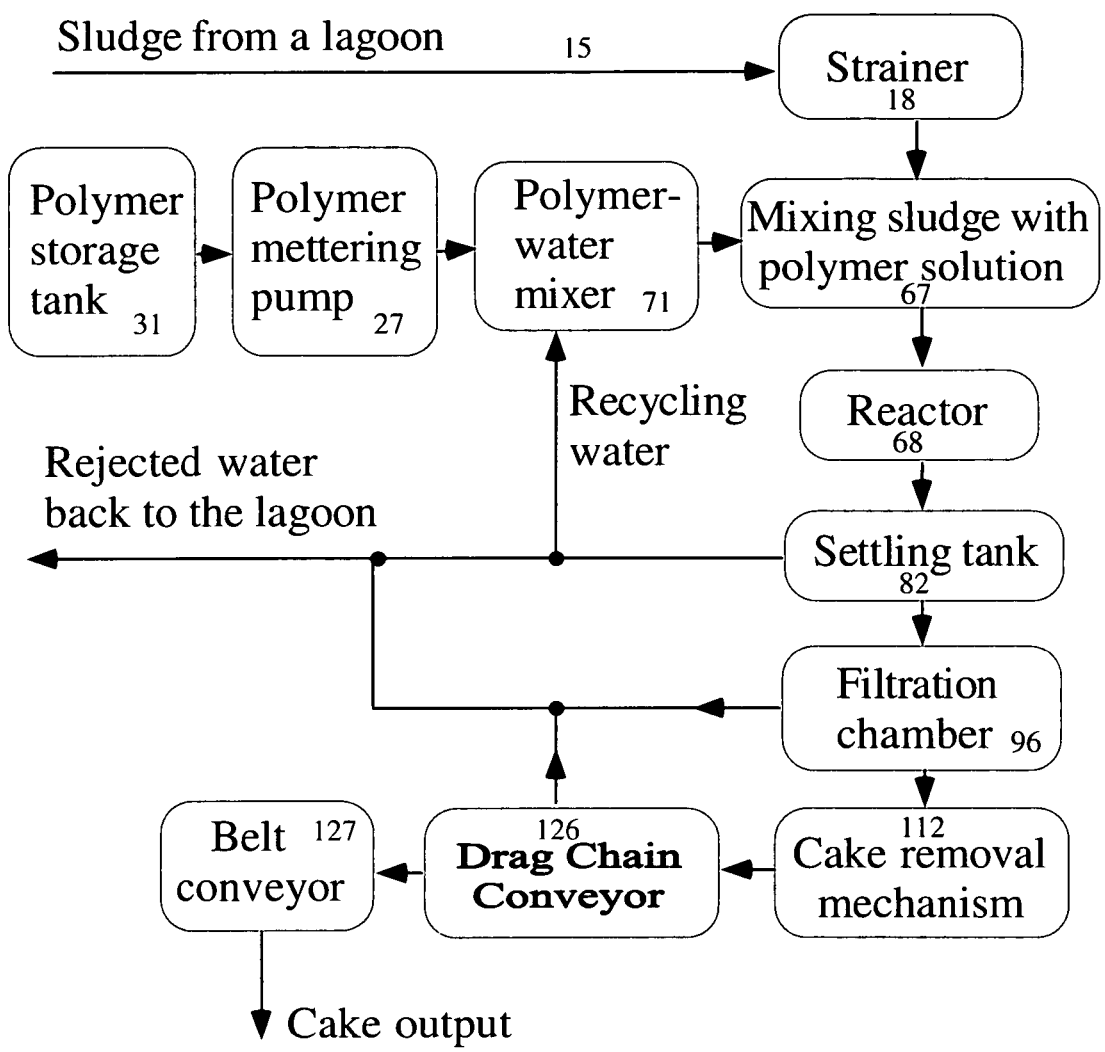
FIG. 4 is a schematic flow diagram of an embodiment of the settling grid separator apparatus.
Figure 29:
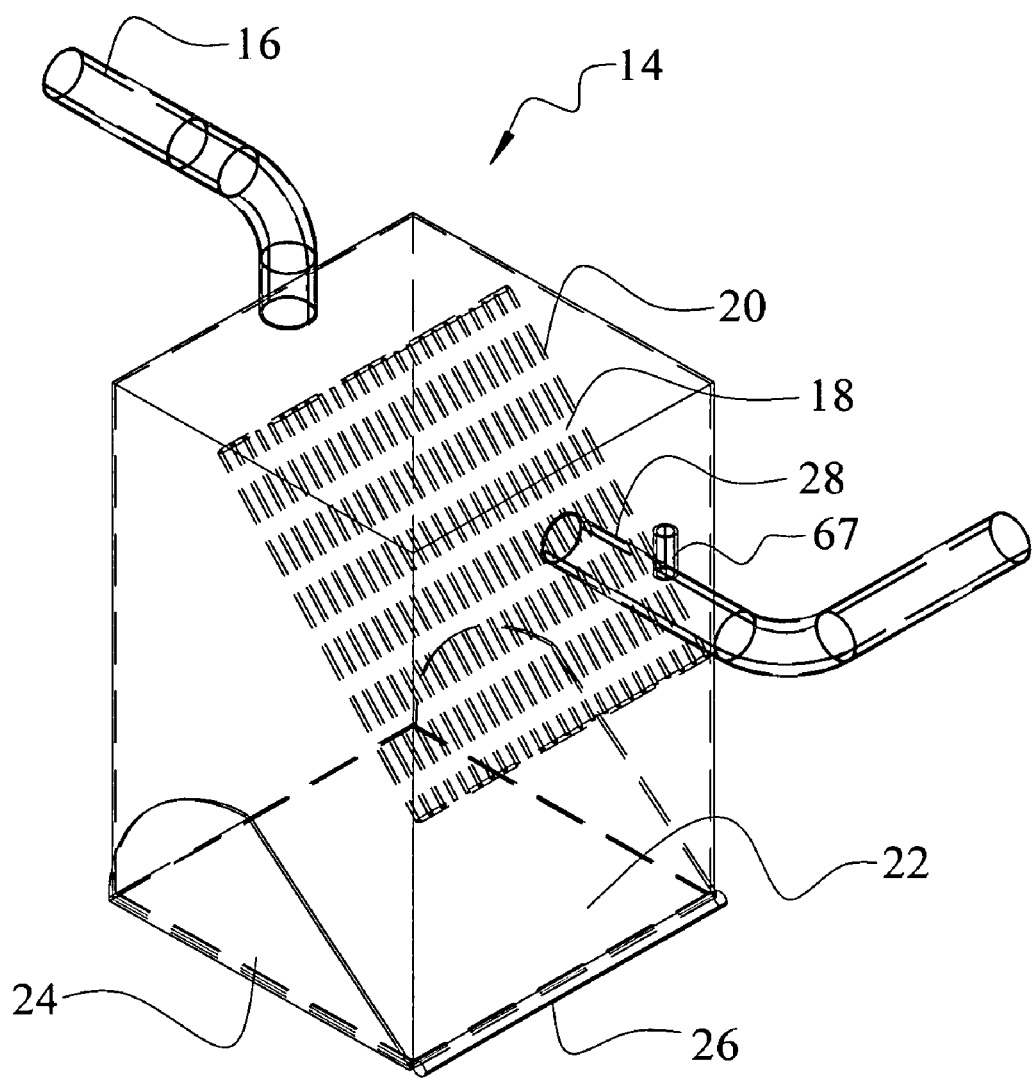
FIG. 29 shows a perspective x-ray view of the trash box.

In the preferred embodiment as seen in FIGS. 4 & 29, the sludge stream 15 first enters a trash box filter 14. Said trash box filter 14 serves to remove larger debris within the sludge stream 15, typically 1¼ inches in diameter and larger. The trash box 14 comprises a sludge feeding tube 16 or pipe, a strainer 18, and a sludge exiting tube 28 or pipe. Said strainer 18 is comprised of a plurality of substantially parallel strainer rods 20 in a preferred embodiment, but may take numerous forms in alternative embodiments, including but not limited to screens, filter media, or baffles. At the base of the trash box 14 is a dump tray 22 mounted upon an axle shaft 26 and having wings 24 to direct trash debris disposal in a single direction when the tray 22 is pivoted open on the axle shaft 26. Alternative embodiments may forego utilization of the dump tray 22 without departing from the scope and spirit of the present invention. The input sludge stream 15 enters through the sludge feeding tube 16 into the dump tray 22 and exits through the strainer 18 and sludge exiting tube 28 into the sludge-flocculating agent mixer 67. Alternative embodiments may utilize more than one trash box 14 or a manure trash trap which is commercially available from companies such as Jim Hodel Inc. of Roanoke, Illinios in conjunction with, in place of, or in parallel with said trash box 14. A parallel configuration provides the benefit of a single filter replacement or cleaning without interruption of sludge 15 processing.

Figure 30:
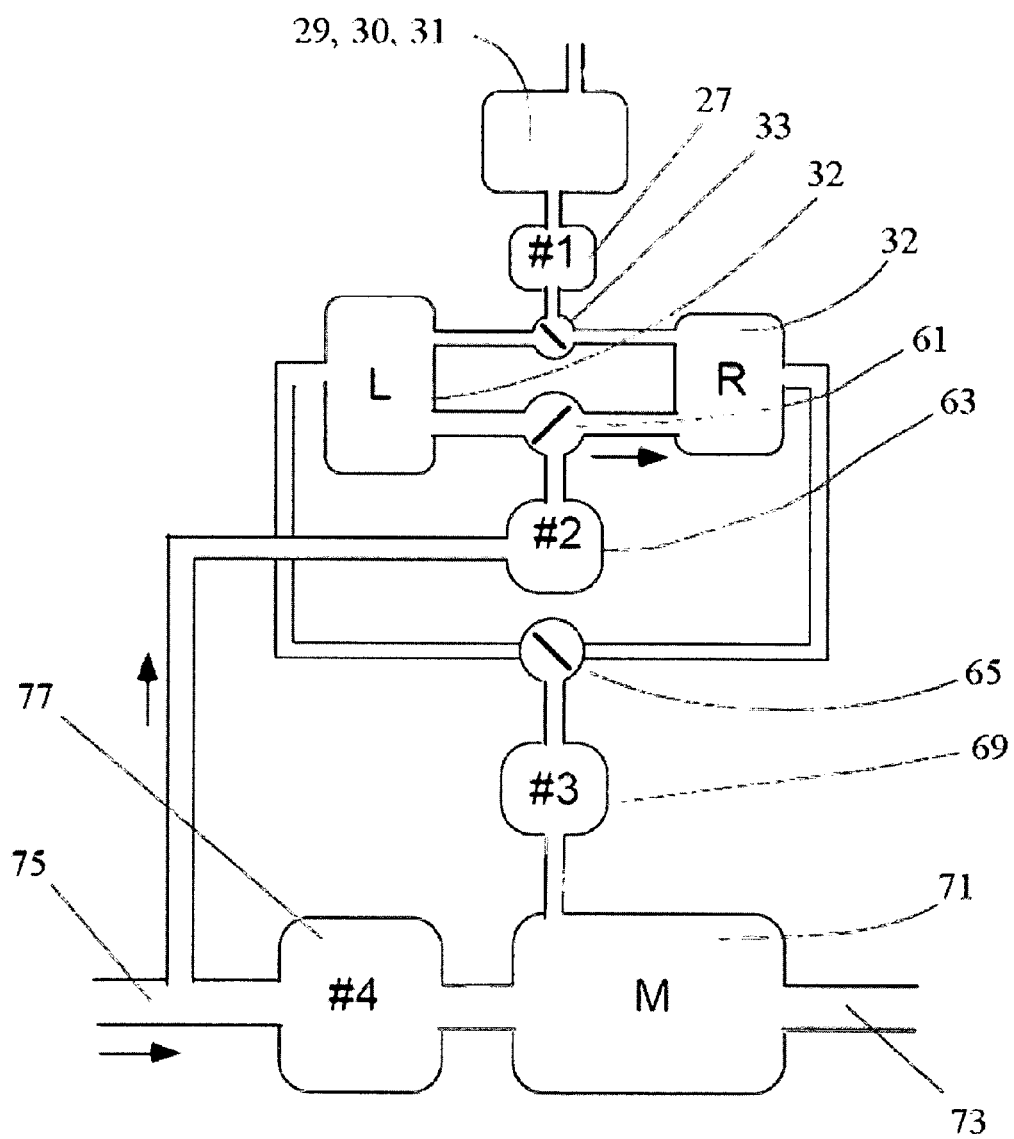
FIG. 30 shows a schematic representation of the flocculating agent mixing system.
Figure 31:
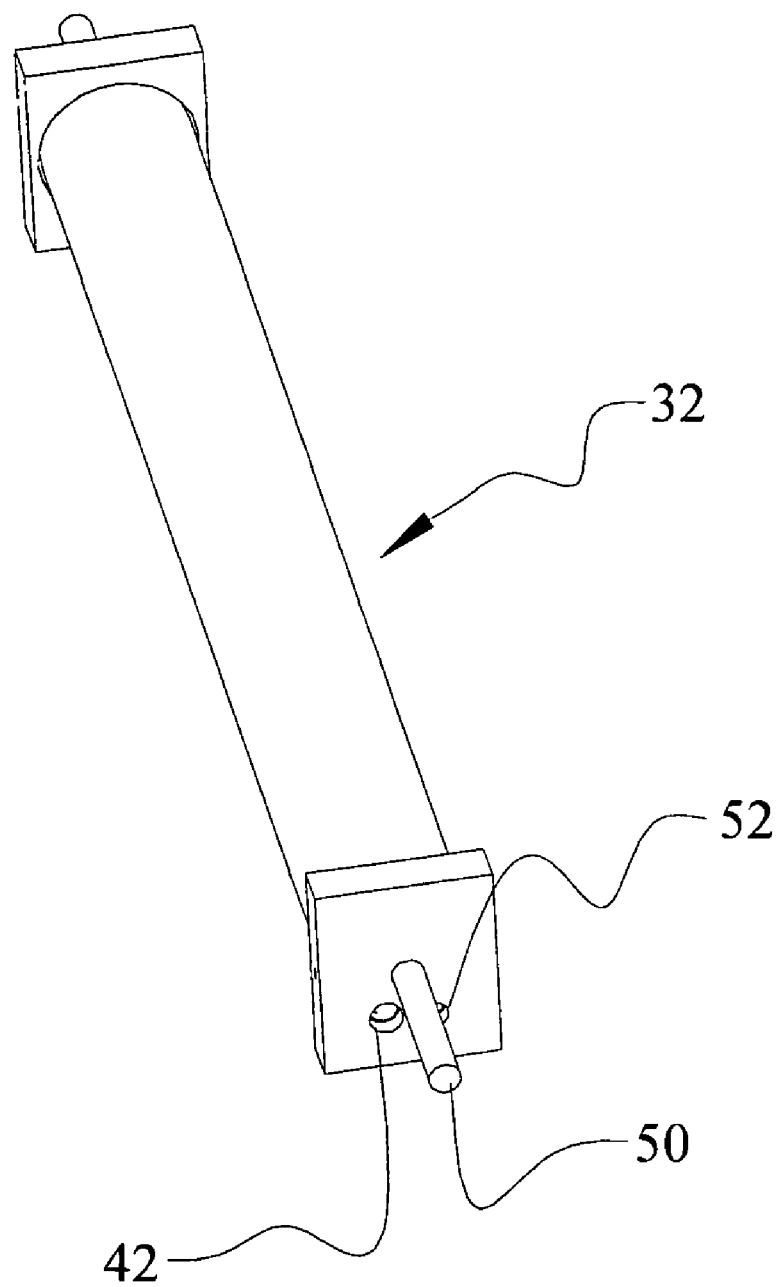
FIG. 31 shows a perspective view of an embodiment of the pre-mixer.
Figure 32:
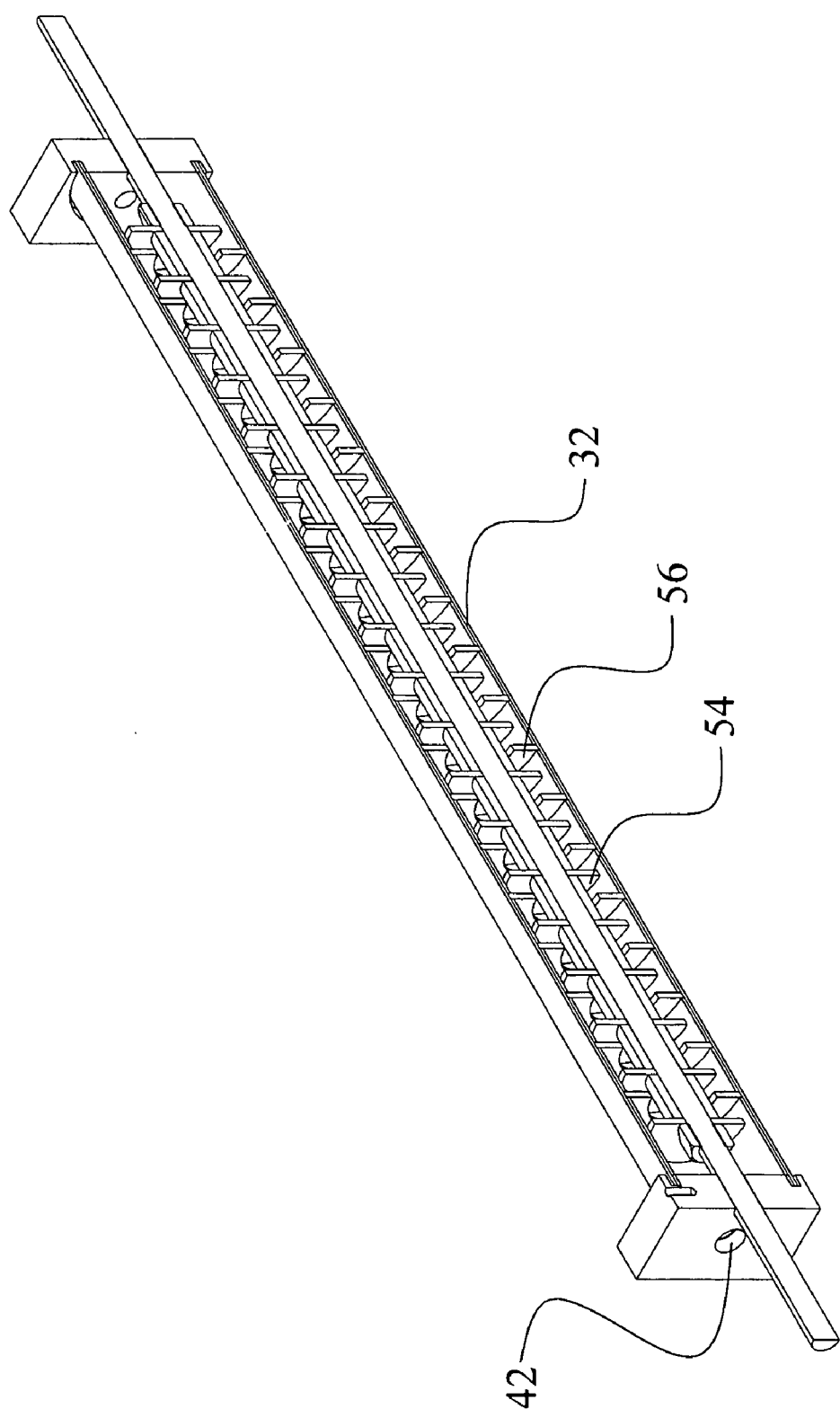
FIG. 32 shows a perspective cross sectional view of an embodiment of the pre-mixer.
Figure 33:
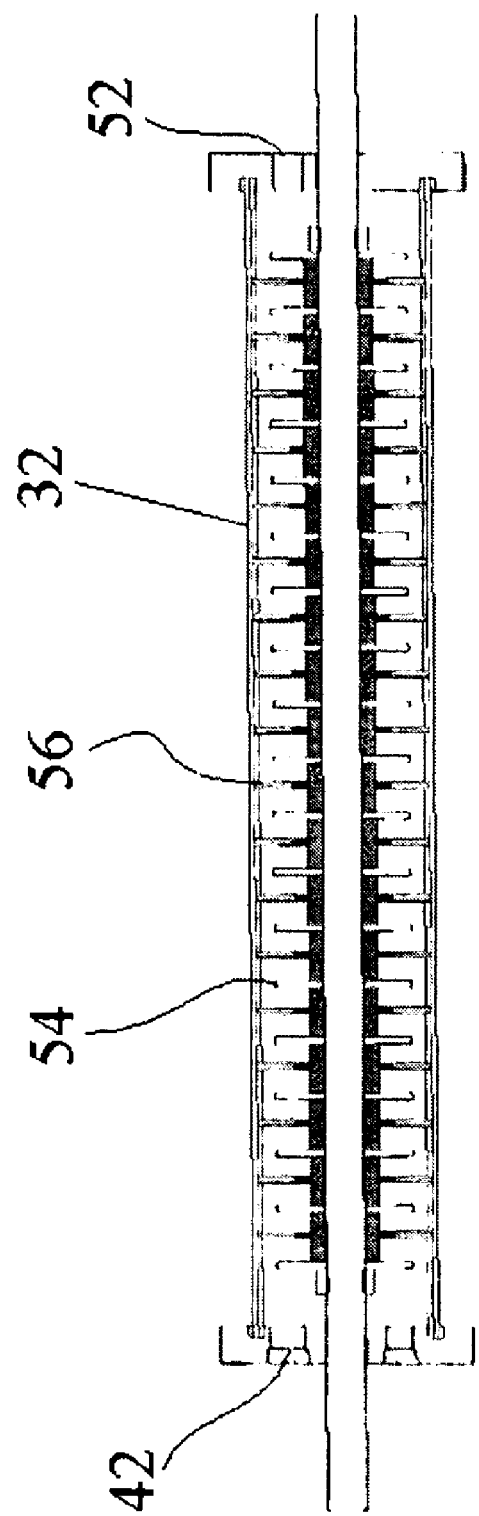
FIG. 33 shows a plan cross sectional view of an embodiment of the pre-mixer.
Figure 34:
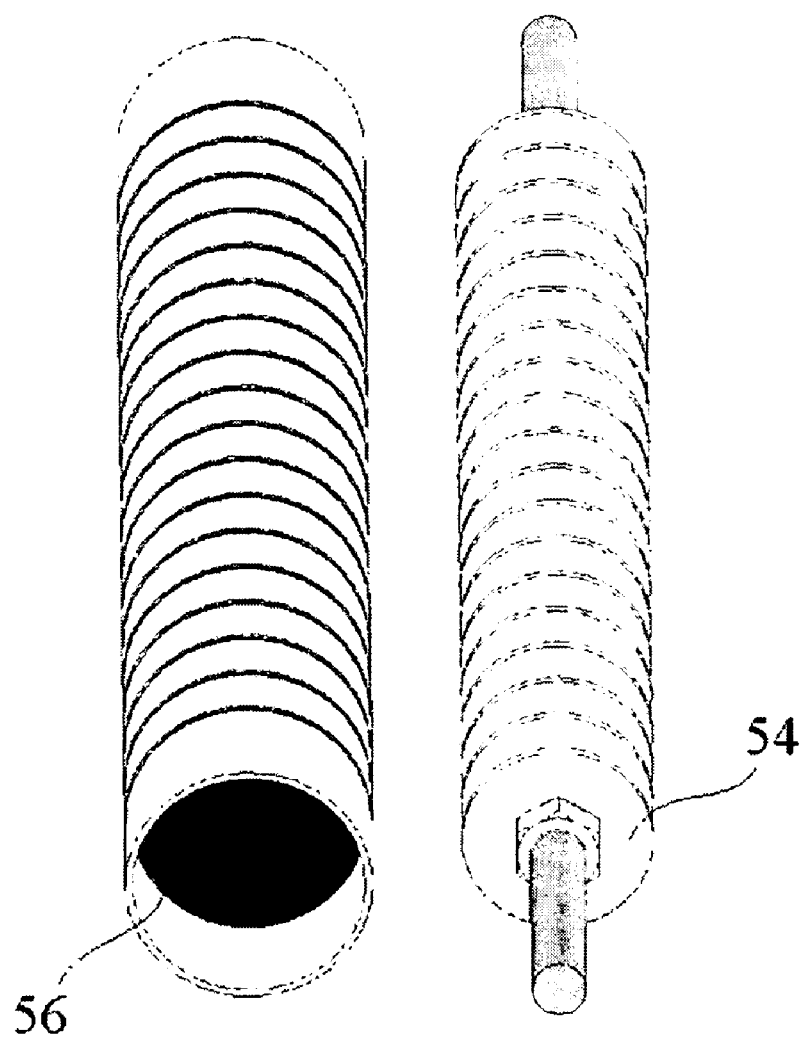
FIG. 34 shows a perspective view of the rotating discs and stationary discs of the pre-mixer.

The present art apparatus 10, as seen in FIGS. 4 & 30, introduces a flocculating agent 29 solution into the sludge stream 15 at the sludge-flocculating agent mixer 67 stage. Said sludge-flocculating agent mixer 67 stage is simply a position in the sludge stream 15 into which a wetted and properly mixed flocculating agent 29 is introduced prior to the reaction chamber 68. In a preferred embodiment, said flocculating agent 29 is a polymer 30 such as Magnafloc® 90L by Ciba® Specialty Chemicals of Basel, Switzerland or equivalent. Alternative embodiments may utilize a plurality of flocculating agents such as metal salts, natural and synthetic organic polymers, or combinations thereof. The flocculating agent 29 serves to coagulate or flocculate suspended solids within the filtered sludge stream 15 and allow said solids to more easily form a sediment or precipitate from liquid suspension under proper non-turbulent conditions as provided by the present art. That is, as the coagulated or flocculated solid particles become larger, the gravitational terminal velocity increases, typically more than 10 mm/sec, thereby more easily forming a sediment or precipitate. The flocculating agent 29 as specified, or equivalents thereof, are environmentally benign agents which quickly decompose when exposed to atmospheric conditions.

The flocculating agent 29 as specified is uniquely mixed in the present art apparatus via a two stage mixing process as seen in FIG. 30. That is, the flocculating agent 29 as received from the manufacturer is typically in a powder concentrate form. It must be mixed with a liquid, typically water, and allowed to cure or relax for approximately 20 minutes prior to use. Prior art techniques often directly mix the flocculating agent 29 with the sludge stream 15 and allow the combined mix to settle for a duration equivalent to said cure or relaxation time. The present art apparatus 10 overcomes the delays associated with the prior art by the aforesaid two stage mixing process.

In a preferred embodiment as seen in FIG. 30, the two stage mixing process, prior to introduction into the sludge stream 15, mixes one part of the flocculating agent 29 concentrate, typically a polymer 30, and ninety nine parts of water for 20 minutes resulting in a 1/100 polymer/water solution in the first stage and mixes one part of the prepared solution and 9 parts of water for 3 seconds resulting in 1/1000 polymer/water solution in the second stage. The resulting mix is then introduced and mixed at 4 parts of the 1/1000 solution and 96 parts with the sludge stream 15 resulting in a 40 ppm polymer/sludge mixture where the flocculation of polymersolid clusters and their sedimentation occur. As aforesaid, although the flocculating agent 29 is a polymer in the preferred embodiment, it may comprise a plurality of chemical formulations in alternative embodiments.

Figure 1:
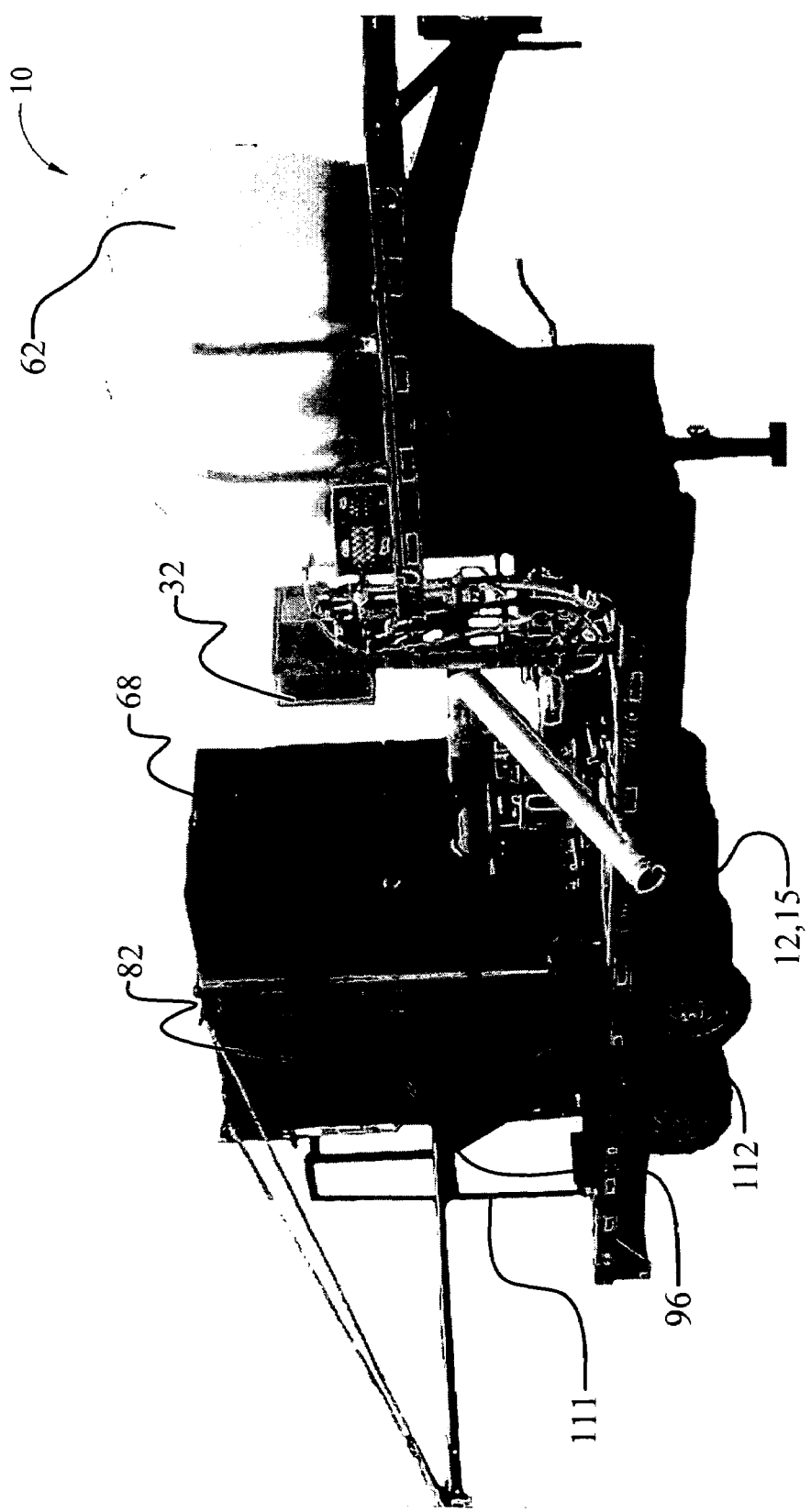
FIG. 1 is a perspective view of the settling grid separator apparatus showing the apparatus mounted upon a trailer utilizing a photograph as the only practicable medium for illustrating the claimed invention as a whole pursuant to 37 CFR 1.84.
Figure 2:
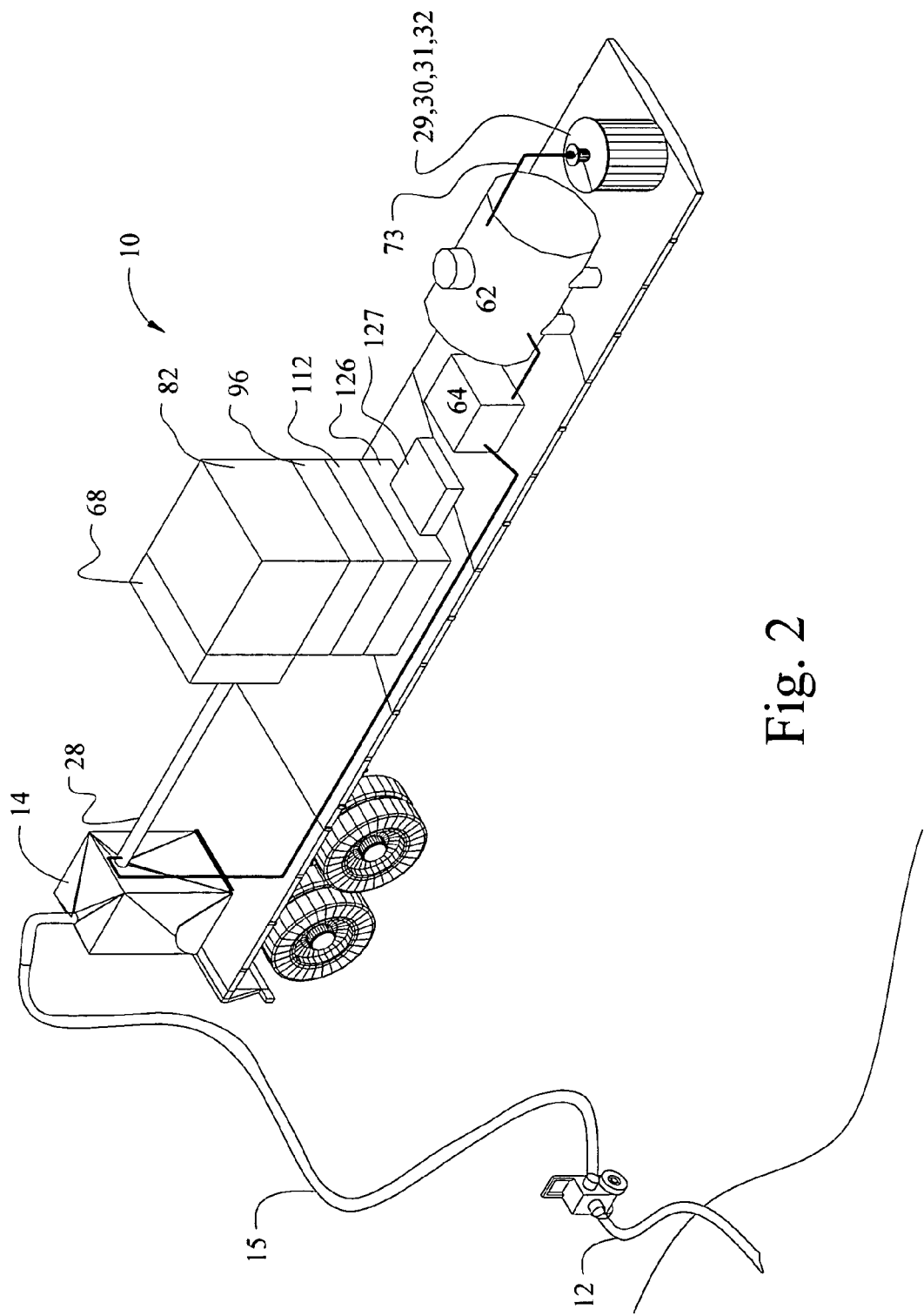
FIG. 2 is a perspective view of the settling grid separator showing the major elements thereof on a trailer.

In the preferred embodiment as seen in FIGS. 1, 2, 4, 5 & 30, the flocculating agent 29 or polymer 30 concentrate is transported by a constant flow rate agent pump 27 from the flocculating agent storage tank 31, typically a commercial 55 gallon drum which is sufficient for 24 hours of apparatus 10 operation, alternatively into either a left or right flocculating agent pre-mixer 32. Simultaneously, a first constant flow rate water pump 63 supplies water into the same left or right pre-mixer 32. A variable flow rate mix pump 69 drives or transfers the resulting 1/100 polymer-water solution from the either left or right pre-mixer 32 into a passive mixer 71 or flocculating agent mix holding tank 62 into which water is also delivered by a second constant flow rate water pump 77. The resulting 1/1000 polymer-water solution goes through a pipeline to the sludge feeding system 73 and into the sludge-feeding pipe or sludge-flocculating agent mixer 67. Although not required in alternative embodiments, the aforesaid water is supplied and inflows through a water rejection system pipeline 75 which is taken from the water rejection system or liquid discharge outlet 111 of the apparatus 10. The preferred embodiment as seen in FIG. 30 utilizes switches or valves 33, 61, 65 to control flow of flocculating agent concentrate, water inflow, or mixed solution outflow. That is, a left/right input polymer 30 switch 33 is utilized to direct flocculating agent concentrate into each of the flocculating agent pre-mixers 32, a left/right input water switch 61 is utilized to direct water into each of the flocculating agent pre-mixers 32 and a left/right output polymers solution switch 65 is utilized to direct the premixed flocculating agent/water into the variable flow rate mix pump 69 for delivery into the passive mixer 71 or flocculating agent mix holding tank 62 as seen in FIGS. 1 & 2. The aforesaid switches or valves 33, 61, 65 allow simultaneous flocculating agent 29 two stage mixing and introduction to occur without delays in sludge stream 15 processing. The mixed polymer solution is typically made in 500 gallon batches and stored in a said tank 62 until it is slowly withdrawn and metered and mixed into the incoming sludge stream 15.

Unique to the present art is the aforesaid flocculating agent pre-mixer 32 which is capable of mixing the flocculating agent 29 concentrate with a wetting solution, typically water, without incurring damage to or breakup of the long chain flocculating agent concentrate molecules. That is, overly turbulent mixing of the flocculating agent 29 concentrate, typically a polymer chain molecule, will break up the long chain molecule into smaller components which are much less effective as a flocculating agent. In a preferred embodiment as seen in FIG. 35, said pre-mixer utilizes a stack of rotating discs 54 spaced about 1.5 inches apart and about 4.5 inches in diameter. The discs 54 typically rotate at about 700 rpm inside a pre-mixer container 34, typically a plastic pipe of 6 inch diameter, having stationary discs 56, typically having an outside diameter of 6 inches and an inside diameter of 3 inches. In the preferred embodiment, the rotating discs 54 are interleaved between said stationary discs 56. The rotating discs 56 spinning between the stationary discs 56 typically have a clearance of about 0.5 inch and create a great amount of turbulence due to the boundary layer adhesion yet not enough turbulence to separate the long chain molecular structure of the flocculating agent 29 concentrate.

In its preferred embodiment as shown in FIG. 35, the pre-mixer 34 further comprises a pre-mixer cover 36, pre-mixer bearing enclosure 38, pre-mixer cover seal 40, typically of a rubber like material, a pre-mixer inlet pipe 42 and outlet pipe 52, a pre-mixer pulley 44 which turns a pre-mixer shaft pipe 50 non rotationally connected with said inlet pipe 42 and on which said rotating discs 54 are mounted, a pre-mixer pipe seal 46, and one or more pre-mixer bearings 48. Said pre-mixer pulley 44 typically provides a 4 to 1 reduction for a 3600 rpm drive motor.

Alternate embodiments may utilize a plurality of stationary member within rotating member pre-mixer 32 configurations without departing from the scope of the present art. A first alternative embodiment as shown in FIG. 36 utilizes one or more rotating cylinders 60 rotating within one or more stationary cylinders 58. Further alternative embodiments may also utilize combinations of the preferred and first alternative embodiments as seen in FIGS. 31-34.

Figure 5:
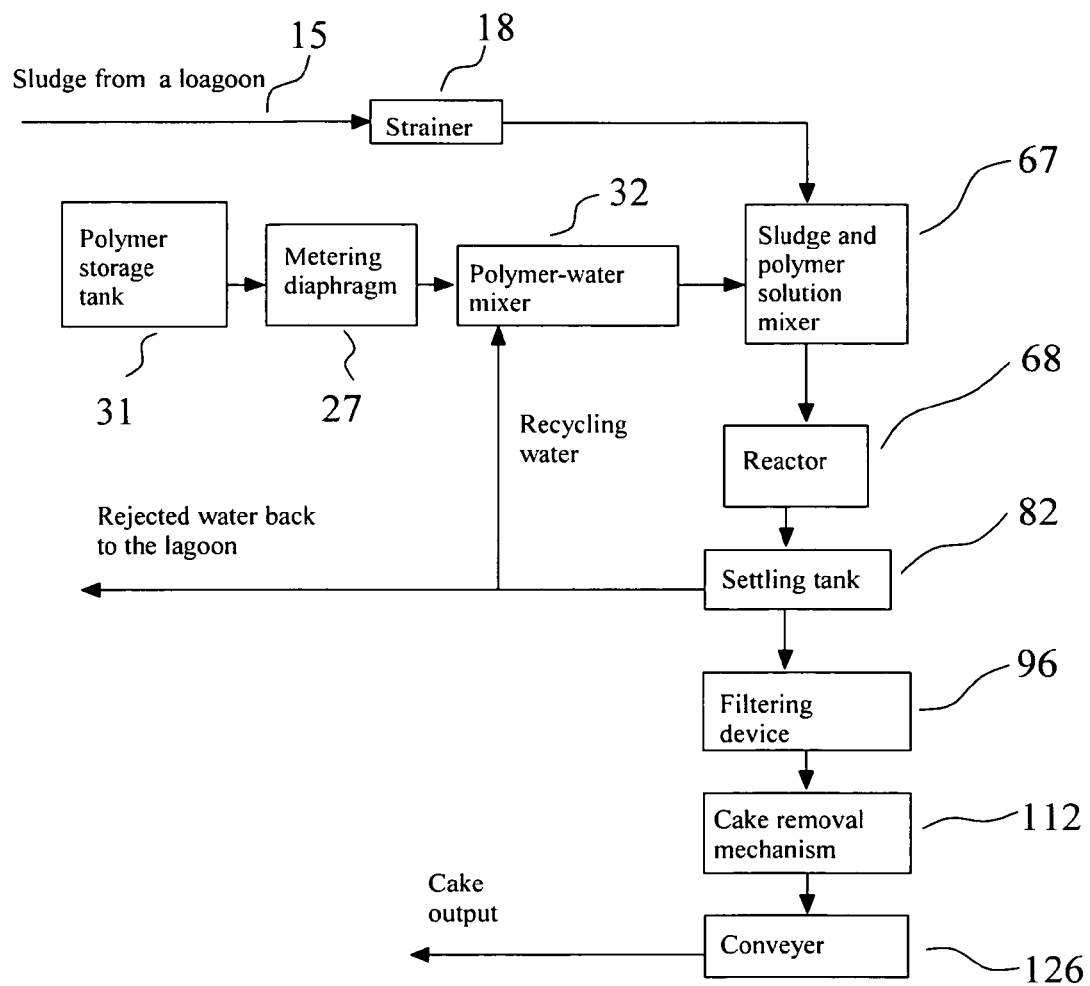
FIG. 5 is another schematic flow diagram of an embodiment of the settling grid separator apparatus.
Figure 6:
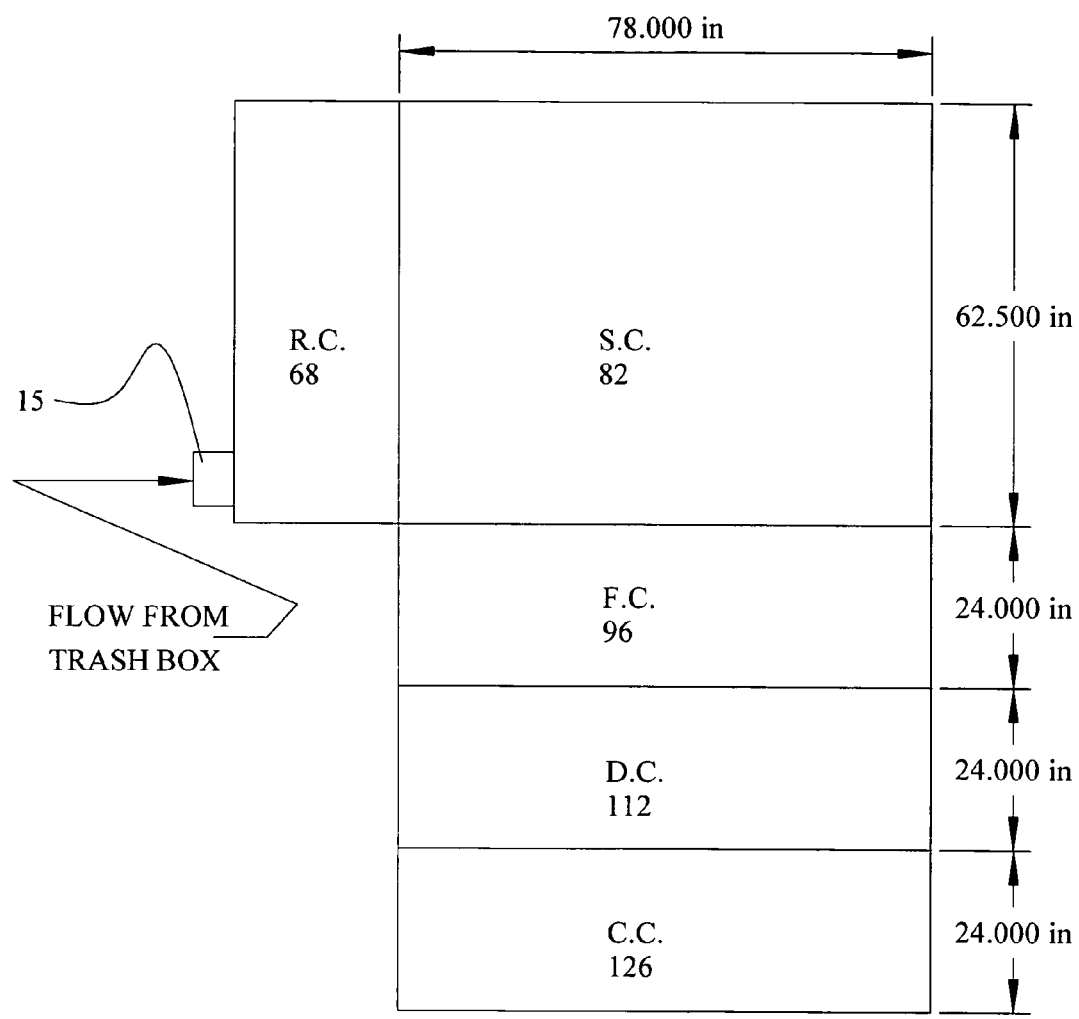
FIG. 6 is an external plan view of the reaction chamber, settling chamber, filter chamber, discharge chamber and conveyor chamber.
Figure 7:
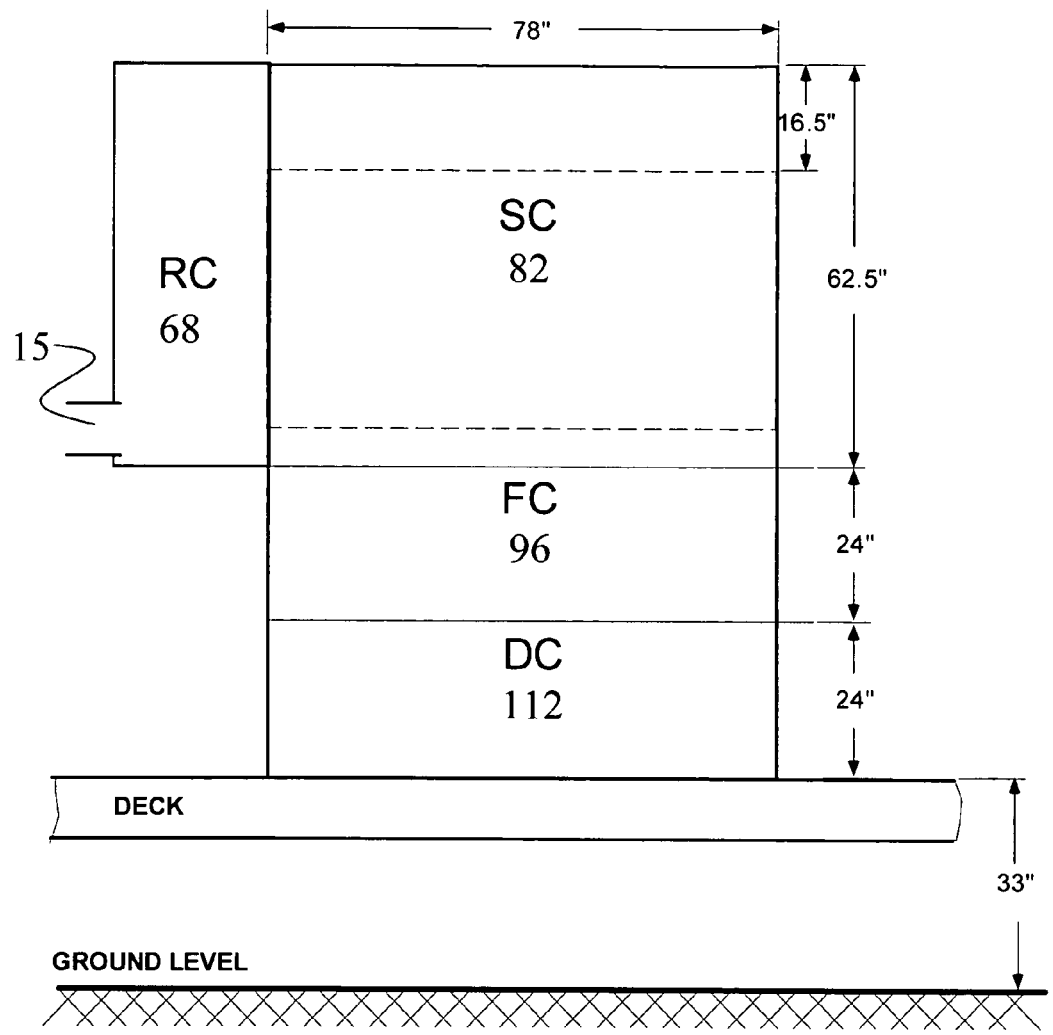
FIG. 7 is another external plan view of the reaction chamber, settling chamber, filter chamber, discharge chamber and conveyor chamber.
Figure 8:
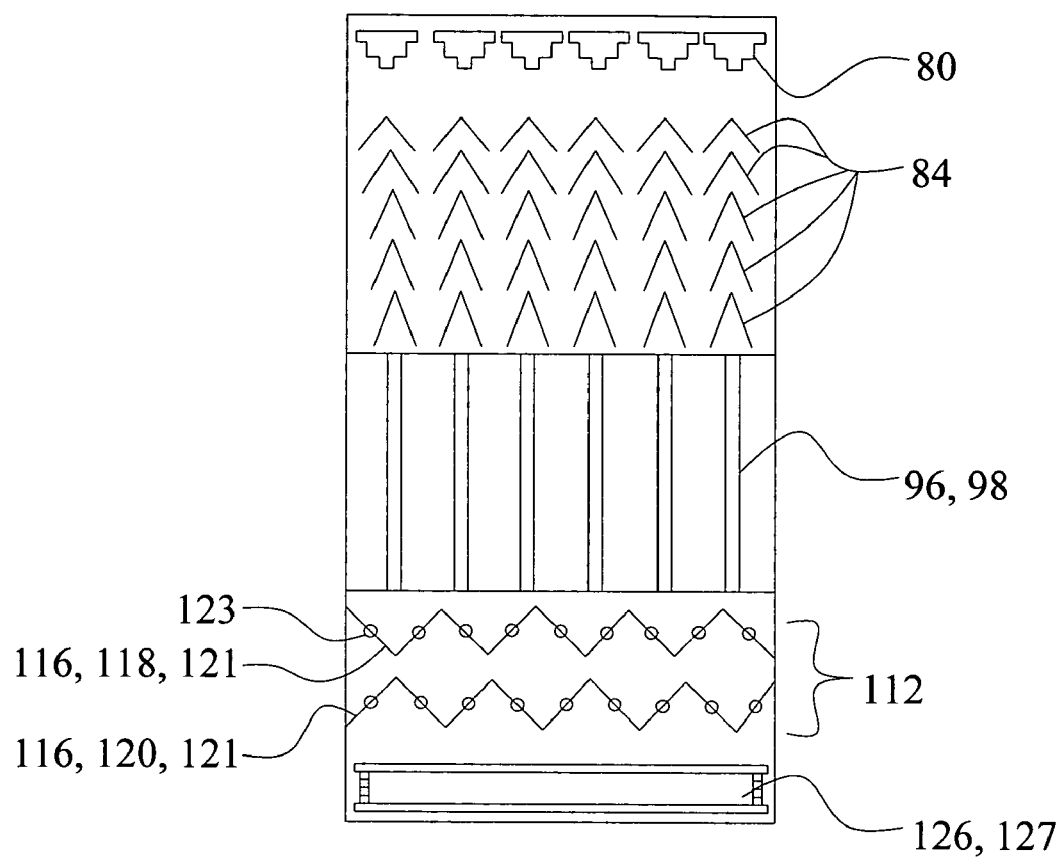
FIG. 8 is an internal cross sectional view of the settling chamber, filter chamber, discharge chamber and conveyor chamber.
Figure 40:
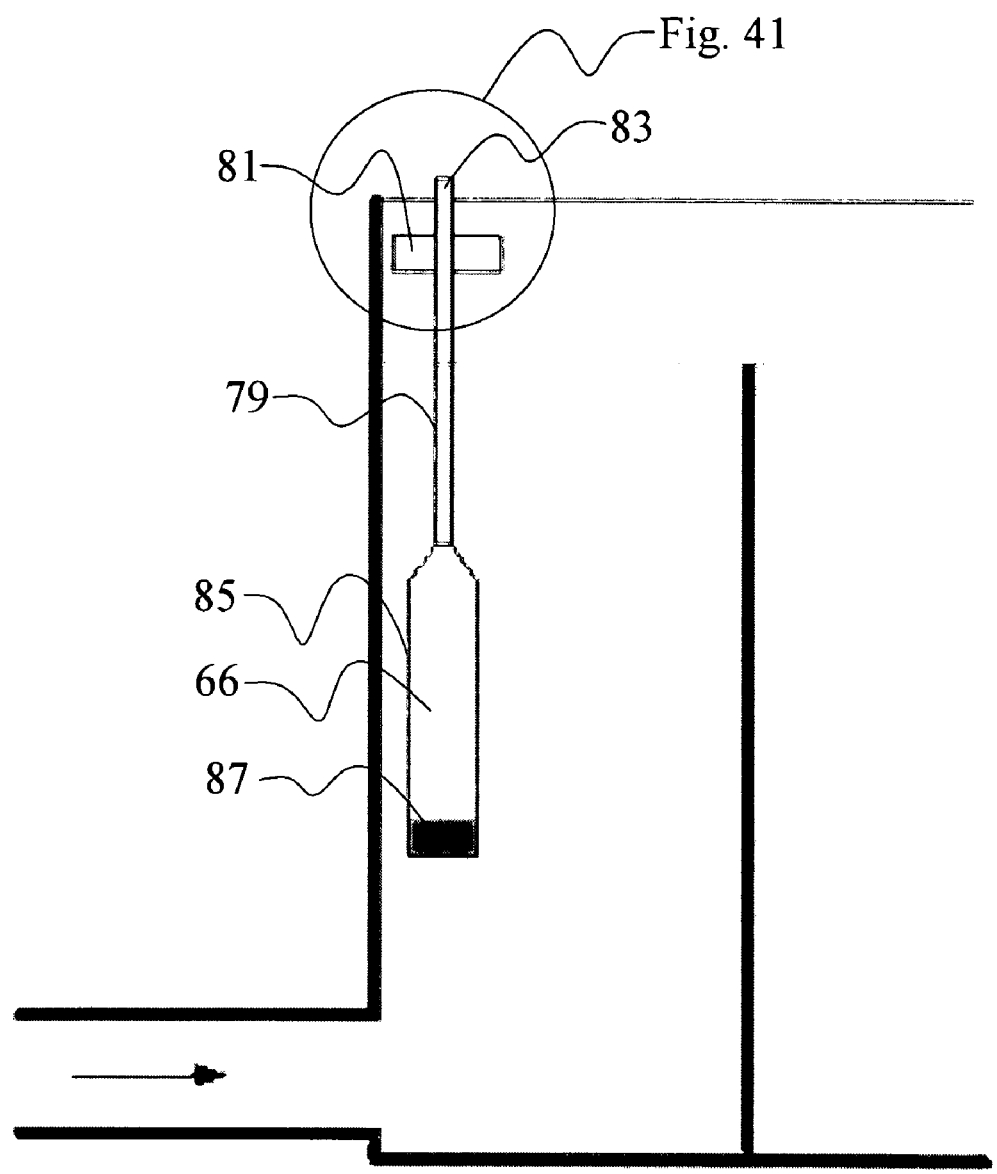
FIG. 40 shows a schematic cross sectional view of the densitometer.
Figure 41:
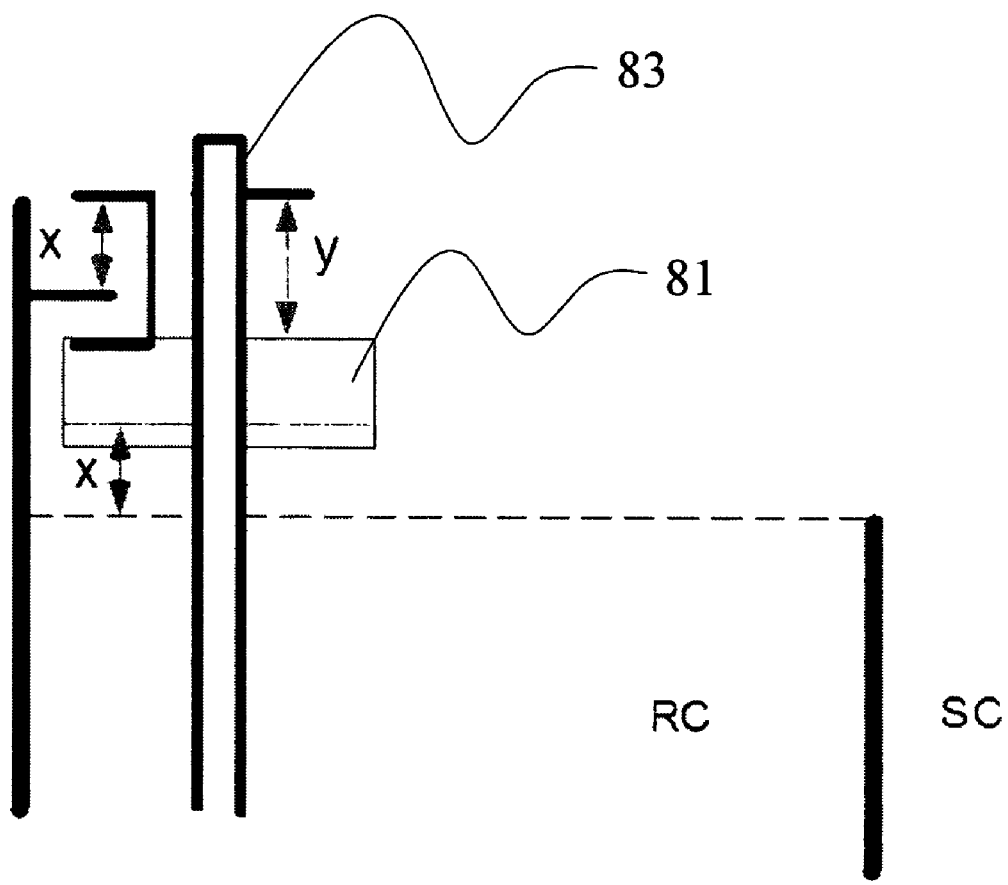
FIG. 41 shows a schematic cross sectional view of the upper portion of the densitometer.
Figure 42:
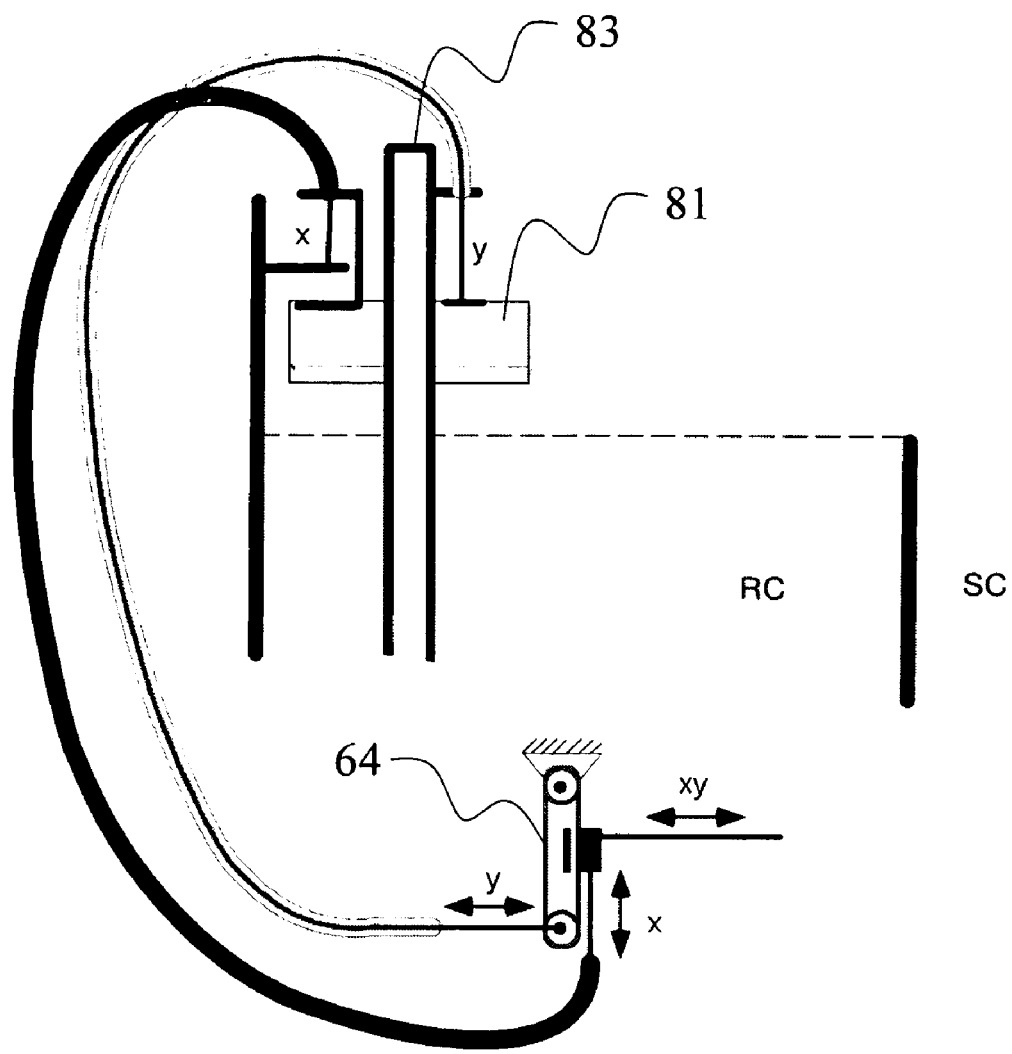
FIG. 42 shows a schematic cross sectional view of the upper portion of the densitometer with schematic representation of $\Delta x$ and $\Delta y$ error control signals providing metering pump control.
Figure 43:
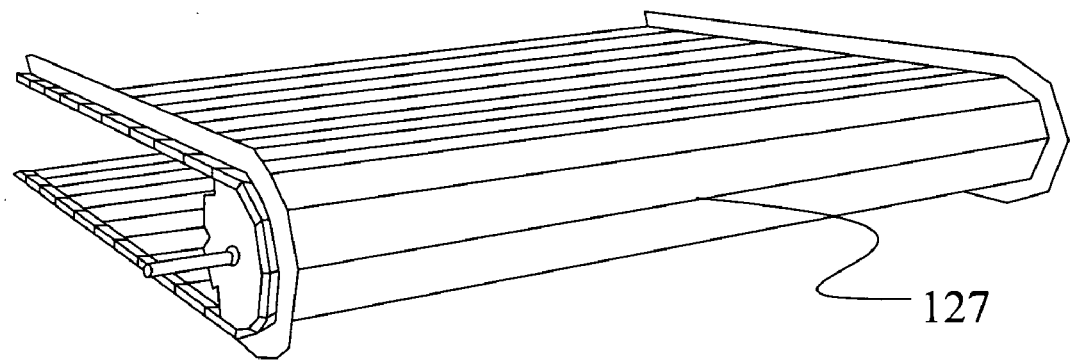
FIG. 43 shows a perspective view of the conveyor.
Figure 44:
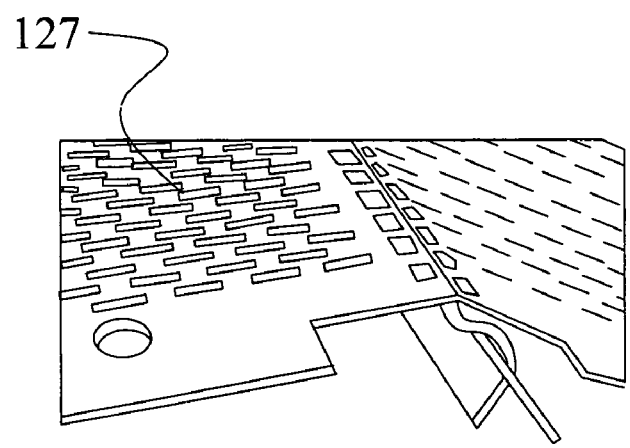
FIG. 44 shows a perspective view of the conveyor showing the perforations in the belt.

The final flocculating agent 29 mix as stored within the flocculating agent mix holding tank 62 is transferred to the sludge-flocculating agent mixer 67 as seen in FIGS. 4 & 5 via a metering pump 64 as seen in FIG. 2 which is, in a preferred embodiment, controlled via a volume flow and density sensor 66 as seen in FIGS. 40-42. That is, said sensor 66 monitors the solids density of the sludge stream 15 and injects the proper amount of flocculating agent 29 mix via the metering pump 64 into said mixer 67. Said sensor 66 may utilize a plurality of methods and techniques to determine flow and density including but not limited to densitometers and floats, ultrasonic and electromagnetic sensors, including doppler sensors, and radiation sensors which incorporate ionizing and non-ionizing radiation detection methods.

In a preferred embodiment as seen in FIGS. 40-42, said sensor 66 comprises a densitometer 79 or hydrometer of approximately 80 inches long and 8 inches wide having a substantially flat foam plastic float 81 through which said densitometer 79 is slidably mounted, all of which is placed within the reaction chamber 68. The float 81 measures the reaction chamber 68 sludge 15 and flocculating agent 29 combined mix level via the level of said float 81 relative to a fixed point on the reaction chamber 68. The aforesaid level is correlated to volume flow. This relative float 81 position or "$\Delta x$" value may be measured via optical, mechanical, ultrasonic, radiometric, or even manual observation means to provide an error signal for metering pump 64 control.

The densitometer 79 comprises an indicator 83, typically a one inch pvc pipe, movably extending through said float 81 and a sealed body 85 connected with said indicator 83, typically a four inch pvc pipe, having a balancing load 87 within. The densitometer 79 measures the reaction chamber 68 sludge 15 and flocculating agent 29 combined mix density via the level of said indicator 83 relative to a fixed point on the float 81. This level is correlated to input sludge 15 density. The relative indicator 83 to float 81 position or "$\Delta y$" value may again be measured via optical, mechanical, ultrasonic, radiometric, or even manual observation means to provide an error signal for metering pump 64 control.

Fluid dynamic analysis indicates that the amount of suspended solids within said sludge stream 15 is proportional to the product of the total sludge 15 flow and density of the sludge 15. That is, since the suspended solids are of greater density than the liquid medium of suspension, as the density of the suspended solids increases within the sludge 15, so does the specific gravity of the sludge 15. Thus, said $\Delta x$ is equal to a first constant, $k_1$, multiplied by the flow rate and said $\Delta y$ is equal to a second constant, $k_2$, multiplied by the density. Rearranging the aforesaid equation descriptions produces a result proportional to solids content which is:

$$\text{Solids Content } \alpha \frac{\Delta x \cdot \Delta y}{k_1 \cdot k_2}$$

Obviously this resultant product and the proper proportionality coefficients are most easily utilized to control said metering pump 64 via a microprocessor, microcontroller, or computer yet may also weighted and applied via dedicated circuitry or manual control, all of which are contemplated by the present art.

Upon proper and thorough sludge stream 15 and flocculating agent 29 mixing within the sludge-flocculating agent mixer 67, the aforesaid combination enters the reaction chamber 68. In a preferred embodiment as seen in FIGS. 6, 7, & 14-17, said reaction chamber 68 is mounted onto a side of said settling chamber 82 whereby a non-turbulent flow may enter the settling chamber 82 from the topmost portion of the reaction chamber 68. Alternative embodiments may place said reaction chamber 68 in any location from which sludge 15 mix may transfer to the settling chamber. The purpose of the reaction chamber 68 is to slow the velocity of the 1,000 gpm flow down by expanding the volume and in the process create a lot of turbulence to thoroughly mix the flocculating agent or polymer with the solid particles contained in the liquid or water, prior to non-turbulent discharge into the settling chamber 82. This chamber 68 then widens up even more and with the help of anti-swirl vanes 76, 78 the process of flocculation begins as the turbulence of the polymer/sludge mix settles down.

The sludge 15 mixed with the flocculating agent 29 or polymer enters the reactor or reaction chamber 68 through a feeding or inlet pipe 70. A distributor 89, in a preferred embodiment comprised of a serrated semi-ring deflector 72 and a smooth ring deflector 74, creates a uniform mixing flow going up into the diverging part 91 of the reactor 68. The upper part of the reactor 68 that is not diverging includes the two honeycombs or laminators 76, 78 which suppress the flow disturbances and thus make the flow quiet when the sludge 15 with the flocculated clusters approaches the free surface of the reactor 68 and settling tank or chamber 82. That is, a lower divergent upward flow laminator 76 combined with an upper laminator 78 foster a laminar flow of the mix which limits the ability of the liquid carrier to suspend solids. In the preferred embodiment, a weir 80 is present at said free surface of the reaction chamber 68 over which said mix or flocculated sludge flows via a gentle stream into the settling chamber 82.

The uniquely designed settling chamber 82 receives the flocculated material or mix from the reaction chamber 68 as the velocity of said material slows even more. Due to flocculation, the solid clusters within said mix have a greatly increased settling rate. When the solids settle at a rate of approximately 10 mm per second, the density of the mixture rises rapidly with the depth of material or mix as the density of the solids are greater than the liquid. This increase in pressure pushes the lighter liquid or water upward. Due to the viscosity of the mix and descending floccule components, the liquid or water flow rate, due to its natural buoyancy within the lower position and higher density mix, is inhibited. The novel construction of the present art allows said liquid to travel only a short distance horizontally, diagonally, or vertically before it will encounter a trap 84, thereby allowing quick high volume liquid removal via a substantially small apparatus.

Figure 9:
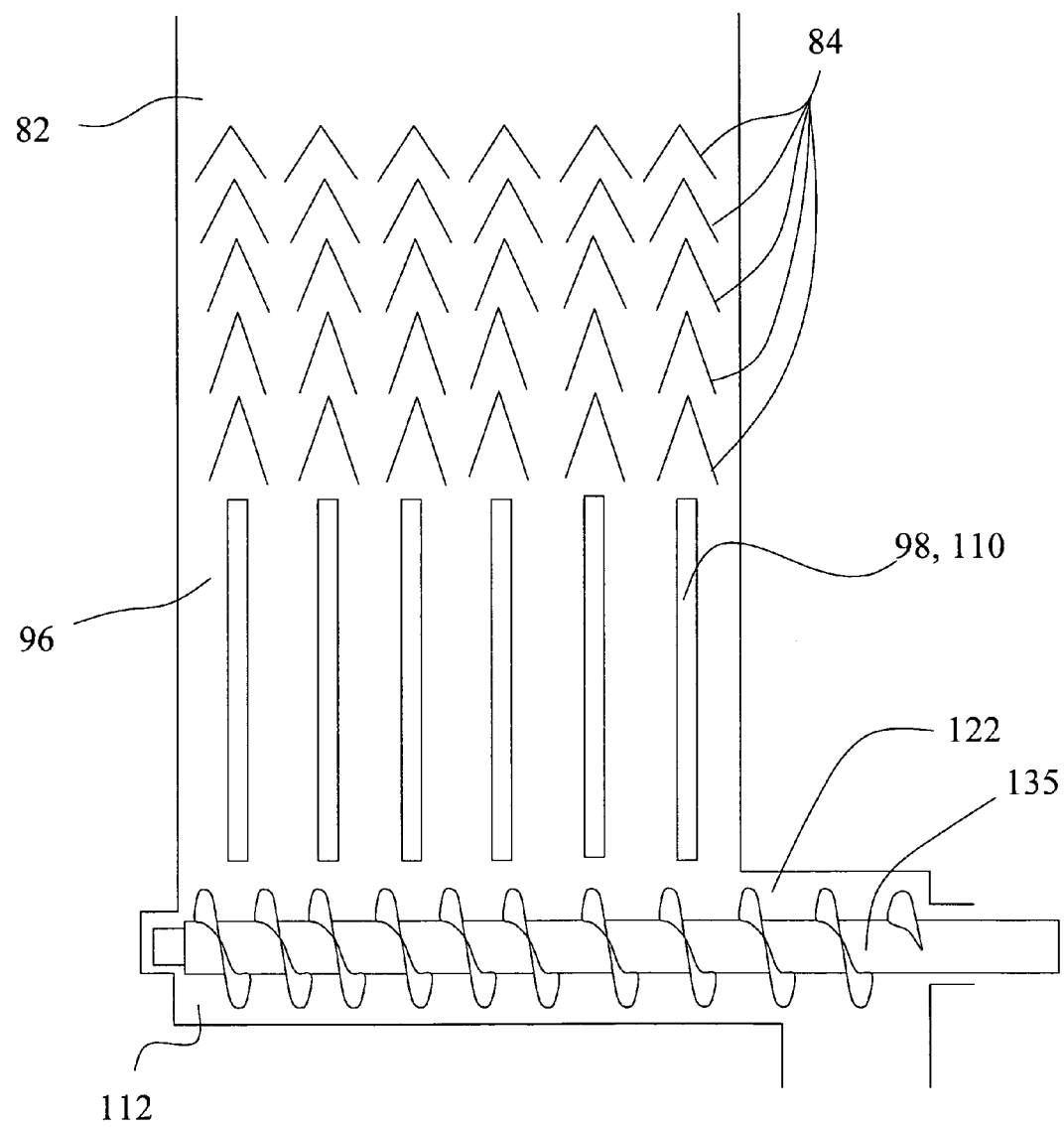
FIG. 9 is an internal cross sectional view of the settling chamber, filter chamber, and discharge chamber.

In a preferred embodiment as seen in FIGS. 9 & 10, said traps 84 are substantially inverted "V" shaped members which traverse the settling chamber 82 and are shaped and constructed along with said settling chamber 82 to maximize water rejection by the enhancement of the sludge-water interface area within said settling chamber 82. Near or at the top, apex, or vertex of each inverted "V" of each the trap 84 is an optimally positioned trap pipe 90 leading from the end of the trap 84 externally to the outside of the settling chamber 82. Liquid is allowed to escape or discharge through said pipes 90 due the ever increasing pressure of the settling solids. As liquid escapes, the solids compact even faster creating a higher density mix and hydrodynamic pressure thereby causing more liquid ejection through said traps 84. The aforesaid dynamic system removes a large amount of fluid very quickly from a settling mass of sludge 15. Alternative embodiments may utilize a plurality of trap 84 geometric cross sections including but not limited to arched top 86 as seen in FIG. 21 and semi-circular 88 as seen in FIG. 22 with said trap pipe 90 located near the apex. The arched top 86 helps to limit solid deposits within the vertex of the "V" shape and the semi-circular 88 promotes a self regulation of liquid output.

In a preferred embodiment as seen in FIG. 10, each of said trap pipes 90 is integrally connected with a trap valve 92 external to said settling chamber 82, each of which are adjustably able to substantially limit output from said pipes 90 to liquid only. Said valves 92 may be manually, hydraulically, pneumatically, electrically, or automatically adjusted or controlled to assure liquid only output. In the preferred embodiment said valves are manually adjusted. Alternative embodiments may utilize a control nozzle 94 below said trap pipe 90 which indicates when the solid-liquid level has risen sufficiently in order to close or restrict said trap valve 92 and limit further liquid discharge from a particular trap 84. That is, when substantial solids begin exiting said control nozzle 94, the solid-liquid level is known. Optical, electrostatic, ultrasonic, electromagnetic, or mechanical methods may be utilized to monitor the discharge from said control nozzle 94. Further alternative embodiments may utilize ultrasonic, mechanical, hydraulic, electrostatic, or electromagnetic transducers or sensors external or internal to said settling chamber 82 for solid-liquid level determination.

Within the settling chamber 82 in the near-surface layer 93 the separation of "easy water" occurs. This "easy water" or liquid represents the lowest density fluid at the top of the settling chamber 82 which is substantially bereft of solid content. The rejected water or liquid overflows into the water collector 115 and is thereafter discharged from a liquid discharge outlet 111. The sludge separated from the "easy water" falls down or flows into the settling tank or chamber 82 and meets the aforesaid grid of traps 84 where the further rejection of water occurs. As aforesaid, the traps 84 which are chambers open from beneath are, in the preferred embodiment, arranged into a few horizontal arrays. The cross-section of each trap 84 typically has a shape of inverse-V with, in an alternative embodiment, two convergent plates 95 beneath. The sludge/water interface is preferably kept at the middle of the convergent plates 95 in each trap. The separated water flows along the traps 84 and leaves the traps 84 through the ports or trap pipes 90 which are controlled by valves in or near the side wall of the settling tank or chamber 82. At a constant hydraulic resistance of the ports or pipes 90, an accidental rising of the water-sludge interface in the traps 84 would cause an increase in the water rejection rate, thus correctively forcing the interface to move back toward the original position. This self-control mechanism stabilizes the operational regime of the settling tank or chamber 82.

Figure 18:
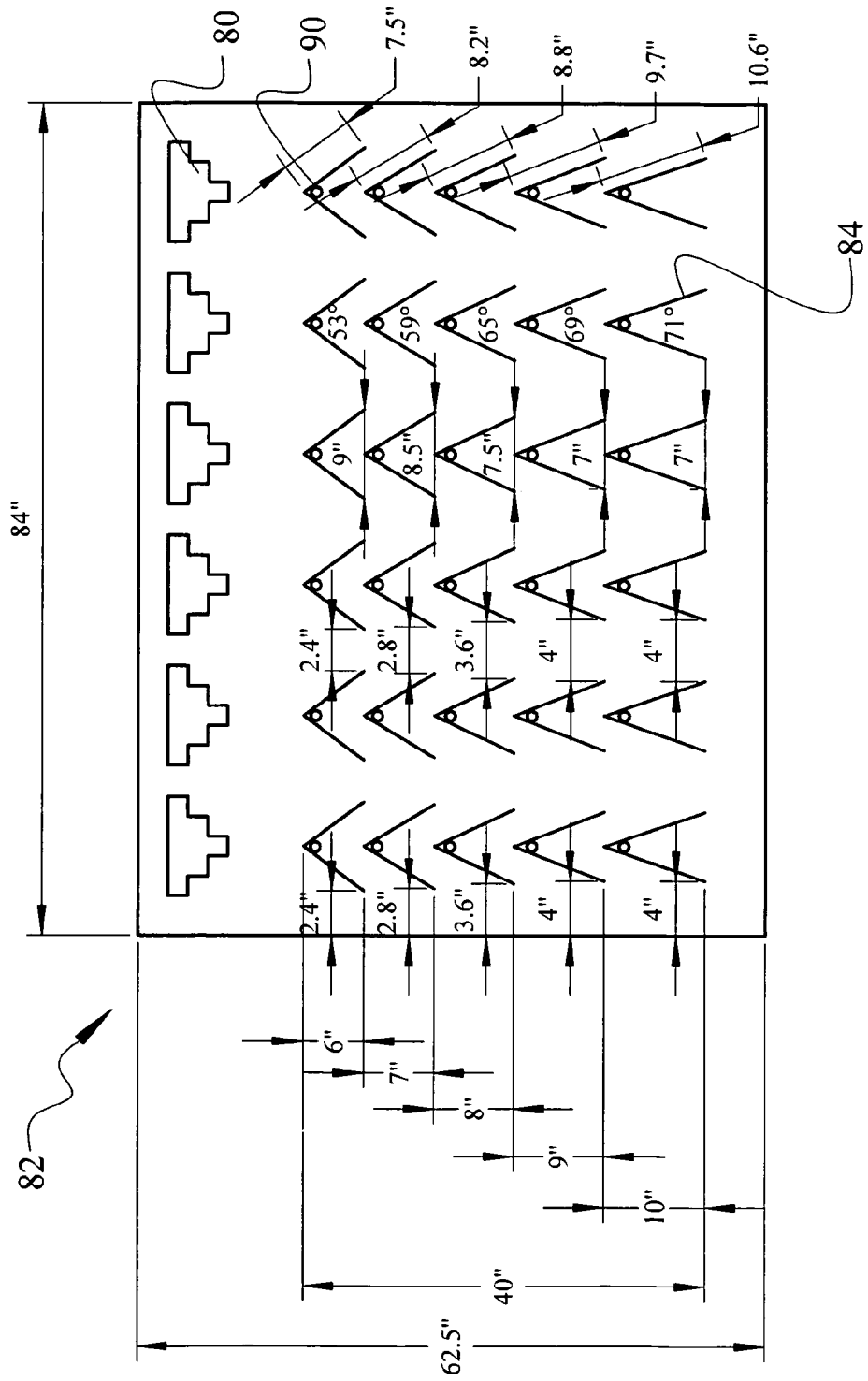
FIG. 18 is another internal cross sectional view of the settling chamber showing the relative angles and dimensions of the traps.
Figure 19:
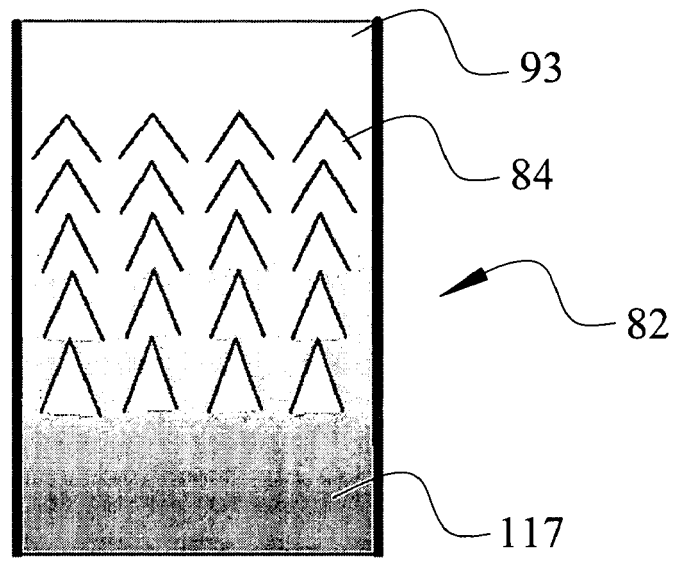
FIG. 19 shows another cross section of the settling chamber with higher density sludge represented as a darker grayscale.
Figure 20:
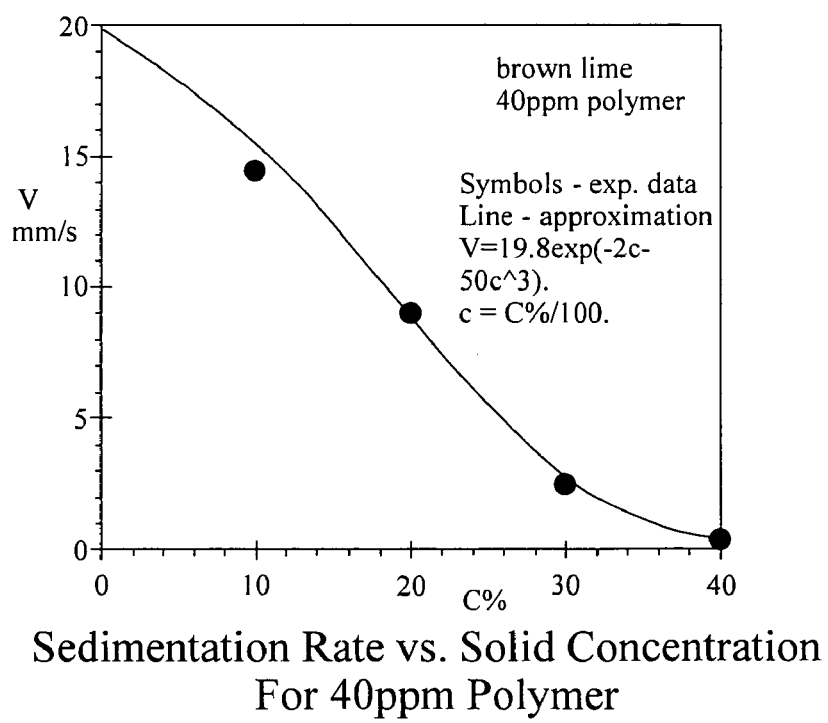
FIG. 20 shows a graph of sedimentation rate verses solid concentration for 40 parts per million flocculation.

In the preferred embodiment as seen in FIG. 18, the angle of "V" part of the traps 84 or vertex angle progressively decreases with the tank depth. At each level, this angle is much less than the natural angle between slopes of a lump of flocculated sludge 15 of the same concentration as the sludge 15 at that level of traps 84 placed on a horizontal plane. This relevant angle is different for different sludge 15 substances. The angle magnitudes are obtained from laboratory tests and shown in the figures for a preferred embodiment. The distance between the edges of adjacent traps 84 of the same level are sufficiently large to avoid an arching effect of the flocculated sludge 15. The distance values for a particular substance are also obtained from laboratory tests and shown in the figures.

Since liquid and solid components require different inclination angles the top row traps are broader and lower in height than the bottom row traps and progressively get narrower and higher in height toward said bottom row. Since the solid component is very viscous and sticky it requires a small vertex angle, i.e. nearly vertical plates. In contrast, the liquid component (e.g. water) is easy movable and therefore gains a relatively larger velocity while flowing over a plate with a small vertex angle. For small vertex angles, the liquid flow becomes so intense and turbulent that the gravity separation within the settling chamber 82 may deteriorate.

In the preferred embodiment as seen in FIGS. 4, 6, 7, 9, & 13, a filter chamber 96 is positioned in a sealed manner substantially parallel with and below said settling chamber 82. As partially dehydrated sludge clears the settling chamber 82, solids content is typically 35 to 50%. The aforesaid partially dehydrated material settles down around the double sided vertical filters 98 in the filter chamber 96. With the help of water (hydrostatic) pressure on the outside of the filters 98 and a preferred hydraulic suction on the inside of the filters 98 a further rapid dehydration occurs. It is not unusual for solids of 80 to 90% to be achieved upon discharge from the filter chamber 96. In the preferred embodiment, the filters 98 are positioned in a substantially vertical orientation within the filter chamber 96 and the sludge cake 117 moves past the filters 98 at a rate of approximately 1.5 inches per minute. This unique configuration assures that the filters 98 will not blind as quickly as prior art horizontal filters.

In the preferred embodiment as seen in FIG. 37, each of said double sided vertical filters 98 comprise two sheets of opposing filter material 110 positioned to form a cavity 119 from which exits one or more filter pipes 109. That is, the only liquid entrance to said cavity 119 is through said filter material 110. Any liquid which permeates said filter 110 or enters said cavity 119 is thereafter drained through said filter pipe 109 into the aforesaid water collector 115.

The aforesaid filter material 110 may take a plurality of shapes and forms without departing from the scope and spirit of the present art. That is, in a preferred embodiment, the filter material 110 comprises a 5% TEFLON® (i.e. polytetrafluoroethylene,) filled polyethylene screen, model PRESTEX™ #HF7-7704 from Madison Filter of Skaneateles Falls, N.Y., having a twill weave mesh count of 69 by 16 per inch. Alternative embodiments utilize a perforated metal plate 100, as seen in FIGS. 38 & 39, having a proper hole 102 relative to particle size diameter ratio and a proper distance (therebetween) relative to hole 102 diameter ratio in the hole 102 arrangement and a unique cross sectional geometry of dimpled holes 102 with a cone 102 within each hole 102. The aforesaid cones 102 face the sludge cake 117 whereby said sludge cake 117 may fill or build up within said cones 102 without shearing and serve to finely filter the ultrafine solids from the liquid entering said cavity 119. Unlike prior art designs, the aforesaid cone 102, unlike a conventional screen, assures that the sludge cake 117 buildup will not be sheared off due to the movement of said sludge cake 117 past said filter material 110. Experimental and analytical tests show that cone 104 vertex angles from 25 to 90 degrees with outside cone 104 diameter of 0.145 to 0.250 inch and hole 102 diameter of 0.020 inch provide the most desired effect for a preferred embodiment. Alternative embodiments may incorporate a plurality of sizes and recessed structures within said dimple holes 102 which include but are not limited to cylinders, cubes, or spheres, provided the cross sectional dimension and depth are sufficient to hold said sludge cake 117 without shearing. Further alternative filter material 110 embodiments may utilize any pore material of sufficient rigidity to withstand the sludge cake 117 forces without departing from the scope and spirit of the present invention. The filtration rate can be significantly increased when water suction is applied in addition to the sludge cake 117 pressure action.

The thickened sludge or sludge cake 117, i.e. thickening into the paste, moves downward toward the bottom of the settling tank or chamber 82 where the paste meets the discharge chamber 112 as seen in FIGS. 9 & 11. The discharge chamber 112 is positioned in a sealed manner below the other chambers 82, 96 and removes the cake 117 from the bottom of the drying and settling sludge 117 layer in such a manner that the material is removed evenly and at a rate that is equal to but not in excess of the incoming rate of solids. As aforesaid, the discharge chamber 112 removes the cake 117 from the bottom of the filter chamber 96 in a controlled manner. That is, if one side of the cake 117 is allowed to feed faster than the other side, the boundary layer between the sludge cake 117 and the thin watery or liquid sludge above will creep down and rupture through the cake plug 114 at the bottom of the filter chamber 96. If the aforesaid rupture occurs, liquid rather than solid discharge, i.e. a flood, could occur through the discharge valve(s) 116 of the discharge chamber 112. To mitigate the aforesaid possibility, a unique discharge chamber 112 bottom unloading system has been designed. That is, the discharge chamber 112 uniquely removes a measured amount and an even layer of the cake plug 114 material from the descending cake 117 at the bottom of the filter chamber 96. Unlike prior art round bin or silo evacuation systems, a preferred embodiment of the present art is capable of operation with a rectangular bin.

The discharge valve(s) 116 as seen in FIGS. 23-27 comprise a top vane layer 118 and a bottom vane layer 120 forming a cavity therebetween, each having one or more vanes 121, which function sequentially and independently. In a preferred embodiment as seen in FIGS. 23-26, each vane is approximately 10 inches wide and 76 inches long and preferably manufactured from ¾ inch steel plate. For the preferred embodiment as seen in FIGS. 23-26, each vane 121 rotates upon a stub shaft 123 attached or welded into each end of the vane 121. The aforesaid stub shaft 123 extends through the side of the discharge chamber 112, preferably on or within bearings, and is also preferably connected with a hydraulic cylinder or actuator 125 to provide the necessary discharge actuation. Alternate embodiments as seen in FIG. 27 utilize one or more valve chains 129 and sprockets 131 on each of said stub shafts 123 to rotate said vanes 121. Vane 121 actuation torque is provided via said chain 129 by a gear reduced motor, hydraulic motor, stepper motor, said hydraulic cylinder or actuator 125, or other actuator capable of providing sufficient linear chain 129 force to open or close said vane(s) 121 within said cake plug 114.

Figure 24:
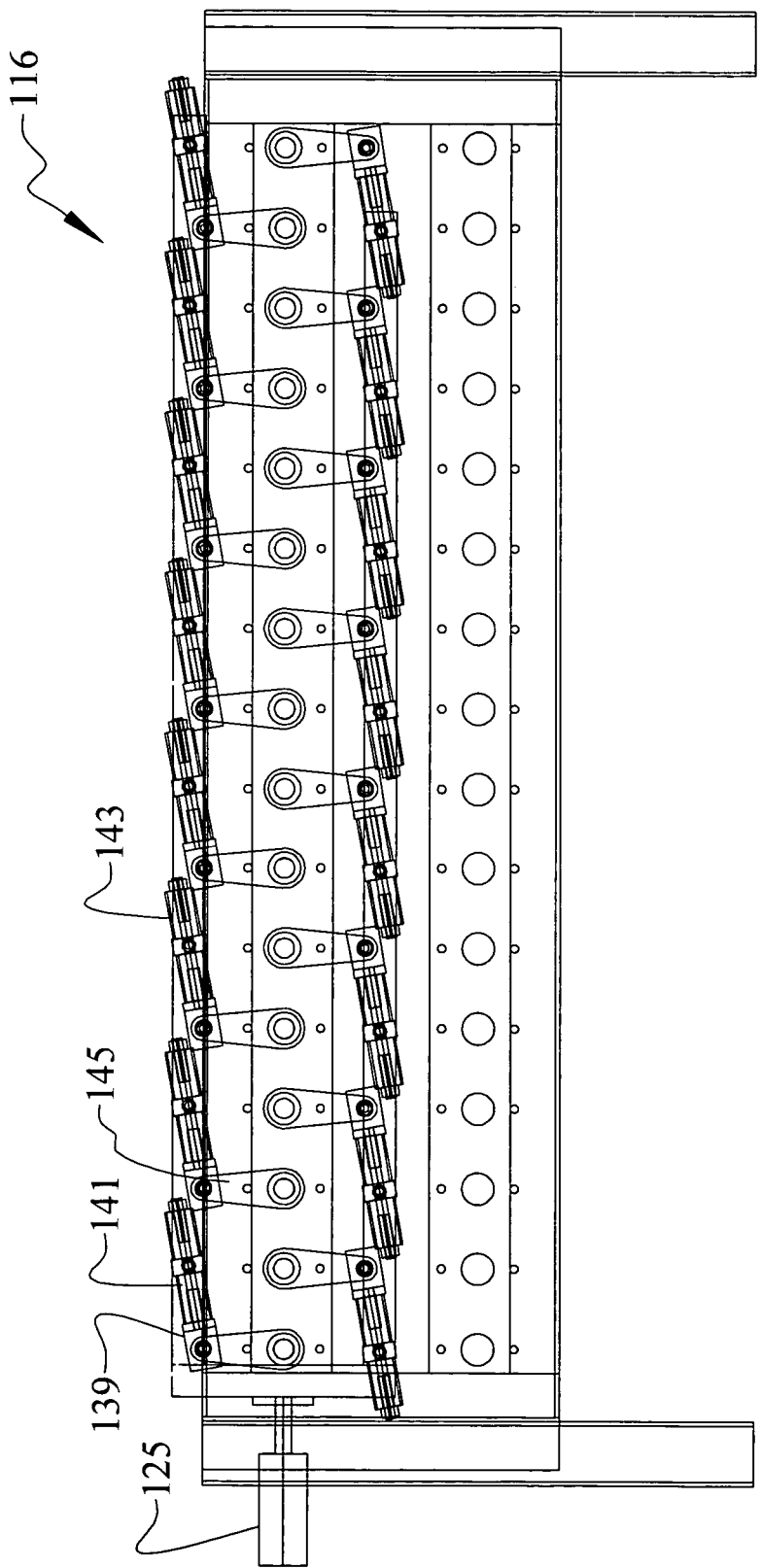
FIG. 24 shows a plan view of the hydraulic cylinder actuated discharge valves.
Figure 25:
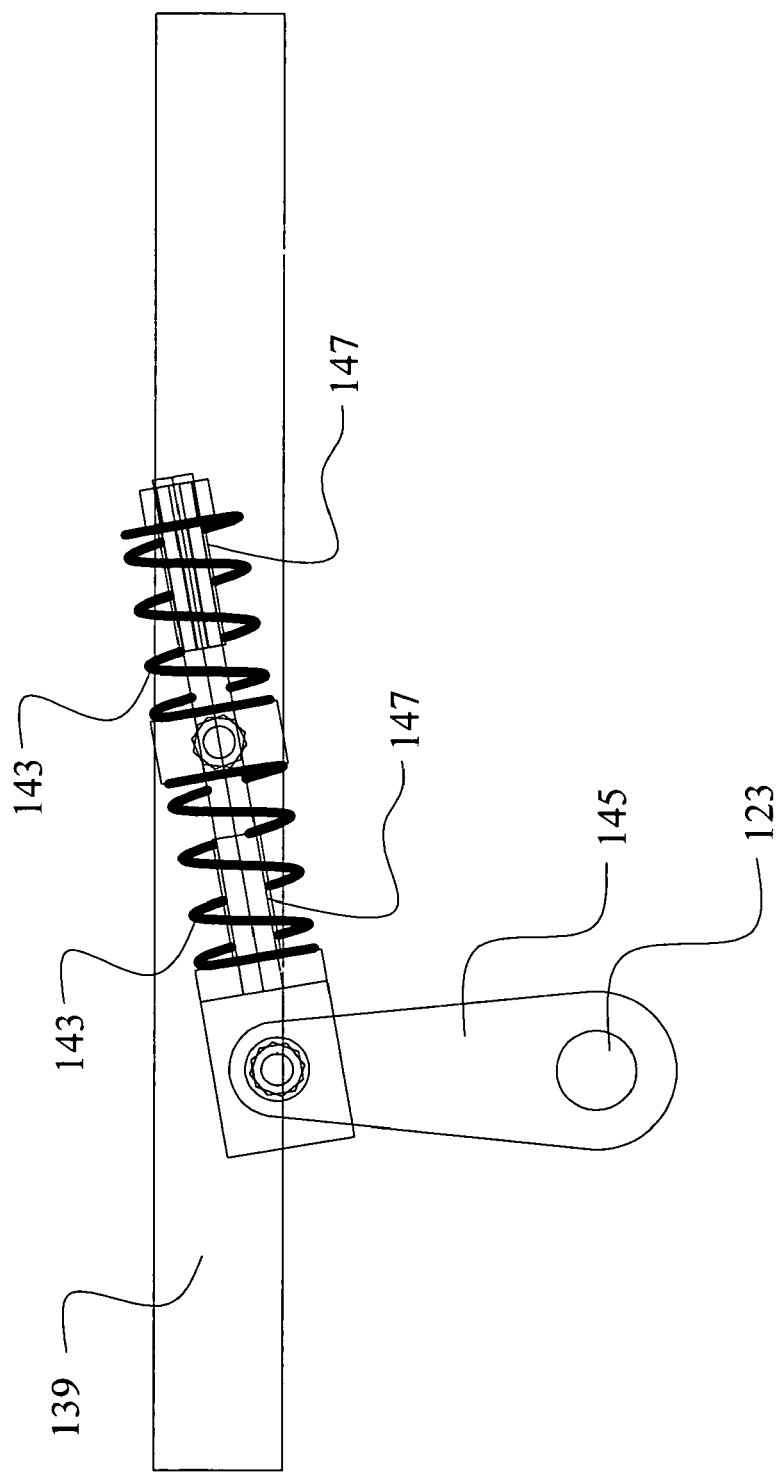
FIG. 25 shows a detailed side plan view of the hydraulic cylinder actuated discharge valve.
Figure 26:
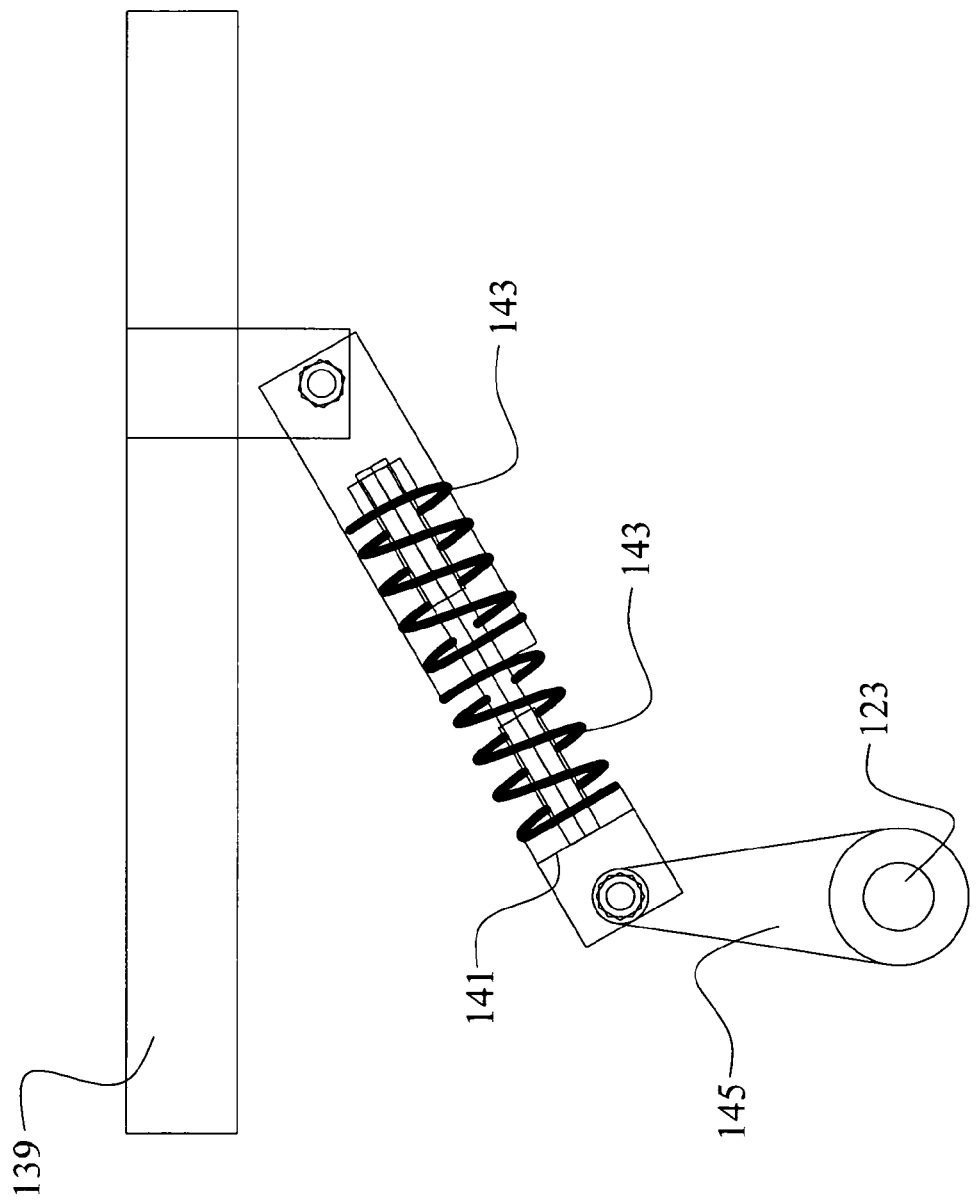
FIG. 26 shows another detailed side plan view of the hydraulic cylinder actuated discharge valve.

In a preferred embodiment as seen in FIG. 24, the hydraulic cylinder 125 is coupled with an upper and lower slide actuating bar 139 via a common connecting bar. Each slide actuating bar 139 provides interspersed mechanical motion to the stub shafts 123. That is, every other stub shaft 123 is rotated opposite the adjacent since adjacent stub shafts 123 are actuated by an upper or lower actuating bar 139. In a preferred embodiment as seen in FIG. 24, the aforesaid coupling comprises a connecting rod 141 having one or more springs 143 and travel limiting sleeves 147 coupled with an arm 145 affixed to said stub shaft 123. The aforesaid springs 143 provide sufficient linear force upon tension or compression to open or close each of said vanes 121 yet further provide the necessary linkage safety displacement should one or more sets of adjacent vanes 121 have uncompressible debris lodged therebetween upon closure.

In the preferred embodiment as seen in FIGS. 23-26 and substantially in FIG. 27, the top vane layer 118 opens whereby said vanes 121 are positioned into a substantially vertical orientation via unison rotation of each of said stub shafts 123 with adjacent stub shaft 123 rotational directions opposite yet of substantially equivalent displacement. The aforesaid provides a discharge of sludge cake 117 onto the closed bottom vane layer 120. The top vane layer 118 then closes via continued rotation of said stub shafts 123 in the same relative rotational directions and sequentially the bottom vane layer 120 opens in substantially the same fashion as the top vane layer 118 to allow solid discharge onto a conveyor 127 within the conveyor chamber 126. By sequentially operating said vane layers 118, 120, a measured and controlled amount of solids are provided for discharge with a minimum of disturbance to the cake plug 114, thereby minimizing the probability that the cake plug 114 will rupture and transfer significant amounts liquid into the conveyor chamber 126. The aforesaid process is repeated for every subsequent discharge via respective reversal of each of said stub shafts 123. The aforesaid vane layers 118, 120 and respective actuators are best controlled via a microprocessor, microcontroller, or computer yet may also be cycled via manual control of the actuator.

Alternative embodiments of the discharge chamber 112 as seen in FIGS. 9-12 utilize an auger 122 with an increasing screw pitch. That is, the increasing screw pitch allows the auger 122 to evenly remove sludge cake 117 from the base of the cake plug 114 in order to avoid rupture of the cake plug 114. In this alternative embodiment, the discharge chamber 112 is tapered to meet and conform to said auger 122. In this alternative embodiment, the auger 122 transports the paste into an exiting port or filtering part 133 of the auger 122 located outside the settling tank or chamber 82 and discharge chamber 112. The aforesaid filtering part 133 of the auger 122 is preferably embedded in a perforated pipe 137 which serves as a filter. In a preferred alternative embodiment, the loading, i.e. auger 122 proper, and filtering parts 133 of the auger have a common shaft 135 which, when rotated, rotates said auger 122. Also, within the filtering part 133, the distance between adjacent screw flights of the auger 122 progressively decrease outward. This pressurizes the paste or cake 117 and pushes water out through the filter holes, i.e. holes of the perforated pipe 137.

Further alternative discharge chamber 112 embodiments utilize one or more layers of sliding slats 124 or sliding vanes as discharge valves 116 as seen in FIG. 28. The preferred further alternative embodiment utilizes two layers of said slats 124 which function much as said vanes 121. That is, each slat layer 124 opens sequentially in order to provide a measured and controlled amount of solids for discharge with a minimum of disturbance to the cake plug 114. Still further alternative embodiments may utilize a plurality of discharge valve 116 techniques in furtherance of the present art.

In all embodiments as described in FIGS. 1-49, the discharge of the resulting cake 117 preferably enters a conveyer chamber 126 and is accepted by and placed upon a conveyor 127 for transporting or loading into a truck for transport. In a preferred embodiment, said conveyor 127 is a commercially available rubber or chain and slat conveyor that will transport the cake 117 from the discharge chamber 112. In a preferred embodiment said conveyor 127 is perforated whereby any remaining liquid may drain from said cake 117. Often the removed cake 117 solids are dropped or fed into an auger for loading into a truck.

Alternative embodiments of the apparatus 10 may take a plurality of forms without departing from the scope of the present invention. A further alternative embodiment as seen in FIGS. 45-47 utilizes a multi-layer settling tank 130 having a sludge feeding pipe 132 and a plurality of tilted plates 134 which function as traps 84. That is, flocculated sludge 15 enters through the sludge feeding pipe 132, is mixed via a conical deflector 136 within a reactor 140, and overflows into a convergent channel 146 having said series of said tilted plates 134 which function as traps 84. Each of said tilted plates 134 have an exiting trap pipe 90 near or at the top of the trap for liquid evacuation. As the sludge 15 settles within the convergent channel 146, liquid is removed and solids settle where solid removal is attained via one or more splitters 150 and a control disc 154 which act as a valve for said solids. This alternative embodiment incorporates the design elements and functions of the preferred embodiment with the trap system surrounding the reactor 140.

Operation of the settling grid separator apparatus 10 begins with coupling a dredge pipe 12 to the apparatus 10 which is fed by a dredge from the lagoon or waste water source. The sludge 15 stream flow energy is substantially provided by said dredge thereby minimizing energy consumption of the apparatus 10. The sludge 15 stream enters the trash box 14 where large particle filtration is achieved and then enters the sludge-flocculating agent mixer 67 where mixed and wetted flocculating agent 29 is properly mixed in correct proportions with said sludge 15 stream. The metering pump 64 injects the proper amount of flocculating agent 29 into said sludge 15 based upon the volume flow and density sensor 66 feedback. As aforesaid, this injection may be manually performed based upon readings of said sensor 66 or utilize an automatic feedback controller.

The flocculated sludge 15 stream then enters a reaction chamber 68 which promotes thorough mixing and further laminates or calms the flow as it is discharged into the settling chamber 68. Upon entry into the settling chamber 68, higher density solids begin to form a sediment or precipitate from the liquid as liquid is removed from the near surface layer 93 and the series of traps 84 within the settling chamber 82. In the preferred embodiment, further liquid removal is obtained as aforesaid within the filter chamber 96. All of the aforesaid liquid is collected within a water collector 115 and discharged through a liquid discharge outlet 111, either to the sludge 15 source or to the flocculating agent pre-mixer 32, passive mixer 71 or flocculating agent mix holding tank 62 for further use.

Solids precipitate within said settling chamber 68 and filter chamber 96 into said discharge chamber 112 where one or more discharge valves 116 remove said solids in an even and controlled manner. Said valves 116 also may be manually controlled or may be automatically controlled via a microcontroller, microprocessor, or computer in order to maximize throughput. The valves 116 discharge said solids onto a conveyor 127 which transports said solids to a truck or trailer for proper disposal or recycling. Unique to the settling grid separator apparatus 10 operation is the aforesaid utilization of primarily gravitational forces and the dredge sludge 15 stream energy to provide the operation energy requirements for the apparatus 10. That is, absent the minimal energy utilized for the pre-mixer(s) 32, agent pump 27, water pump 63, and mix pump 69 the apparatus 10 does not consume energy to operate. Proper positioning of the truck or trailer for solids discharge could minimize or even eliminate any further energy required for the conveyor 127.

Those skilled in the art will appreciate that a settling grid separator apparatus 10 and method of use has been shown and described. The apparatus 10 and method of use provides environmentally friendly and energy efficient removal of solids from a high volume liquid-solid or sludge mixture in a compact, low maintenance and transportable form. The apparatus 10 and method further provides the aforesaid via a unique flocculating, trapping, filtering, and discharge system which relies primarily upon gravitational forces rather than energy consuming centrifuges, cyclones, vibrators, or sludge pumps as found in the prior art. The present art settling grid separator apparatus 10 and method of use not only provides cleanup, reclamation, and recycling but provides said desirable benefits in an environmentally friendly manner.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. A settling grid separator for separating suspended solids within a liquid carrier comprising:
   a sludge-flocculating agent mixer capable of mixing a flocculating agent with an input sludge stream, said sludge stream having a plurality of solids suspended within a liquid carrier, said solids having a density greater than said liquid carrier; and
   a settling chamber fed by said mixed flocculating agent and said sludge stream, said settling chamber comprising a chamber having an upper and a lower portion and having a grid of traps between said upper and lower portions; and said traps comprising substantially inverted "V" or semi-circular shaped members within said settling chamber and forming a grid for water removal; and one or more of said traps having one or more trap pipes near a vertex of said inverted "V" shaped member or an apex of said inverted semi-circular member and optimally positioned and exiting externally from said settling chamber whereby said liquid carrier may escape external to said settling chamber substantially without said solids; and said chamber of said settling chamber and said traps constructed to minimize turbulence within said settling chamber whereby sedimentation or precipitation of said solids may occur toward said lower portion due to gravitational force; and a discharge chamber positioned in a sealed manner below said lower portion of said settling chamber and having one or more discharge valves capable of accumulating a cake of said solids and releasing at least a portion of said cake whereby said cake may be removed from said discharge chamber substantially without said liquid carrier and reused, recycled, or disposed of properly.

2. The settling grid separator as set forth in claim 1 further comprising:

a filter chamber positioned in a sealed manner between said settling chamber and said discharge chamber, said filter chamber having one or more filters, said filters having one or more filter pipes connected with said filters and exiting from said filter chamber whereby any of said liquid which permeates said filters is drained through said one or more filter pipes substantially without said solids.

3. The settling grid separator as set forth in claim 2 whereby one or more of said filters further comprise:

one or more vertical filters having one or more cavities into which said liquid permeates; and said filter pipes connected with said filters via said cavity.

4. The settling grid separator as set forth in claim 3 whereby one or more of said filters further comprise:

a filter material comprised of one or more perforated plates having a plurality of dimpled holes, each of said holes having a cone in which a dome of said cake may form and not shear and further provide fine filtration of said liquid.

5. The settling grid separator as set forth in claim 3, said one or more filters further comprising:

a filter material comprised of one or more rigid pore materials comprised of a polytetrafluoroethylene filled polyethylene.

6. The settling grid separator as set forth in claim 1 further comprising:

a two stage flocculating agent mixing system, said mixing system comprising one or more flocculating agent pre-mixers capable of mixing a flocculating agent concentrate with a water or liquid from a water or liquid source; and a flocculating agent storage tank connected with a flocculating agent pump, said flocculating agent pump connected with said pre-mixers and capable of pumping said flocculating agent concentrate from said flocculating agent storage tank to said pre-mixers; and a liquid pump connected with said pre-mixers and said water or liquid source and capable of pumping said water or liquid to said pre-mixers; and a mix pump capable of pumping said flocculating agent concentrate mixed with said water or other liquids within said pre-mixer into a flocculating agent mix holding tank.

7. The settling grid separator as set forth in claim 6, said pre-mixer further comprising:

one or more rotating discs interleaved between two or more stationary discs whereby turbulence is created via boundary layer adhesion and said flocculating agent concentrate is mixed with said water or liquid.

8. The settling grid separator as set forth in claim 7, said pre-mixer further comprising:

a container having a cover; and one or more inlet pipes external to and connected with said container and into which said flocculating agent and said water or other liquids enter said pre-mixer; and a shaft pipe nonrotationally coupled with said inlet pipe, said shaft pipe attached with said one or more rotating discs and capable of rotating within said container; and and a pre-mixer outlet pipe coupled with said a mix pump.

9. The settling grid separator as set forth in claim 6, said pre-mixer further comprising:

one or more rotating cylinders within one or more stationary cylinders whereby turbulence is created via boundary layer adhesion and said flocculating agent concentrate is mixed with said water or liquid.

10. The settling grid separator as set forth in claim 1 further comprising:

a reaction chamber connected between said sludge-flocculating agent mixer and said settling chamber, said reaction chamber capable of providing further mixing and quieting of said flocculating agent with said input sludge fed into said settling chamber.

11. The settling grid separator as set forth in claim 10, said reaction chamber further comprising:

an inlet pipe connected with said sludge-flocculating agent mixer; and a distributor providing a mixing of a flow from said inlet pipe of said flocculating agent with said input sludge; and a lower divergent upward flow laminator and an upper laminator capable of providing said quieting of said flow of said flocculating agent with said input sludge; and a weir over which said flow of said flocculating agent with said input sludge is substantially fed into said settling chamber.

12. The settling grid separator as set forth in claim 1, said one or more discharge valves further comprising:

a top vane layer positioned above a bottom vane layer to form a cavity between said vane layers; and each of said vane layers capable of functioning independently, whereby a portion of said cake is discharged into said cavity when said top vane layer opens and thereafter closes and said portion of cake within said cavity exits said discharge chamber when said bottom vane layer opens.

13. The settling grid separator as set forth in claim 12, said vane layers further comprising:

one or more rotating vanes each having a stub shaft whereby rotation of each of said stub shafts rotates said one or more rotating vanes.

14. The settling grid separator as set forth in claim 13 further comprising:

one or more hydraulic actuators connected with one or more actuating bars; and one or more connecting rods connected with said actuating bar; and one or more arms affixed with said connecting rods and affixed to each of said stub shafts whereby motion of said one or more hydraulic actuators imparts said rotation of said one or more rotating vanes.

15. The settling grid separator as set forth in claim 13 further comprising:

one or more valve sprockets and one or more valve chains on each of said stub shafts whereby an actuation torque is provided via said chain by a motor or actuator to one or more of said vanes.

16. The settling grid separator as set forth in claim 12, said vane layers further comprising:

one or more layers of sliding slats.

17. The settling grid separator as set forth in claim 1, said one or more discharge valves further comprising:

an auger having a common shaft; and a taper within said discharge chamber which meets and conforms to said auger, whereby when said common shaft is rotated said auger rotates and discharges said cake through an exiting port.

18. The settling grid separator as set forth in claim 17, said auger further comprising:

a screw having an increasing pitch of one or more flights toward said exiting port whereby said cake is evenly removed.

19. The settling grid separator as set forth in claim 18 further comprising:

a filtering part coupled with said exiting port and having said auger embedded within, said filtering part substantially comprised of a perforated pipe; and said flights of said screw progressively decreasing within said filtering part.

20. The settling grid separator as set forth in claim 1 further comprising:

a conveyor chamber having a conveyor positioned to accept a discharge of said cake removed from said discharge chamber and transport said cake.

21. The settling grid separator as set forth in claim 20 whereby:

said conveyor is perforated whereby any remaining liquid may drain from said cake.

22. The settling grid separator as set forth in claim 1 further comprising:

a trash box connected with said sludge-flocculating agent mixer and capable of accepting said input sludge stream and removing one or more larger debris within the sludge stream.

23. The settling grid separator as set forth in claim 22, said trash box further comprising:

a strainer having one or more strainer rods through which said sludge stream flows; and a dump tray pivotably mounted upon an axle shaft whereby when said dump tray is pivoted open said larger debris may be disposed from said trash box.

24. The settling grid separator as set forth in claim 1 further comprising:

a metering pump connected with said sludge-flocculating agent mixer and a flocculating agent storage tank whereby said flocculating agent may be pumped from said storage tank to said mixer; and a volume flow and density sensor positioned to monitor the solids density of the sludge stream and cause said metering pump to inject the proper amount of flocculating agent into said sludge-flocculating agent mixer.

25. The settling grid separator as set forth in claim 24, said volume flow and density sensor further comprising:

a float; and an indicator slidably mounted with said float; and a sealed body having a balancing load within and connected with said indicator whereby a first level of said float relative to a fixed point correlates to a volume flow and a second level of said indicator relative to said float correlates to an input sludge density.

26. The settling grid separator as set forth in claim 1 whereby:

said inverted "V" shaped members have an arched top.

27. The settling grid separator as set forth in claim 1, said one or more traps comprising:

one or more trap valves integrally connected with said one or more trap pipes; and one or more control nozzles below said one or more trap pipes and monitored via optical, electrostatic, ultrasonic, electromagnetic, or mechanical methods, said control nozzles indicating when a solid-liquid level has risen sufficiently when substantial solids begin exiting said control nozzle in order to close or restrict said trap valve manually, hydraulically, pneumatically or electrically and limit further liquid discharge from one or more of said traps.

28. The settling grid separator as set forth in claim 1 further comprising:

tilted plates forming said traps; and convergent channels positioned to settle sludge in said settling chamber; and said one or more discharge valves comprised of one or more splitters and one or more control discs.

* * * * *